(12) United States Patent
Yamazaki et al.

(10) Patent No.: US 11,262,981 B2
(45) Date of Patent: Mar. 1, 2022

(54) ADDITION METHOD, SEMICONDUCTOR DEVICE, AND ELECTRONIC DEVICE

(71) Applicant: Semiconductor Energy Laboratory Co., Ltd., Atsugi (JP)

(72) Inventors: Shunpei Yamazaki, Setagaya (JP); Hajime Kimura, Atsugi (JP); Takahiro Fukutome, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 16/649,948

(22) PCT Filed: Nov. 5, 2018

(86) PCT No.: PCT/IB2018/058647
§ 371 (c)(1),
(2) Date: Mar. 23, 2020

(87) PCT Pub. No.: WO2019/097350
PCT Pub. Date: May 23, 2019

(65) Prior Publication Data
US 2020/0278837 A1 Sep. 3, 2020

(30) Foreign Application Priority Data

Nov. 17, 2017 (JP) .............................. JP2017-221455
Feb. 19, 2018 (JP) .............................. JP2018-027238

(51) Int. Cl.
*G06F 7/499* (2006.01)
*G06F 7/501* (2006.01)
(Continued)

(52) U.S. Cl.
CPC ........ *G06F 7/49942* (2013.01); *G06F 7/4991* (2013.01); *G06F 7/501* (2013.01); *G06F 7/57* (2013.01); *G06F 9/3001* (2013.01)

(58) Field of Classification Search
CPC ........... G06F 7/4991–49921; G06F 7/50–501; G06F 7/509–5095
See application file for complete search history.

(56) References Cited

U.S. PATENT DOCUMENTS 4,379,338 A * 4/1983 Nishitani .............. G06F 7/5095
708/552
5,933,362 A    8/1999 Inoue
(Continued)

FOREIGN PATENT DOCUMENTS

JP          09-222991 A     8/1997
JP        2002-111447 A     4/2002
(Continued)

OTHER PUBLICATIONS

S. Sun and J. Zambreno, "A floating-point accumulator for FPGA-based high performance computing applications," 2009 International Conference on Field-Programmable Technology, 2009, pp. 493-499 (Year: 2009).*

(Continued)

*Primary Examiner* — Matthew D Sandifer
(74) *Attorney, Agent, or Firm* — Robinson Intellectual Property Law Office; Eric J. Robinson

(57) ABSTRACT

An adder circuit inhibiting overflow is provided. A first memory, a second memory, a third memory, and a fourth memory are included. A step of supplying first data with a sign to the first memory and supplying the first data with a positive sign stored in the first memory, to the second memory; a step of supplying the first data with a negative sign stored in the second memory, to the third memory; a step of generating second data by adding the first data with a positive sign stored in the second memory and the first data with a negative sign stored in the third memory; and a step of storing the second data in the fourth memory are included. When the second data stored in the fourth memory are all (Continued)

second data with a positive sign or all second data with a negative sign, all the second data stored in the fourth memory are added.

3 Claims, 20 Drawing Sheets

(51) Int. Cl.
*G06F 7/57* (2006.01)
*G06F 9/30* (2018.01)

(56) References Cited

U.S. PATENT DOCUMENTS

| | | | |
|---|---|---|---|
| 6,993,545 | B2 | 1/2006 | Shiraishi |
| 9,773,832 | B2 | 9/2017 | Kurokawa |
| 9,851,942 | B2 | 12/2017 | Kurokawa |
| 10,141,069 | B2 | 11/2018 | Ikeda et al. |
| 2002/0059351 | A1 | 5/2002 | Shiraishi |
| 2017/0116512 | A1 | 4/2017 | Kurokawa |

FOREIGN PATENT DOCUMENTS

| | | | |
|---|---|---|---|
| JP | 2003-241958 A | | 8/2003 |
| JP | 2003241958 A | * | 8/2003 |
| JP | 2006-277019 A | | 10/2006 |

OTHER PUBLICATIONS

International Search Report (Application No. PCT/IB2018/058647) dated Feb. 5, 2019.
Written Opinion (Application No. PCT/IB2018/058647) dated Feb. 5, 2019.

* cited by examiner

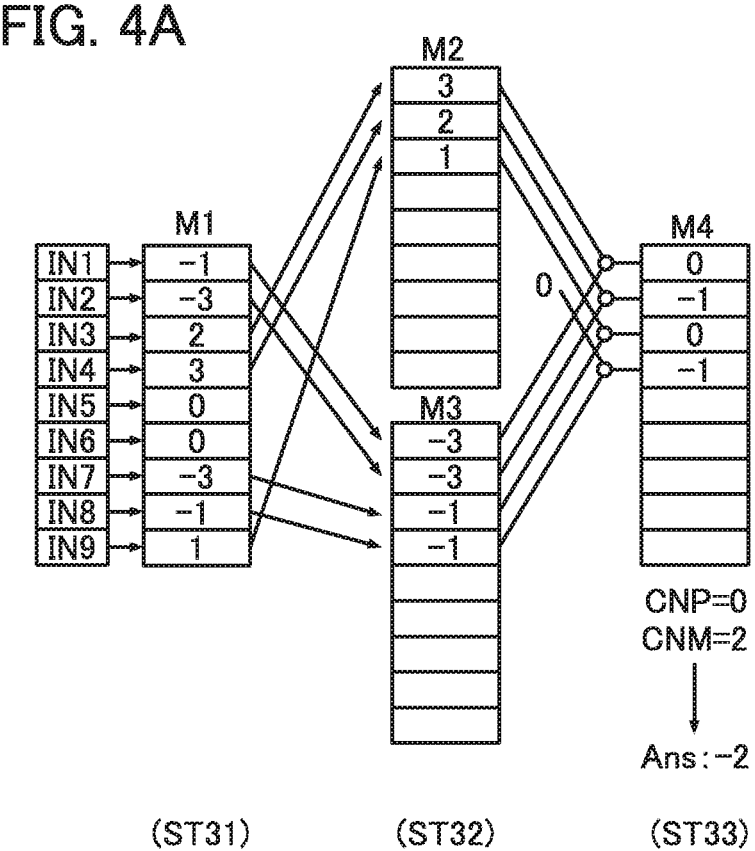
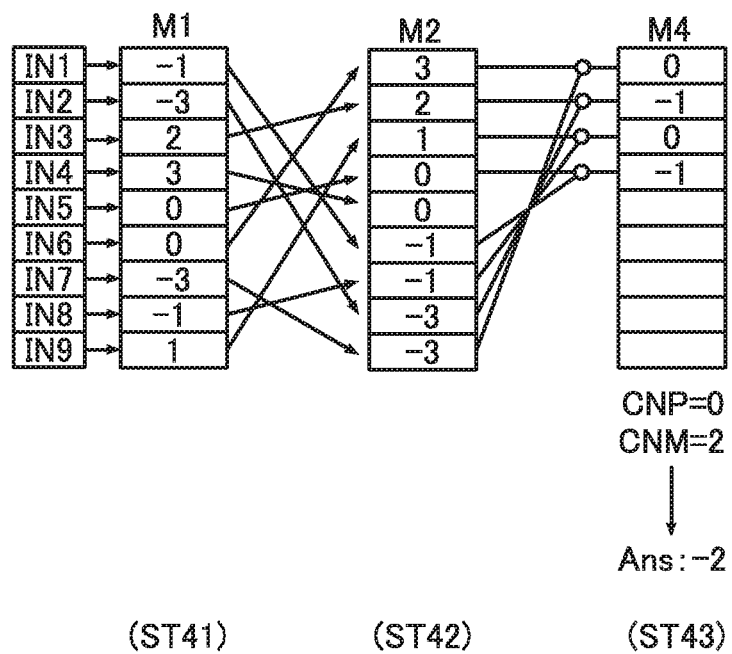

40

ADDITION METHOD, SEMICONDUCTOR DEVICE, AND ELECTRONIC DEVICE

TECHNICAL FIELD

One embodiment of the present invention relates to an addition method, a semiconductor device, and an electronic device.

Note that one embodiment of the present invention is not limited to the above technical field. The technical field of one embodiment of the invention disclosed in this specification and the like relates to an object, a program, a method, or a manufacturing method. In particular, one embodiment of the present invention relates to a semiconductor device, a display device, a light-emitting device, a power storage device, a memory device, a driving method thereof, or a manufacturing method thereof.

In this specification and the like, a semiconductor device means an element, a circuit, a device, or the like that can function by utilizing semiconductor characteristics. For example, a semiconductor element such as a transistor or a diode is a semiconductor device. For another example, a circuit including a semiconductor element is a semiconductor device. For another example, a device provided with a circuit including a semiconductor element is a semiconductor device.

BACKGROUND ART

With the development of information technology such as IoT (Internet of Things) and AI (Artificial Intelligence), the amount of handled data has shown an increasing tendency. In order for an electronic device to utilize information technology such as IoT and AI, the capability of performing arithmetic processing on a large amount of data has been required. Furthermore, in order to use an electronic device comfortably, a semiconductor device in which the amount of arithmetic operation is reduced to achieve low power consumption has been required.

Patent Document 1 discloses an addition method in which low-precision adders are used in parallel to operate as an adder with specific precision, and a structure of the adder.

REFERENCE

Patent Document

[Patent Document 1] Japanese Published Patent Application No. H9-222991

SUMMARY OF THE INVENTION

Problems to be Solved by the Invention

An electronic device in which IoT and AI are combined has a problem of reducing power. Moreover, a semiconductor device used in the electronic device has been required to be small in size so that it can be stored in a narrow space. Thus, the semiconductor device has a problem of reducing its circuit scale without decreasing the arithmetic processing capability.

In AI, particularly deep learning, for example, a feature can be extracted from a variety of information (such as images, audio, and big data) by using mechanical learning. AI includes a neural network, and the neural network includes a plurality of neurons. As neurons, product-sum operation processing that imitates the function of synapses has been known. It has been known that a circuit having a product-sum operation function calculates the sum of products obtained by multiplying a plurality of input signals by weight coefficients. The product-sum operation processing has a problem in that the logical scale increases because signed floating-point data is processed with digital arithmetic operation. There is a problem in that power consumption increases in proportion to the size of the logical scale.

In view of the above problems, an object of one embodiment of the present invention is to provide a signed integer addition method. Another object of one embodiment of the present invention is to provide a semiconductor device having a signed integer addition method. Another object of one embodiment of the present invention is to provide a semiconductor device in which power for arithmetic operation of neurons is reduced. Another object of one embodiment of the present invention is to provide a novel program. Another object of one embodiment of the present invention is to provide a novel calculation method. Another object of one embodiment of the present invention is to provide a novel semiconductor device. Another object of one embodiment of the present invention is to provide a novel method for driving a semiconductor device.

Note that the description of these objects does not preclude the existence of other objects. Note that in one embodiment of the present invention, there is no need to achieve all these objects. Other objects will be apparent from and can be derived from the description of the specification, the drawings, the claims, and the like.

Note that the objects of one embodiment of the present invention are not limited to the objects listed above. The objects listed above do not preclude the existence of other objects. The other objects are objects that are not described in this section and will be described below. The other objects not described in this section will be apparent from the description of the specification, the drawings, and the like and can be derived as appropriate from the description by those skilled in the art. One embodiment of the present invention achieves at least one object of the descriptions listed above and/or the other objects.

Means for Solving the Problems

One embodiment of the present invention includes a first memory, a second memory, a third memory, and a fourth memory. A step of supplying first data with a sign to the first memory; a step of supplying the first data with a positive sign stored in the first memory, to the second memory; a step of supplying the first data with a negative sign stored in the first memory, to the third memory; and a step of discarding the first data when the first data is zero are included. A step of generating second data by adding the first data with a positive sign stored in the second memory and the first data with a negative sign stored in the third memory is included. An addition method includes a step of storing the second data in the fourth memory; and a step of adding all the second data stored in the fourth memory either when the second data with a positive sign is not stored in the fourth memory or when the second data with a negative sign is not stored in the fourth memory.

In each of the above structures, the addition method is preferably such that the first data and the second data are signed integer data.

In each of the above structures, the addition method is preferably such that the second data is stored in the first memory.

A first memory, a second memory, a third memory, a selector circuit, a first adder circuit, a second adder circuit, and a counter circuit are included. The counter circuit includes a first counter and a second counter. The first memory is electrically connected to the first adder circuit and the selector circuit; the selector circuit is electrically connected to the second memory and the third memory; the second adder circuit is electrically connected to the second memory and the third memory; and the counter circuit is electrically connected to the first memory and the first adder circuit. The first memory has a function of being supplied with first data with a sign; the first counter and the second counter have a function of being supplied with an initial value; the second memory has a function of outputting a first underflow flag when there is no stored data; and the third memory has a function of outputting a second underflow flag when there is no stored data. The first data is supplied to the first memory and the counter circuit. In a semiconductor device, the counter circuit has a function of determining a value of the first counter or the second counter when the first underflow flag or the second underflow flag is supplied; and the first adder circuit has a function of adding the first data stored in the first memory when either the first counter or the second counter is at an initial value.

In each of the above structures, the semiconductor device is preferably such that the selector circuit has a function of assigning the first data with a positive sign stored in the first memory to the second memory, and the first data with a negative sign to the third memory; the second adder circuit has a function of generating second data by adding the first data with a positive sign stored in the second memory and the first data with a negative sign stored in the third memory; the second data is supplied to the first memory and the counter circuit; the counter circuit has a function of determining a value of the first counter or the second counter when the first underflow flag and the second underflow flag are supplied; and the first adder circuit has a function of adding the second data stored in the first memory when either the first counter or the second counter is at the initial value.

In each of the above structures, the semiconductor device is preferably such that the second memory and the third memory have a first-in-first-out function.

In each of the above structures, the semiconductor device includes a first zero insertion circuit and a second zero insertion circuit. The semiconductor device preferably has a function of being supplied with a value of zero by the first zero insertion circuit, instead of being supplied with the first data with a positive sign, when the first underflow flag is output and the second underflow flag is not output; and a function of being supplied with a value of zero by the second zero insertion circuit, instead of being supplied with the first data with a negative sign, when the second underflow flag is output and the first underflow flag is not output.

A semiconductor device includes a neural network; the neural network includes a product-sum operation circuit; and the product-sum operation circuit includes a plurality of multiplier circuits and a first circuit inhibiting overflow due to addition. The first circuit includes a first memory, a second memory, a third memory, and a first adder circuit; output data of the multiplier circuits are supplied to the first memory as first data; and the second memory and the third memory have a first-in-first-out function. In the semiconductor device, the first data with a positive sign stored in the first memory is supplied to the second memory; the first data with a negative sign stored in the first memory is supplied to the third memory; and the first adder circuit inhibits overflow due to addition, by adding the first data with a positive sign read from the second memory and the first data with a negative sign read from the third memory.

In each of the above structures, an electronic device including the semiconductor device having the addition method and a housing in which the semiconductor device is stored is preferable.

A semiconductor device includes a neural network; the neural network includes a multiplier circuit; and the multiplier circuit includes a first transistor to a fourth transistor. The multiplier circuit has a function of outputting a multiplication result as an output current by being supplied with a weight potential and a data potential. In the semiconductor device, the first transistor has a function of passing a first current by supply of a first potential to a gate of the first transistor; the second transistor has a function of passing a second current by supply of a second potential to a gate of the second transistor; the third transistor has a function of passing a third current by supply of a third potential to a gate of the third transistor; the fourth transistor has a function of passing a fourth current by supply of a fourth potential to a gate of the fourth transistor; and the multiplier circuit obtains an output current by subtracting the second current and the third current from the first current and adding the fourth current to the first current.

In each of the above structures, the semiconductor device is preferably such that the first potential is generated by adding a reference potential, the weight potential, and the data potential; the second potential is generated by adding the reference potential and the data potential; the third potential is generated by adding the reference potential and the weight potential; and the reference potential is supplied as the fourth potential.

In each of the above structures, the semiconductor device is preferably such that the multiplier circuit includes a memory cell, a reference cell, a first programming cell, and a second programming cell; the memory cell includes a first transistor; the reference cell includes a second transistor; the first programming cell includes a third transistor; the second programming cell includes a fourth transistor; the memory cell holds the first potential corresponding to the first current; the reference cell holds the second potential corresponding to the second current; the first programming cell holds the third potential corresponding to the third current; and the second programming cell holds the fourth potential corresponding to the fourth current.

Effect of the Invention

One embodiment of the present invention can provide a signed integer addition method. Another embodiment of the present invention can provide a semiconductor device having a signed integer addition method. Another embodiment of the present invention can provide a semiconductor device in which power for arithmetic operation of neurons is reduced. Another embodiment of the present invention can provide a novel program. Another embodiment of the present invention can provide a novel calculation method. Another embodiment of the present invention can provide a novel semiconductor device. Another embodiment of the present invention can provide a novel method for driving a semiconductor device.

Note that the effects of one embodiment of the present invention are not limited to the effects listed above. The effects listed above do not preclude the existence of other effects. The other effects are effects that are not described in this section and will be described below. The other effects not described in this section will be apparent from the description of the specification, the drawings, and the like and can be derived as appropriate from the description by those skilled in the art. One embodiment of the present invention has at least one effect of the effects listed above and/or the other effects. Therefore, one embodiment of the present invention does not have the effects listed above in some cases.

BRIEF DESCRIPTION OF DRAWINGS

FIG. 4 Diagrams illustrating an addition method.

MODE FOR CARRYING OUT THE INVENTION

Figure 1A:
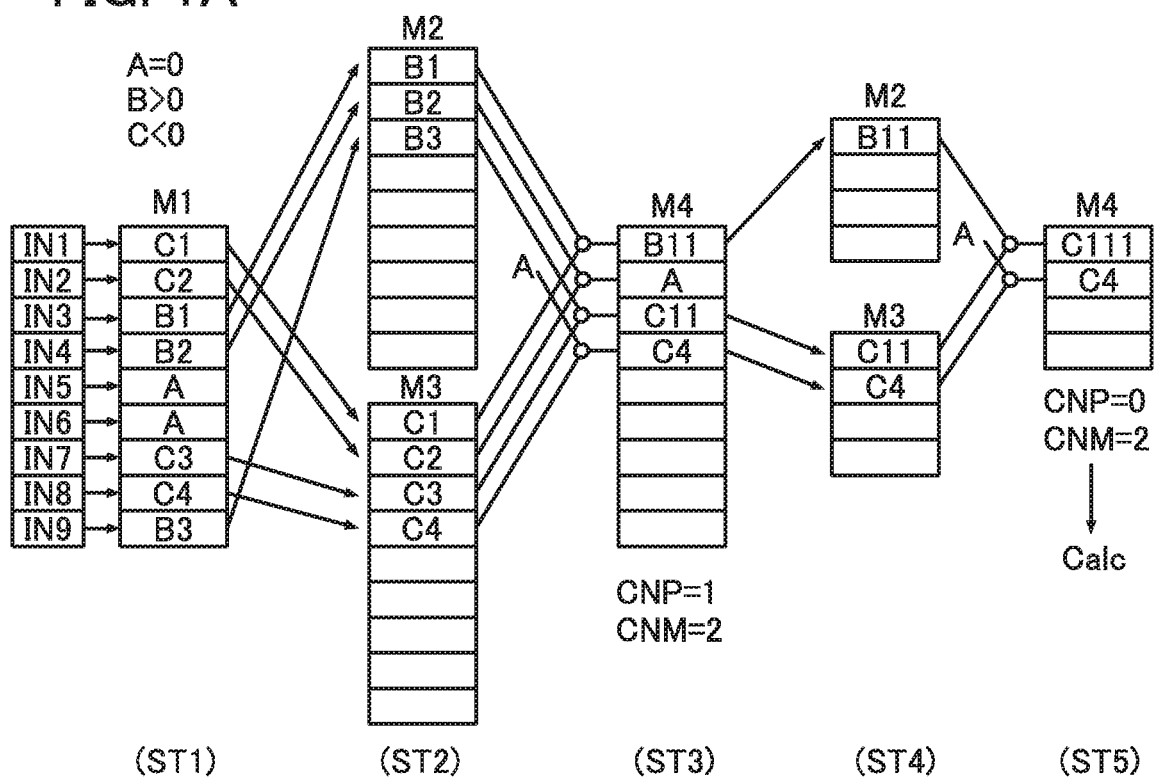
FIG. 1 Diagrams illustrating an addition method.

Hereinafter, embodiments will be described with reference to the drawings. Note that embodiments can be implemented with many different modes, and it will be readily appreciated by those skilled in the art that modes and details thereof can be changed in various ways without departing from the spirit and scope thereof. Therefore, the present invention should not be interpreted as being limited to the description of the embodiments below. Note that a content (or part of the content) described in one embodiment can be applied to, combined with, or replaced with another content (or part of the content) described in the embodiment and/or a content (or part of the content) described in another embodiment or other embodiments. Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

In the drawings, the size, the layer thickness, or the region is exaggerated for clarity in some cases. Therefore, they are not limited to the illustrated scale. Note that the drawings are schematic views showing ideal examples, and embodiments of the present invention are not limited to shapes or values shown in the drawings.

Note that ordinal numbers such as "first", "second", and "third" used in this specification are used in order to avoid confusion among components, and the terms do not limit the components numerically.

In this specification, terms for describing arrangement, such as "over" and "under", are used for convenience in describing a positional relationship between components with reference to drawings. The positional relation between components is changed as appropriate in accordance with a direction in which the components are described. Thus, terms for the description are not limited to those used in this specification, and description can be made appropriately depending on the situation.

In this specification and the like, a transistor is an element having at least three terminals of a gate, a drain, and a source. The transistor has a channel region between the drain (a drain terminal, a drain region, or a drain electrode) and the source (a source terminal, a source region, or a source electrode), and can make current flow between the source and the drain through the channel formation region. Note that in this specification and the like, a channel region refers to a region through which current mainly flows.

Furthermore, functions of a source and a drain might be switched when a transistor of opposite polarity is employed or a direction of current flow is changed in circuit operation, for example. Thus, the terms of source and drain are interchangeably used in this specification and the like.

In this specification and the like, "electrically connected" includes the case where connection is made through an "object having any electric function". Here, there is no particular limitation on the "object having any electric function" as long as electric signals can be transmitted and received between the connected components. Examples of the "object having any electric function" include a switching element such as a transistor, a resistor, an inductor, a capacitor, and other elements having a variety of functions as well as an electrode and a wiring.

In this specification and the like, "parallel" indicates a state where two straight lines are placed at an angle of greater than or equal to −10° and less than or equal to 100. Thus, the case where the angle is greater than or equal to −50 and less than or equal to 50 is also included. Moreover, "perpendicular" indicates a state where two straight lines are placed at an angle of greater than or equal to 800 and less than or equal to 1000. Thus, the case where the angle is greater than or equal to 850 and less than or equal to 950 is also included.

In this specification and the like, the term "film" and the term "layer" can be interchanged with each other. For example, the term "conductive layer" can be changed into the term "conductive film" in some cases. For another example, the term "insulating film" can be changed into the term "insulating layer" in some cases.

Unless otherwise specified, an off-state current in this specification and the like refers to a drain current of a transistor in an off state (also referred to as a non-conducting state or a cutoff state). Unless otherwise specified, the off state of an n-channel transistor refers to a state where the voltage Vgs between its gate and source is lower than the threshold voltage Vth, and the off state of a p-channel transistor refers to a state where the voltage Vgs between its gate and source is higher than the threshold voltage Vth. For example, the off-state current of an n-channel transistor sometimes means a drain current at the time when the voltage Vgs between its gate and source is lower than the threshold voltage Vth.

The off-state current of a transistor depends on Vgs in some cases. Thus, "the off-state current of a transistor is lower than or equal to I" sometimes means that there is Vgs with which the off-state current of the transistor becomes lower than or equal to I. The off-state current of a transistor sometimes refers to the off-state current in an off state at predetermined Vgs, in an off state at Vgs in a predetermined range, in an off state at Vgs with which sufficiently reduced off-state current is obtained, or the like.

As an example, the assumption is made of an n-channel transistor where the threshold voltage Vth is 0.5 V, and the drain current at Vgs of 0.5 V is $1 \times 10^{-9}$ A, the drain current at Vgs of 0.1 V is $1 \times 10^{-13}$ A, the drain current at Vgs of $-0.5$ V is $1 \times 10^{-19}$ A, and the drain current at Vgs of $-0.8$ V is $1 \times 10^{-22}$ A. The drain current of the transistor is lower than or equal to $1 \times 10^{-19}$ A at Vgs of $-0.5$ V or at Vgs in the range of $-0.5$ V to $-0.8$ V; therefore, it is sometimes said that the off-state current of the transistor is lower than or equal to $1 \times 10^{-19}$ A. Since there is Vgs at which the drain current of the transistor is lower than or equal to $1 \times 10^{-22}$ A, it is sometimes said that the off-state current of the transistor is lower than or equal to $1 \times 10^{-22}$ A.

In this specification and the like, the off-state current of a transistor having a channel width W is sometimes represented by the value of flowing current per channel width W. Alternatively, it is sometimes represented by the value of flowing current per given channel width (e.g., 1 µm). In the latter case, the off-state current may be expressed in the unit with the dimension of current per length (e.g., A/µm).

The off-state current of a transistor depends on temperature in some cases. Unless otherwise specified, the off-state current in this specification may be off-state current at room temperature, 60° C., 85° C., 95° C., or 125° C. Alternatively, the off-state current may be off-state current at a temperature at which reliability of a semiconductor device or the like including the transistor is ensured or a temperature at which a semiconductor device or the like including the transistor is used (e.g., any temperature in the range of 5° C. to 35° C.). The description "the off-state current of the transistor is lower than or equal to I" sometimes means that there is Vgs at which the off-state current of a transistor is lower than or equal to I at room temperature, 60° C., 85° C., 95° C., 125° C., a temperature at which reliability of a semiconductor device or the like including the transistor is ensured, or a temperature at which the semiconductor device or the like including the transistor is used (e.g., any temperature in the range of 5° C. to 35° C.).

The off-state current of a transistor depends on the voltage Vds between its drain and source in some cases. Unless otherwise specified, the off-state current in this specification may be off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current may be off-state current at Vds at which reliability of a semiconductor device or the like including the transistor is ensured or Vds used in the semiconductor device or the like including the transistor. The description "the off-state current of the transistor is lower than or equal to I" sometimes means that there is Vgs at which the off-state current of a transistor is lower than or equal to I at Vds of 0.1 V, 0.8 V, 1 V, 1.2 V, 1.8 V, 2.5 V, 3 V, 3.3 V, 10 V, 12 V, 16 V, or 20 V, at Vds at which reliability of a semiconductor device or the like including the transistor is ensured, or at Vds used in the semiconductor device or the like including the transistor.

In the above description of off-state current, a drain may be replaced with a source. That is, the off-state current sometimes means current that flows through a source of a transistor in an off state.

In this specification and the like, leakage current sometimes expresses the same meaning as off-state current. Furthermore, in this specification and the like, the off-state current sometimes refers to current that flows between a source and a drain of a transistor in an off state, for example.

Note that voltage refers to a potential difference between two points, and potential refers to electrostatic energy (electric potential energy) of a unit charge at a given point in an electrostatic field. Note that in general, a potential difference between a potential of one point and a reference potential (e.g., a ground potential) is simply called potential or voltage, and potential and voltage are used as synonymous words in many cases. Therefore, in this specification, potential may be rephrased as voltage and voltage may be rephrased as potential unless otherwise specified.

Embodiment 1

In this embodiment, an addition method with which overflow is inhibited and a semiconductor device having a function of the addition method will be described with reference to FIG. 1 to FIG. 4.

In AI, for example, deep learning, features can be learned from a variety of information (such as images, audio, and big data) by using mechanical learning. Note that for learning, arithmetic processing such as multiplication, addition, and subtraction of a large amount of data is required. Thus, in AI, arithmetic operation is preferably performed using a semiconductor device including a neural network in terms of learning speed or power consumption. For example, a neural network is known to include neurons simulating a human brain. The operation of the neurons can be replaced with a product-sum operation function. That is, a product-sum operation circuit is preferably used to achieve a function of neurons. Note that part of the arithmetic operation may be performed by software (a program).

A product-sum operation circuit includes a plurality of multiplier circuits and an adder circuit for adding positive integers or negative integers that are multiplication results. As an example of the product-sum operation circuit, a circuit that performs signed floating-point arithmetic operation or a circuit that performs signed integer arithmetic operation is preferable. Note that with the use of the signed floating-point arithmetic operation, a more accurate information feature can be extracted; however, the scale of the product-sum operation circuit increases and the power consumption also increases. With the signed integer arithmetic operation, the structure of the product-sum operation circuit can be made smaller. A smaller product-sum operation circuit results in a smaller semiconductor device including the product-sum operation circuit, so that power consumption can be reduced.

In the signed integer arithmetic operation, when positive integers or negative integers are added, overflow may occur in an adder circuit depending on the order of addition. Note that depending on the order of addition, overflow does not occur and the solution can be obtained in the range of the number of digits of the adder circuit. In other words, in an adder circuit dealing with a large amount of data, overflow prevention is important to obtain accurate arithmetic operation results. In this embodiment, an addition method with which overflow is inhibited, a semiconductor device using the addition method, and a program (software) therefor will be described.

First, an addition method with which overflow is inhibited will be described with reference to FIG. 1(A). As an example, a memory M1, a memory M2, a memory M3, and a memory M4 are included in FIG. 1(A). Here, the memory M4 is used for the description; alternatively, the memory M1 may be reused instead of the memory M4. Moreover, a register may be used instead of the memory M1 and the memory M4. Note that the memory M1, the memory M2, the memory M3, and the memory M4 may be separately provided in different memory chips, or at least two of them may be provided in the same memory chip. Alternatively, the memory M1, the memory M2, the memory M3, and the memory M4 may be provided in the same memory chip and assigned to different memory regions.

As illustrated in FIG. 1(A), steps from ST1 to ST5 are included. FIG. 1(A) shows an example in which first, in the step ST1, a data group 1 is supplied as input data IN1 to IN9 to the memory M1 from a sensor, an output circuit, a CPU, or the like. Here, the data group 1 is described. The data group 1 is preferably classified into a plurality of ranges. For example, a range A is a value of 0 (zero), a range B includes positive integer values, and a range C includes negative integer values.

As for the value of one data in the data group 1 supplied to the memory M1, for example, "A" represents zero, "B1" represents a positive value, and "C1" represents a negative value. That is, a positive integer is a number having a value within the range B and is indicated with an initial letter "B", such as "B1", "B2", and "B3". A number following "B" represents not a value but a symbol for distinguishing data. Similarly, a negative integer is a number having a value within the range C and is indicated with an initial letter "C", such as "C1", "C2", and "C3". A number following "C" represents a symbol for distinguishing data.

Next, in the step ST2, positive signed data in the range B stored in the memory M1 are stored in the memory M2. For example, "B1", "B2", and "B3", which are data in the range B, are stored in the memory M2. Negative signed data in the range C stored in the memory M1 are stored in the memory M3. For example, "C1", "C2", "C3", and "C4", which are data in the range C, are stored in the memory M3. Note that when data in the data group 1 stored in the memory M1 is zero, the data may be discarded. Alternatively, the data may be supplied to either the memory M2 or the memory M3. Note that after the data group 1 is stored in the memory M2 and the memory M3, the memory M1 is preferably initialized with data in the range A. Thus, the memory M1 preferably has a reset function. For example, in the case where the memory M1 has a register architecture, it is easy to implement a reset function. Note that in the case where a value can be overwritten when new data is stored in the memory M1, the memory M1 does not necessarily have a reset function.

Next, in the step ST3, data is read from each of the memory M2 storing the positive signed data and the memory M3 storing the negative signed data, and addition is performed.

For example, the data "B1" and the data "C1" are read from the memory M2 and the memory M3, respectively, and are added. Thus, "B1" with a positive sign and "C1" with a negative sign are added. The addition result is a number closer to zero than "B1" or "C1" is. That is, the absolute value of the addition result is smaller than "B1". Alternatively, the absolute value of the addition result is smaller than the absolute value of "C1". For example, in the case where the absolute value of the data "B1" is larger than the absolute value of the data "C1", the addition result is data "B11" with a positive sign.

Here, "B11" is described. "B11" denotes that the result of adding the positive integer "B1" stored in the memory M2 and the negative integer "C1" stored in the memory M3 is a number having a value within the range B, and a two-digit number following "B" as in "B11", "B12", "B13", or the like represents a symbol for distinguishing data.

When "B2" with a positive sign and "C2" with a negative sign are added, the addition result is a number closer to zero than "B2" or "C2" is. That is, the absolute value of the addition result is smaller than "B2". Alternatively, the absolute value of the addition result is smaller than the absolute value of "C2". For example, when the absolute value of each data is the same, the addition result is zero, which is the data "A". When "B3" with a positive sign and "C3" with a negative sign are added, the addition result is a number closer to zero than "B3" or "C3" is. That is, the absolute value of the addition result is smaller than "B3". Alternatively, the absolute value of the addition result is smaller than the absolute value of "C3". For example, when the absolute value of the data "C3" is larger than the absolute value of the data "B3", the addition result is data "C11" with a negative sign. Although the memory M3 includes the data "C4", the memory M2 does not include data to be added. When there is no data as in this case, the data "A" is substituted as alternative data, and "A" and "C4" are added. Thus, the addition result is the data "C4". Alternatively, when there is no data to be added, the data "C4" without change is regarded as the addition result.

Here, "C11" is described. "C11" denotes that the result of adding the positive integer "B3" stored in the memory M2 and the negative integer "C3" stored in the memory M3 is a number having a value within the range C, and a two-digit number following "C" as in "C11", "C12", "C13", or the like represents a symbol for distinguishing data.

In this manner, the addition results are stored in the memory M4 as a data group 2. At this time, the data group 2 may be stored in the memory M1. Storing the data group 2 in the memory M1 results in a smaller circuit scale and lower power consumption. Note that in the case of storing the data group 2 in the memory M1, the number of data is smaller than that in the step ST1. For that reason, as described above, it is preferable to initialize data in the memory M1 before the data is stored in the memory M1.

The data group 2 includes positive signed data, negative signed data, and zero data. When the data are stored in the memory M4, it is preferable to count the number of positive signed data and the number of negative signed data. At this time, a counter CNP counts the number of positive signed data, and a counter CNM counts the number of negative signed data. For example, in ST3, the count values are the counter CNP=1 and the counter CNM=2. Note that the counter CNP and the counter CNM are preferably initialized at a given timing and with a given initial value.

When data is stored in the memory M4 from the memory M2 or the memory M3, the counter value of the counter CNP or the counter CNM is determined. When either the counter CNP or the counter CNM remains at an initial value without an update, the entire data group 2 stored in the memory M4 can be added. Then, in that case, the calculation processing ends after all are added.

In the case where the counter CNP and the counter CNM are updated, in the next step ST4, the positive signed data in the data group 2 stored in the memory M4 can be stored in the memory M2, and the negative signed data therein can be stored in M3. For example, the positive signed data "B11", which is the data in the range B, is stored in the memory M2. The negative signed data "C11" and "C4", which are the data in the range C, are stored in the memory M3. Although the positive signed data is stored in the memory M2 in the diagram, it may be stored in another memory, for example, a memory M5. Similarly, although the negative signed data are stored in the memory M3 in the diagram, they may be stored in another memory, for example, a memory M6. Note that in the case of storing data in the memory M2, the number of data is smaller than that in the step ST2. For that reason, it is preferable to initialize data in the memory M2 before data is stored in the memory M2. Moreover, it is preferable to initialize data in the memory M3.

Next, in the step ST5, the data "B11" and the data "C11" are read from the memory M2 and the memory M3, respectively, and are added. That is, "B11" with a positive sign and "C11" with a negative sign are added. The addition result is a number closer to zero than "B11" or "C11" is. That is, the absolute value of the addition result is smaller than "B11". Alternatively, the absolute value of the addition result is smaller than the absolute value of "C11". For example, in the case where the absolute value of the data "C11" is larger than the absolute value of the data "B11", the addition result is data "C111" with a negative sign. Next, when the memory M2 does not include data to be added although the memory M3 includes the data "C4", the data "A" is substituted as alternative data, and "A" and "C4" are added. Alternatively, "C4" without change is regarded as the addition result. Thus, the addition result is the data "C4".

Here, "C111" is described. "C111" denotes that the result of adding the positive integer "B11" stored in the memory M2 and the negative integer "C11" stored in the memory M3 is a number having a value within the range C, and a three-digit number following "C" as in "C111", "C112", "C113", or the like represents a symbol for distinguishing data. Although not exemplified in FIG. 1(A), when the result of adding positive signed data stored in the memory M2 and negative signed data stored in the memory M3 is a number having a value within the range B, it is denoted as "B111", "B112", "B113", or the like; a three-digit number following "B" represents a symbol for distinguishing data.

The addition results are stored in the memory M4 as a data group 3. At this time, the data group 3 may be stored in the memory M1. Note that in the case of storing the data group 3 in the memory M1, it is preferred that data in the memory M1 have been initialized. Storing the data group 3 in the memory M1 results in a smaller circuit scale and lower power consumption. Note that in the case of storing the data group 3 in the memory M4, the number of data is smaller than that in the step ST3. For that reason, as described above, it is preferable to initialize data in the memory M4 before the data is stored in the memory M4.

For example, in ST5, the count values are the counter CNP=0 and the counter CNM=2. This means that the counter CNP remains at the initial value without an update; hence, the entire data group 3 stored in the memory M4 is added, and the arithmetic processing ends.

The use of the addition method such as the above can inhibit overflow that would occur when a plurality of pieces of signed data are added. Overflow prevention can inhibit data degradation due to addition processing. Note that in FIG. 1(A), data is temporarily stored in the memory M2 and the memory M3 as in the step ST2 and the step ST4; however, one embodiment of the present invention is not limited thereto. For example, data may be selected among each of data in the input range B and data in the input range C from the memory M1 or the memory M4, added, and stored in the memory M4.

Figure 1B:
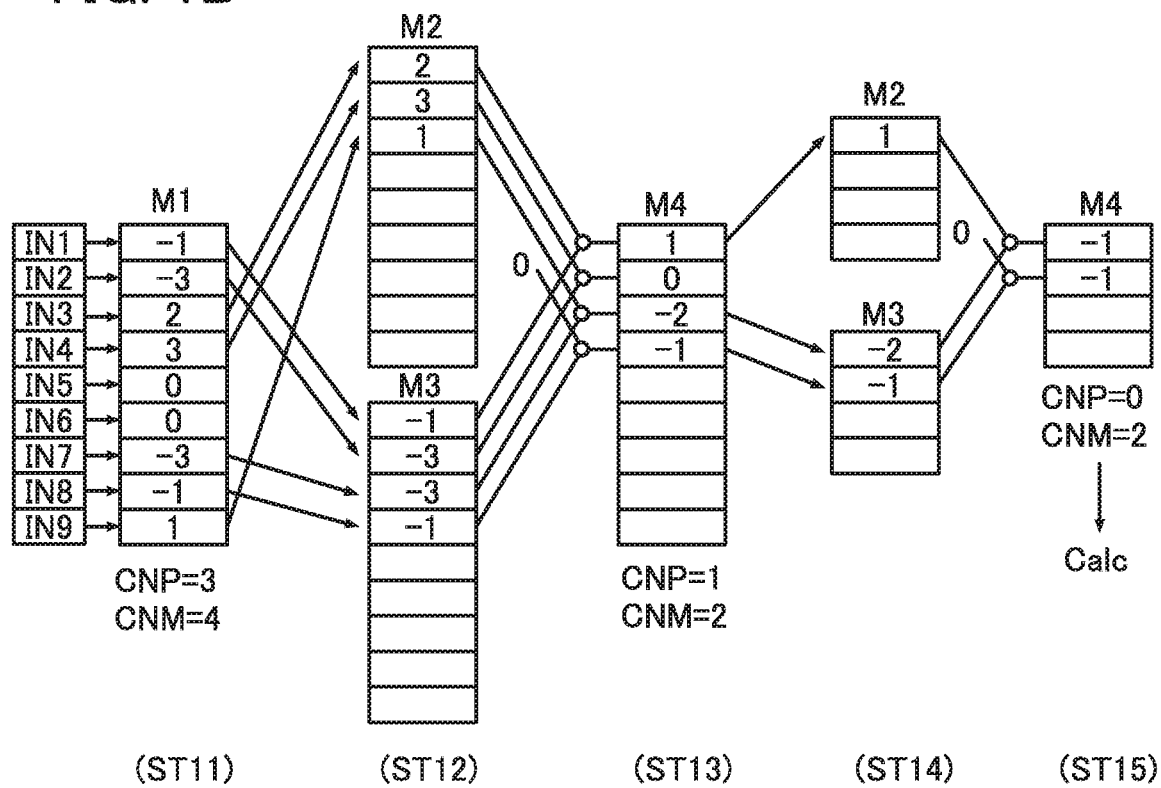

FIG. 1(B) illustrates an example in which actual numbers are applied to the addition method (from the step ST1 to the step ST5) described with FIG. 1(A). In the example, first, in a step ST11, the memory M1 is supplied with the data group 1 from IN1 to IN9. As an example, "−1", "−3", "2", "3", "0", "0", "−3", "−1", and "1" are supplied to the memory M1. Although not described with FIG. 1(A), the count values may be monitored using the counter CNP and the counter CNM. For example, the counter CNP=3 and the counter CNM=4 are shown in the step ST11 in FIG. 1(B).

For example, a range of positive integers from 1 to 3 is applied as the range B, and a range of negative integers from −1 to −3 is applied as the range C. That is, the case of exceeding the range B or the range C (being smaller than −3 or larger than 3) is regarded as overflow. For example, when "−1" and "−3" are added in the order of the data stored in the memory M1, the addition result is "−4", resulting in overflow. However, as illustrated in FIG. 1(A) and FIG. 1(B), in the method of adding a positive signed integer and a negative signed integer, the addition result is close to zero, so that occurrence of overflow can be inhibited.

Next, in a step ST12, the positive signed data stored in the memory M1 are stored in the memory M2. The negative signed data stored in the memory M1 are stored in the memory M3. That is, "2", "3", and "1" are stored in the memory M2. Moreover, "−1", "−3", "−3", and "−1" are stored in the memory M3.

Next, in a step ST13, data is read from each of the memory M2 storing the positive signed data and the memory M3 storing the negative signed data, and addition is performed. That is, "2" stored in the memory M2 and "−1" stored in the memory M3 are added. The addition result "1" is stored in the memory M4. Then, "3" stored in the memory M2 and "−3" stored in the memory M3 are added. The addition result "0" is stored in the memory M4. Then, "1" stored in the memory M2 and "−3" stored in the memory M3 are added. The addition result "−2" is stored in the memory M4. Then, since there is no data stored in the memory M2, zero is supplied instead and added to "−1" stored in the memory M3. Alternatively, "−1" stored in the memory M3 is output without change. The addition result "−1" is stored in the memory M4. Note that when the addition result is "0", it is not necessarily stored in the memory M4.

At this time, the counter value of positive signed integers shows the counter CNP=1, and the counter value of negative signed integers shows the counter CNM=2. Accordingly, in order to perform addition again, data in the memory M4 are sorted and stored in the memory M2 and the memory M3.

Next, in a step ST14, "1" is stored in the memory M2, and "−2" and "−1" are stored in the memory M3.

Next, in a step ST15, "1" stored in the memory M2 and "−2" stored in the memory M3 are added. The addition result "−1" is stored in the memory M4. Then, since there is no data stored in the memory M2, zero is supplied instead and added to "−1" stored in the memory M3. Alternatively, "−1" stored in the memory M3 is output without change. The addition result "−1" is stored in the memory M4.

In ST15, the count values are the counter CNP=0 and the counter CNM=2. This means that the counter CNP remains at the initial value without an update; hence, all the data stored in the memory M4 are added. As a result, the addition result "−2" can be calculated. Therefore, this is an addition method in which a positive signed integer and a negative signed integer are sequentially combined and added, whereby data degradation due to overflow is inhibited and an accurate solution can be calculated.

Figure 2A:
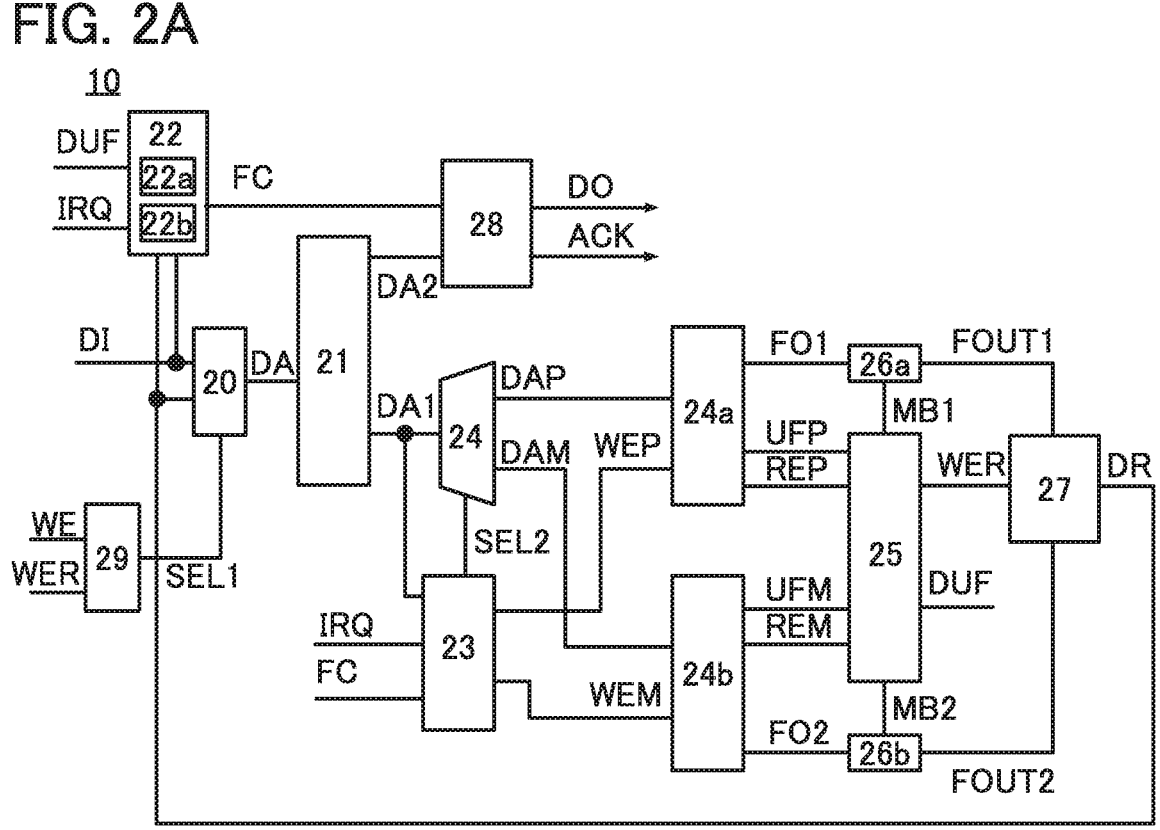
FIG. 2 Circuit diagrams illustrating a semiconductor device.

FIG. 2(A) is a circuit diagram illustrating an adder circuit 10 having a function of the addition method illustrated in FIG. 1(A). The adder circuit 10 includes a selector 20, a memory 21, a counter 22, a control circuit 23, a selector 24, a memory 24a, a memory 24b, a control circuit 25, a zero insertion circuit 26a, a zero insertion circuit 26b, an adder circuit 27, an adder circuit 28, and a gate circuit 29. The counter 22 includes a counter CNP 22a and a counter CNM 22b. The adder circuit 10 also includes a signal line DI, a signal line DR, a signal line DA, a signal line DA1, a signal line DA2, a signal line DAP, a signal line DAM, a signal line FO1, a signal line FO2, a signal line FOUT1, a signal line FOUT2, a signal line DO, a signal line SEL1, a signal line SEL2, a signal line WEP, a signal line WEM, a signal line UFP, a signal line UFM, a signal line REP, a signal line REM, a signal line WER, a signal line FC, a signal line DUF, a signal line MB1, a signal line MB2, a signal line WE, a signal line IRQ, and a signal line ACK.

The selector 20 is electrically connected to the memory 21 through the signal line DA. The selector 20 is electrically connected to the counter 22 through the signal line DI and is electrically connected to the gate circuit 29 through the signal line SEL1.

The memory 21 is electrically connected to the selector 24 through the signal line DA1. The selector 24 is electrically connected to the memory 24a through the signal line DAP and is electrically connected to the memory 24b through the signal line DAM.

The control circuit 23 is electrically connected to the memory 21 through the signal line DA1. The control circuit 23 is electrically connected to the selector 24 through the signal line SEL2. The control circuit 23 is electrically connected to the memory 24a through the signal line WEP and is electrically connected to the memory 24b through the signal line WEM.

The memory 24a is electrically connected to the zero insertion circuit 26a through the signal line FO1. The memory 24b is electrically connected to the zero insertion circuit 26b through the signal line FO2.

The control circuit 25 is electrically connected to the memory 24a through the signal line UFP and the signal line REP, and is electrically connected to the memory 24b through the signal line UFM and the signal line REM. The control circuit 25 is electrically connected to the zero insertion circuit 26a through the signal line MB1, and is electrically connected to the zero insertion circuit 26b through the signal line MB2. The control circuit 25 is electrically connected to the counter 22 through the signal line DUF, and is electrically connected to the adder circuit 27 and the gate circuit 29 through the signal line WER.

The adder circuit 27 is electrically connected to the zero insertion circuit 26a through the signal line FOUT1 and is electrically connected to the zero insertion circuit 26b through the signal line FOUT2. The adder circuit 27 is electrically connected to the selector 20 and the counter 22 through the signal line DR.

The signal line IRQ is electrically connected to the counter 22 and the control circuit 23. The adder circuit 10 outputs the signal line ACK and the signal line DO.

Next, each function will be described. The selector 20 can select one of the input data DI and the output DR of the adder circuit 27 in accordance with a signal supplied to the signal line SEL1 and output it to the signal line DA. The signal supplied to the signal line SEL1 is generated by the signal line WE for writing to the memory 21 or the signal line WER for writing the output DR of the adder circuit 27. Note that the memory 21 corresponds to the memory M1 in FIG. 1.

The memory 21 may be a storage circuit such as a DRAM (Dynamic Random Access Memory) or an SRAM (Static Random Access Memory), or may be composed of registers. The memory 21 preferably has a reset function or a read reset function. With a reset function, all data stored in the memory can be set to a given initial value at a given timing. Read reset is an initialization function after reading in the case of reading data of an accessed memory address.

The counter 22 includes the counter CNP 22a that counts the number of positive signed integers in each of data supplied to the signal line DI and data supplied to the signal line DR, and the counter CNM 22b that counts the number of negative signed integers therein. The counter 22 preferably has a reset function and an enable function. The counter 22 is preferably reset by a signal supplied to the signal line DUF. A signal supplied to the signal line IRQ enables the counter 22, and the counter 22 starts counting up when enabled.

The control circuit 23 can move data stored in the memory 21 to the memory 24a and the memory 24b through the selector 24. The control circuit 23 can assign data stored in the memory 21 to the memory 24a and the memory 24b in accordance with a signal supplied to the signal line SEL2. For example, when data moved from the memory 21 has a positive sign, the control circuit 23 can make it stored in the memory 24a through the signal line DAP. When data moved from the memory 21 has a negative sign, the control circuit 23 can make it stored in the memory 24b through the signal line DAM. In addition, the control circuit 23 preferably has a function of discarding zero data when data of the signal line DA1 is zero.

The memory 21, the memory 24a, and the memory 24b preferably have a first-in-first-out function. The memory 21, the memory 24a, and the memory 24b can output an underflow flag when there is no data. Having a first-in-first-out function results in the addition of a read reset function. In FIG. 2, the description is made given that the memory 24a and the memory 24b have a first-in-first-out function. Although the memory size of the memory 21, the memory 24a, and the memory 24b can be determined as appropriate, the memory 21 is preferably larger than the memory 24a and the memory 24b. Note that the memory 24a corresponds to the memory M2 in FIG. 1, and the memory 24b corresponds to the memory M3 in FIG. 1.

The control circuit 25 can monitor the states of an underflow flag that the memory 24a outputs to the signal line UFP and an underflow flag that the memory 24b outputs to the signal line UFM. Moreover, data can be read from the memory 24a and the memory 24b, supplied to the adder circuit 27, and added. Note that when the memory 24a outputs an underflow flag to the signal line UFP, the zero insertion circuit 26a outputs zero as alternative data. Similarly, when the memory 24b outputs an underflow flag to the signal line UFM, the zero insertion circuit 26b supplies zero as alternative data.

The result of the adder circuit is stored in the memory 21 through the signal line DR. At this time, the counter 22 makes the counter CNP 22a count up when the addition result has a positive sign, and makes the counter CNM 22b count up when the addition result has a negative sign. When both the memory 24a and the memory 24b output an underflow flag, the control circuit 25 outputs a signal to the signal line DUF. In accordance with the signal supplied to the signal line DUF, the counter 22 stops the counter CNP 22a and the counter CNM 22b and determines them. The determination results are notified to the control circuit 23 and the adder circuit 28 through the signal line FC. As the determination results is to be notified, it is preferred that the first result be whether underflow occurs in either of the counter CNP 22a or the counter CNM 22b, and the second result be a count value of the counter in which underflow does not occur.

When either the counter CNP 22a or the counter CNM 22b remains at an initial value, the counter 22 can determine that the data stored in the memory 21 have the same sign (including zero). When either the counter CNP 22a or the counter CNM 22b is at the initial value, the adder circuit 28 reads data through the signal line DA2 and performs addition. After the arithmetic operation ends, the adder circuit 28 can notify a CPU or the like of the end of the arithmetic operation with a signal supplied to the signal line ACK. At this time, the addition result is output to the signal line DO; it is preferred that the signal line DO be latched to hold the information. Furthermore, the signal line DO and the signal line ACK preferably have a read reset function.

When the counter CNP 22a and the counter CNM 22b count up, it can be determined that data with different signs are stored in the memory 21. In that case, arithmetic operation of addition is executed again by the control circuit 23.

Accordingly, a peripheral circuit such as a CPU makes a plurality of pieces of data to be added to the adder circuit 10 stored in the memory 21 and supplies a signal to the signal line IRQ, thereby starting arithmetic processing of the adder circuit 10. When the arithmetic operation ends, the adder circuit 10 notifies the peripheral circuit such as the CPU of the end of the arithmetic operation by supplying a signal to the signal line ACK. In other words, the arithmetic operation result can be obtained by setting data and executing an arithmetic operation command. In a period during which the adder circuit 10 performs arithmetic operation, the peripheral circuit such as the CPU can perform different processing. A semiconductor device includes the adder circuit 10 having the addition method by which overflow is inhibited by adding a positive integer and a negative integer and the amount of arithmetic operation can be reduced by discarding zero data of arithmetic operation results.

Figure 2B:
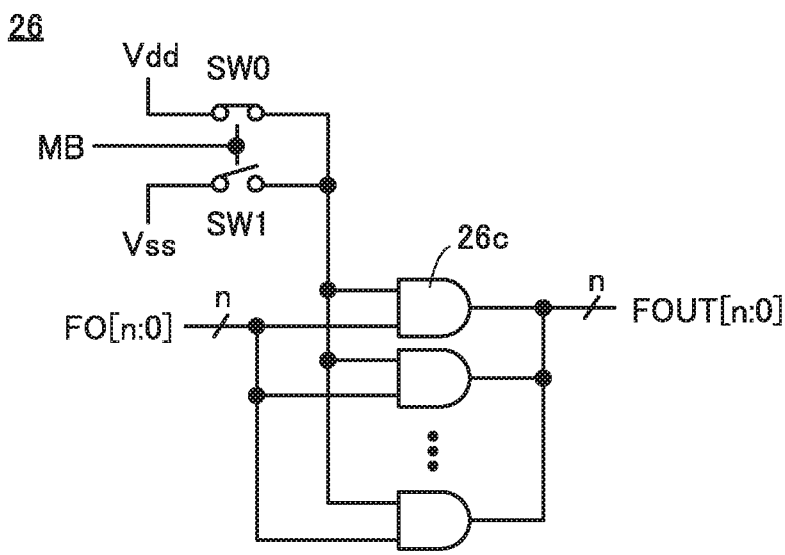

FIG. 2(B) is a circuit diagram illustrating a zero insertion circuit 26 (the zero insertion circuits 26a and 26b) in detail. The zero insertion circuit 26 includes a plurality of gate circuits 26c, a switch SW0, and a switch SW1. The gate circuit 26c has two input terminals and one output terminal. The output terminal of the gate circuit 26c is electrically connected to any one of signal lines FOUT[n:0]. One of the input terminals of the gate circuit 26c is electrically connected to any one of signal lines FO[n:0]. The other input terminal is electrically connected to one electrode of the switch SW0 and one electrode of the switch SW1. The other electrode of the switch SW0 is electrically connected to a wiring Vdd, and the wiring Vdd is preferably supplied with a high power supply voltage for the adder circuit 10. The other electrode of the switch SW1 is electrically connected to a wiring Vss, and the wiring Vss is preferably supplied with a low power supply voltage for the adder circuit 10, for example, GND.

The switch SW0 and the switch SW1 are controlled by a signal supplied to a signal line MB. It is preferred that the switch SW0 and the switch SW1 operate exclusively. The gate circuit 26c can turn on the switch SW0 by a signal supplied to the signal line MB and turn off the switch SW1 in the same period. The same signal as a signal supplied to the signal line FO can be output to the output terminal. Moreover, the gate circuit 26c can turn off the switch SW0 by a signal supplied to the signal line MB and turn on the switch SW1 in the same period. Thus, zero is supplied to the signal line FOUT. That is, the gate circuit 26c can convert given data supplied to the signal line FO into zero.

One embodiment of the present invention is not limited to the above-described adder circuit and may be achieved using a program, for example. That is, the addition method of one embodiment of the present invention may be implemented by software instead of hardware.

Figure 3A:
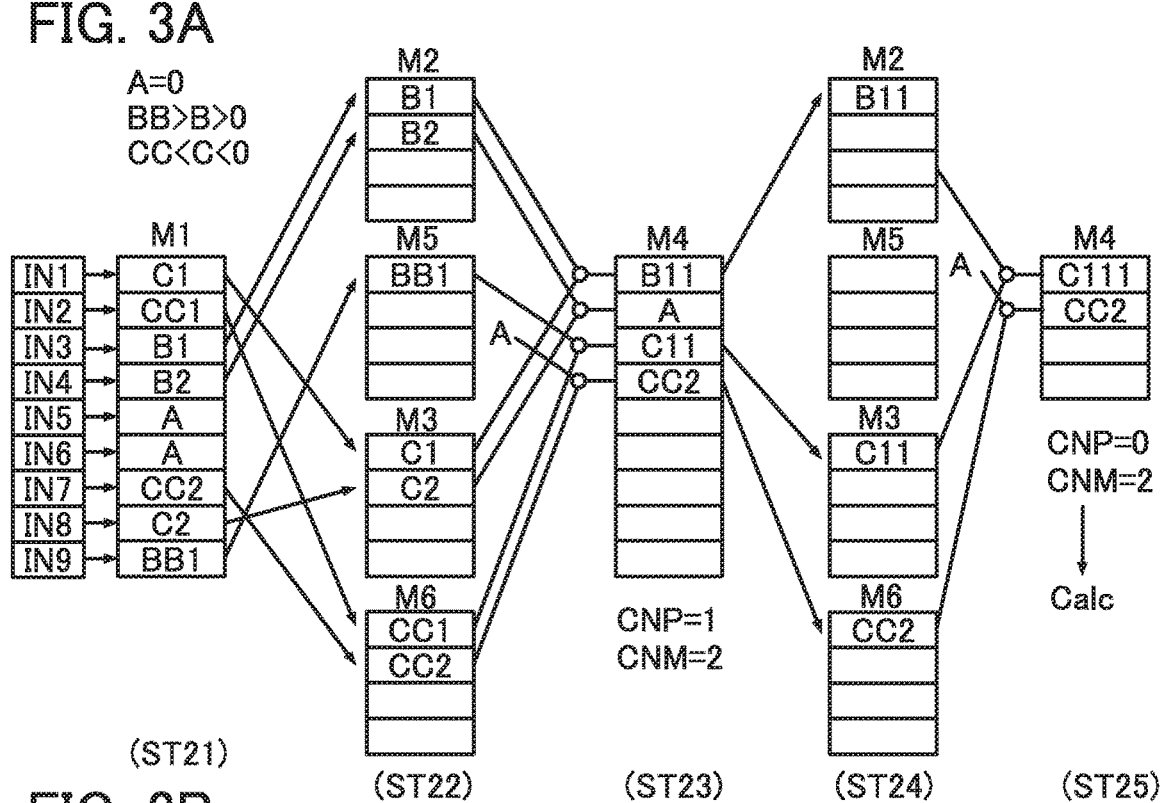
FIG. 3 (A) A diagram illustrating an addition method. (B) A circuit diagram illustrating a semiconductor device.

FIG. 3(A) is a diagram illustrating an addition method with which overflow is inhibited and which has a structure different from that in FIG. 1(A).

FIG. 3(A) differs from FIG. 1(A) in including the memory M5 and the memory M6. Unlike in FIG. 1(A), input data or data after arithmetic operation can be classified into a plurality of narrower ranges. For example, a classification range of positive integers can be divided into a range B and a range BB. The range BB includes a larger value than the range B. In addition, a classification range of negative integers can be divided into a range C and a range CC. The range CC includes a smaller value than the range C. With such fine classification, when addition is performed, the addition result can be a smaller value. Thus, occurrence of overflow at the time of addition can be further inhibited.

Figure 3B:
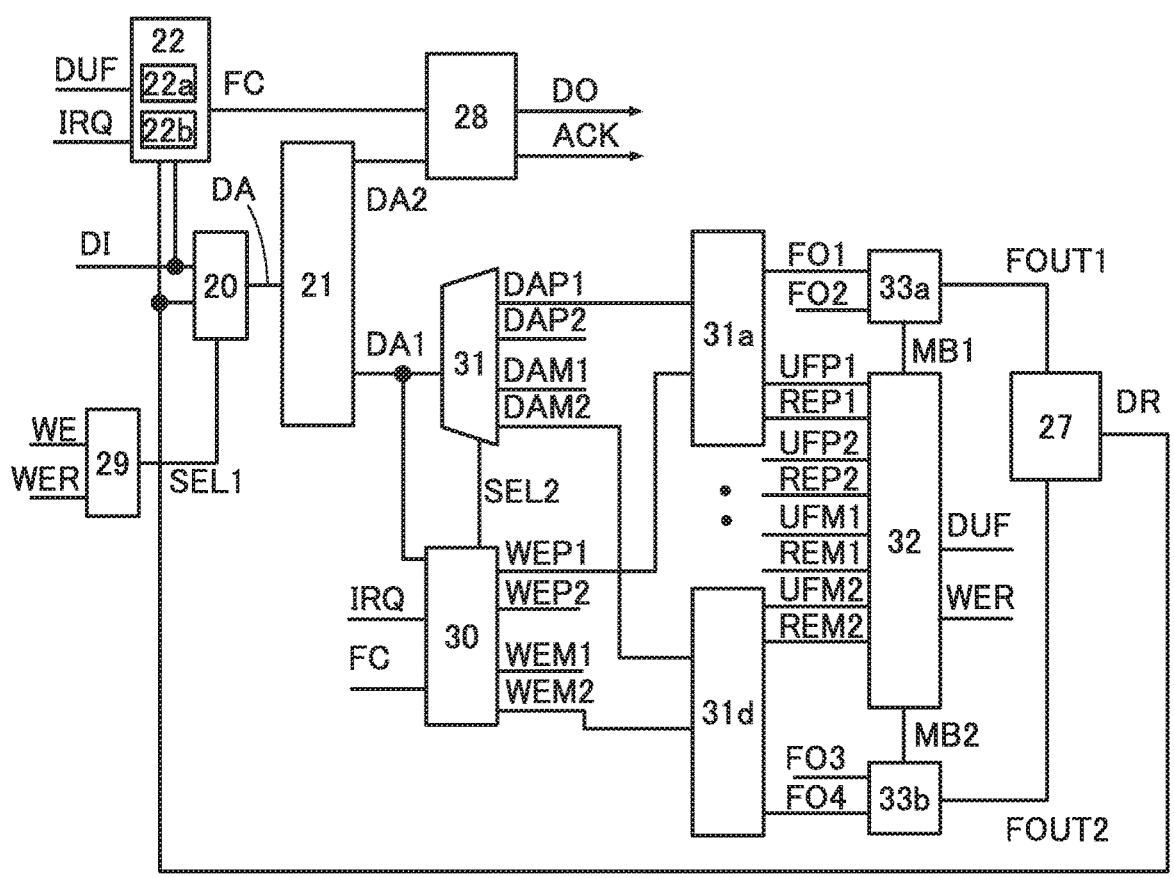

FIG. 3(B) is a circuit diagram illustrating a semiconductor device having a structure different from that in FIG. 2(A). An adder circuit 10a differs from the adder circuit 10 in including a control circuit 30, a selector 31, a memory 31a to a memory 31d, a control circuit 32, a zero insertion circuit 33a, and a zero insertion circuit 33b. For convenience of the diagram, the memory 31b and the memory 31c are not illustrated. Moreover, the adder circuit 10a differs from the adder circuit 10 in including a signal line DAP1, a signal line DAP2, a signal line DAM1, a signal line DAM2, the signal line FO1, the signal line FO2, a signal line FO3, a signal line FO4, a signal line WEP1, a signal line WEP2, a signal line WEM1, a signal line WEM2, a signal line UFP1, a signal line UFP2, a signal line UFM1, a line UFM2, a signal line REP1, a signal line REP2, a signal line REM1, and a signal line REM2.

The control circuit 30 differs from the control circuit 23 in being associated with the memory 31a to the memory 31d (the memory 31b and the memory 31c are not shown in the diagram). The selector 31 differs from the selector 24 in being associated with the memory 31a to the memory 31d. The memory 31a stores data within the range BB, the memory 31b stores data within the range B, the memory 31c stores data within the range C, and the memory 31d stores data within the range CC. The control circuit 32 differs from the control circuit 25 in being associated with the memory 31a to the memory 31d. The zero insertion circuit 33a differs from the zero insertion circuit 26a in being associated with the signal line FO1 and the signal line FO2. The zero insertion circuit 33b differs from the zero insertion circuit 26b in being associated with the signal line F03 and the signal line F04.

As illustrated in FIG. 3(B), in order to further inhibit overflow in the addition processing, a memory that controls the input range finely is preferably added. Overflow is inhibited; thus, more accurate arithmetic operation can be performed.

FIG. 4(A) is a diagram illustrating an addition method with which overflow is inhibited and which has a structure different from that in FIG. 1(A). FIG. 4(A) illustrates an example from a step ST31 to a step ST33. In FIG. 1(A), classification into a positive signed integer and a negative signed integer has been performed. Meanwhile, in FIG. 4(A), in the step ST32, positive signed integers and negative signed integers can be not only classified but also sorted in descending order of the absolute value. Values having different signs are added in descending order of the absolute value. Thus, the addition result of the two values is close to zero. As a result, addition processing can be performed faster without a decrease in calculation accuracy due to overflow.

Note that although integers are separately stored in the memory M2 and the memory M3 in FIG. 4(A), one embodiment of the present invention is not limited thereto. For example, positive signed integers and negative signed integers may be stored without classification. For example, values from the largest value to the smallest value may be stored in the memory M2. For example, as illustrated in FIG. 4(B), "3", "2", "1", "0", "0", "−1", "−1", "−3", and "−3" may be stored in this order in the memory M2. Then, addition of the largest value and the smallest value is sequentially performed. For example, "3" and "−3" are added; then, "2" and "−3" are added; "1" and "−1" are added next; and "0" and "−1" are added next. With such processing, even when there is a large difference between the number of positive signed integers and the number of negative signed integers, the processing can be performed fast. Note that although data are stored in the memory M2 and then added in FIG. 4(B), one embodiment of the present invention is not limited thereto. For example, appropriate numbers may be taken out from the memory M1, and addition of the largest value and the smallest value may be sequentially performed.

In the case as in FIG. 4(B), even when integers without a sign are added, a decrease in calculation accuracy due to overflow can be reduced. That is, in the case of only positive signed integers (which may include zero) or only negative signed integers (which may include zero), values from the largest value to the smallest value may be stored, and then addition of the largest value and the smallest value may be sequentially performed, as in FIG. 4(B). Here, data are stored in the memory M2 and then added; however, one embodiment of the present invention is not limited thereto. For example, appropriate numbers may be taken out from the memory M1, and addition of the largest value and the smallest value may be sequentially performed.

Note that in the step ST5 in FIG. 1(A), the step ST15 in FIG. 1(B), the step ST25 in FIG. 3(A), and the like, integers without a sign can be added with a method similar to that in FIG. 4(B). As another example, when only positive signed integers are added or when only negative signed integers are added, integers without a sign can be added with a method similar to that in FIG. 4(B).

This embodiment corresponds to an embodiment obtained by performing change, addition, modification, removal, application, superordinate conceptualization, or subordinate conceptualization on part or the whole of another embodiment. Thus, part or the whole of this embodiment can be freely combined or replaced with part or the whole of another embodiment.

Embodiment 2

In this embodiment, a semiconductor device including an adder circuit that can inhibit overflow will be described with reference to FIG. 5 to FIG. 13.

Figure 5A:
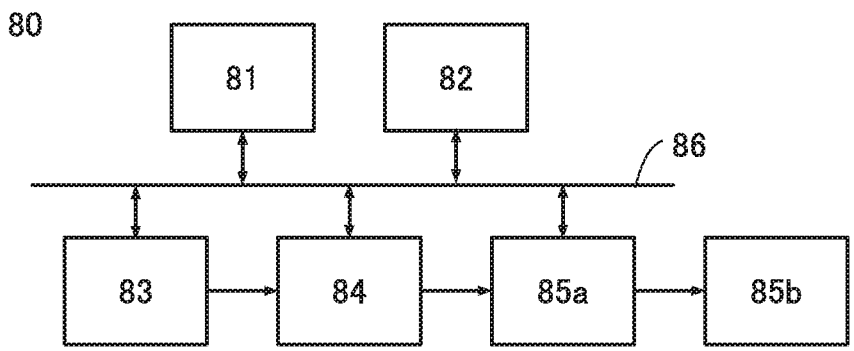
FIG. 5 Block diagrams illustrating a semiconductor device.

FIG. 5(A) is a block diagram illustrating a semiconductor device 80 that includes a neural network. As an example, the semiconductor device 80 includes a CPU 81, a memory 82, an imaging device 83, a neural network 84, a display controller 85a, a display device 85b, and an input/output bus 86. The CPU 81, the memory 82, the imaging device 83, the neural network 84, and the display controller 85a are connected to each other through the input/output bus 86. Note that the imaging device 83 may be electrically connected to the neural network 84 without through the input/output bus 86, and the neural network 84 may be electrically connected to the display controller 85a without through the input/output bus 86.

Figure 5B:
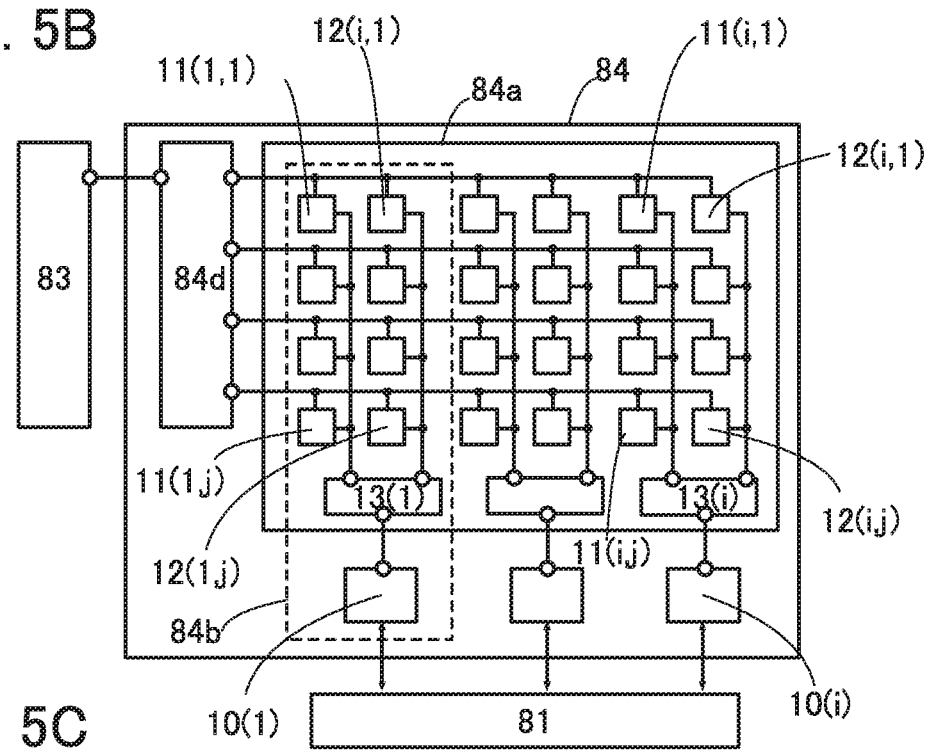

As an example, FIG. 5(B) illustrates a configuration example in which the imaging device 83 is connected to the neural network 84 and the neural network 84 outputs data to the CPU 81. The neural network 84 includes a multiplication cell block 84a and a driver 84d. The multiplication cell block 84a includes a plurality of neurons 84b. For example, each neuron 84b includes a plurality of multiplication cells 11, a plurality of reference cells 12, an arithmetic circuit 13, and the adder circuit 10 described with FIG. 2(A). Note that in the case where addition is performed by software or a program, the adder circuit 10 is not necessarily provided.

Figure 5C:
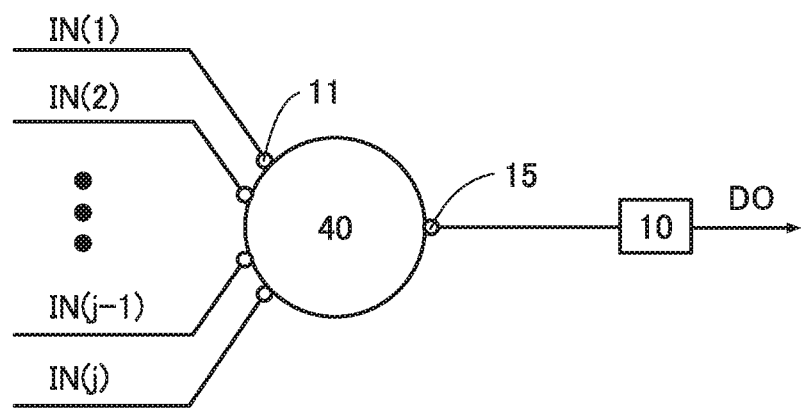

FIG. 5(C) illustrates the neuron 84b. The neuron 84b includes a multiplier circuit 40 and a converter circuit 15, for example. Note that the converter circuit 15 is not necessarily included. The multiplier circuit 40 preferably includes a plurality of multiplication cells 11. The converter circuit 15 is electrically connected to the adder circuit 10. In other words, the neuron 84b includes a product-sum operation circuit composed of the multiplier circuit 40 and the adder circuit 10.

Figure 6A:
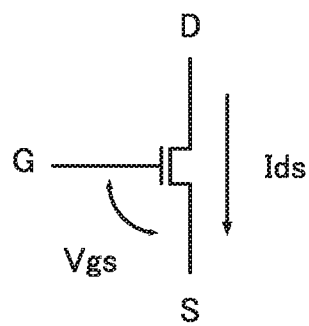
FIG. 6 Block diagrams illustrating a semiconductor device.

FIG. 6(A) illustrates a transistor included in the multiplication cell 11. The description is made on a method of performing multiplication of $\Delta W \times \Delta V$ using a transistor by applying a weight coefficient $\Delta W$ and data $\Delta V$ to a gate of the transistor. In the case where the transistor operates in a saturation region, a current Id flowing through the transistor can be represented by Formula 1.

$$Ids = k \times (Vgs - Vth)^2 \qquad \text{(Formula 1)}$$

The current Ids changes depending on Vgs. Given that the gate of the transistor is supplied with a reference voltage Vref, the weight coefficient $\Delta W$, and the data $\Delta V$, the current Ids needs to be calculated by substituting Formula 2 for Vgs of Formula 1. At this time, Vgs to be substituted is denoted as Vgs1, and the current Ids to be calculated is denoted as a current I1.

$$Vgs1 = Vref + \Delta W + \Delta V \qquad \text{(Formula 2)}$$

To obtain $\Delta W \times \Delta V$ as the multiplication result, Formula 1 into which Formula 2 is substituted is developed, thereby obtaining a term of $\Delta W \times \Delta V$ in Formula 5.

$$I1 = k \times (Vref + \Delta W + \Delta V - Vth)^2 \qquad \text{(Formula 3)}$$

In the case where a coefficient A=Vref+Vth $$I1 = k \times (\Delta W + \Delta V + A)^2 \qquad \text{(Formula 4)}$$

$$I1 = k \times (A^2 + 2 \times A \times \Delta W + \Delta W^2 + 2 \times A \times \Delta V + \Delta V^2 + 2 \times \Delta W \times \Delta V) \qquad \text{(Formula 5)}$$

Similarly, when Vgs2=Vref+$\Delta V$ is substituted for Vgs of Formula 1, a current I2 can be obtained.

When Vgs3=Vref+$\Delta W$ is substituted for Vgs of Formula 1, a current I3 can be obtained.

When Vgs4=Vref is substituted for Vgs of Formula 1, a current I4 can be obtained.

$A^2+2\times A\times\Delta W+\Delta W^2$, which is obtained in Formula 5, corresponds to the current I3 obtained by substation of Vgs3.

$2 \times A \times \Delta V + \Delta V^2$, which is obtained in Formula 5, can be obtained by subtracting the current I4 obtained by substation of Vgs4 from the current I2 obtained by substation of Vgs2.

Therefore, to obtain the multiplication result of $\Delta W \times \Delta V$ from Formula 5, the following Formula 6 holds true. In this case, I5 does not depend on Vth of the transistor.

$$I5 = 2 \times k \times \Delta W \times \Delta V \qquad \text{(Formula 6)}$$

Formula 7 holds for $\Delta V > 0$ and $\Delta W > 0$ or for $\Delta V < 0$ and $\Delta W < 0$.

$$I1 + I4 - I2 - I3 - I5 = 0 \qquad \text{(Formula 7)}$$

In other cases, Formula 8 holds for $\Delta V < 0$ and $\Delta W > 0$ or for $\Delta V < 0$ and $\Delta W > 0$.

$$I1 + I4 - I2 - I3 + I5 = 0 \qquad \text{(Formula 8)}$$

That is, to obtain the multiplication result of $\Delta W \times \Delta V$ with the use of the transistor, the result can be calculated by calculating the current I1 to the current I4.

Figure 6B:
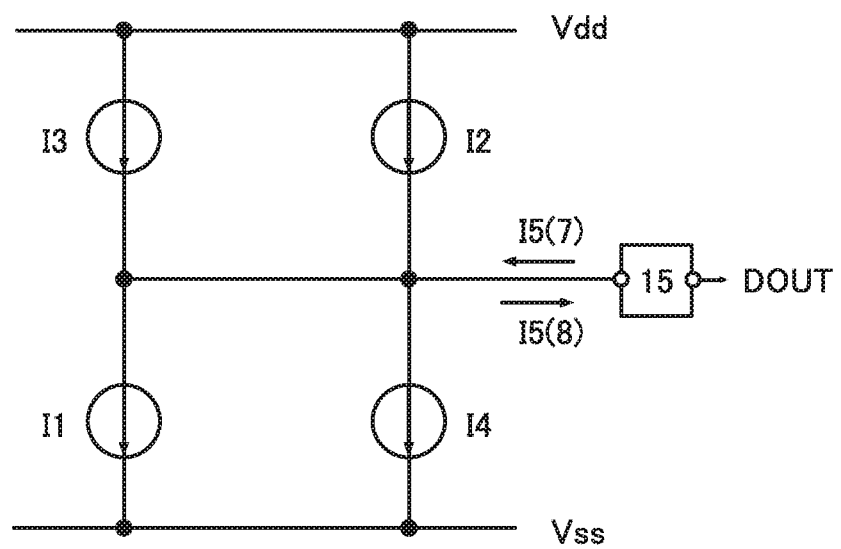

As an example, FIG. 6(B) illustrates the current I1 to the current I5. I5(7) indicates the direction of the current of Formula 7, and I5(8) indicates the direction of the current of Formula 8.

Figure 7A:
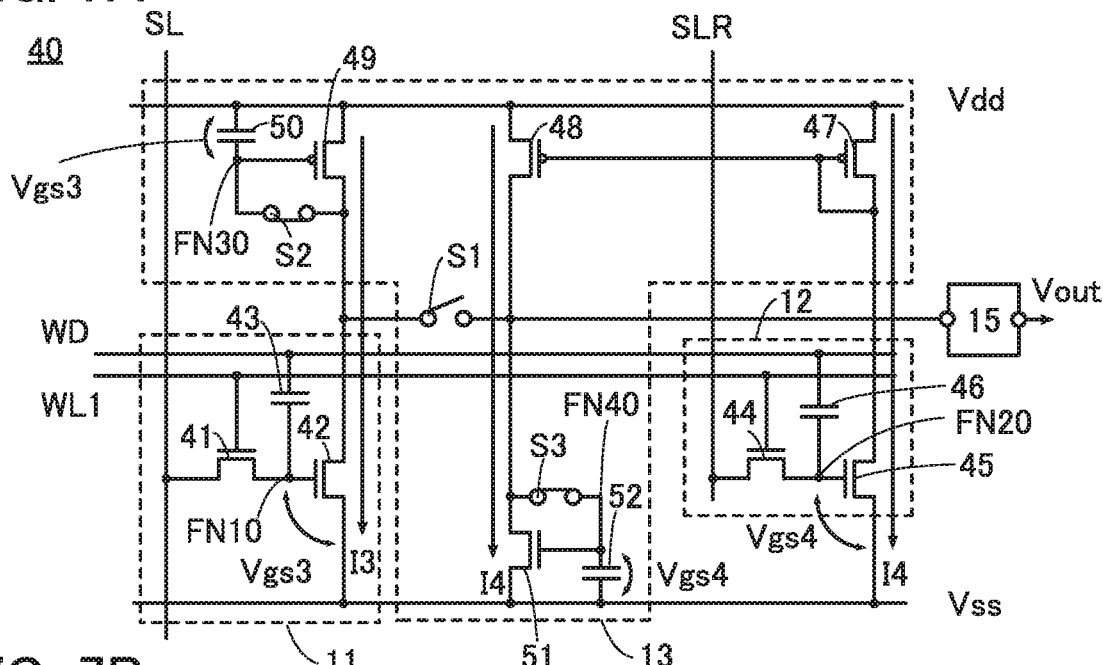
FIG. 7 Circuit diagrams illustrating a semiconductor device.

FIG. 7(A) is a circuit diagram illustrating an example of the multiplier circuit 40 in the product-sum operation circuit. The multiplier circuit 40 includes the multiplication cell 11, the reference cell 12, the arithmetic circuit 13, and the converter circuit 15, for example. As an example, the converter circuit 15 has a function of converting a current signal into a voltage signal. As another example, the converter circuit 15 has a function of converting an analog signal into a digital signal. As another example, the converter circuit 15 has a function of removing a noise component from an output signal. The arithmetic circuit 13 includes a switch S1, a first programming cell, and a second programming cell, for example. The multiplication cell 11 and the reference cell 12 each include a memory cell. The multiplier circuit 40 includes the wiring Vdd, the wiring Vss, a signal line SL, a signal line SLR, a signal line WL1, and a signal line WD, for example.

The memory cell included in the multiplication cell 11 includes a transistor 41, a transistor 42, and a capacitor 43, for example. The memory cell included in the reference cell 12 includes a transistor 44, a transistor 45, and a capacitor 46, for example. The arithmetic circuit 13 includes a transistor 47 and a transistor 48 that form a current mirror, for example. The first programming cell includes a transistor 49, a capacitor 50, and a switch S2, for example. The second programming cell includes a transistor 51, a capacitor 52, and a switch S3, for example.

The transistor 47 to the transistor 49 are p-channel transistors, and the other transistors are n-channel transistors.

The product-sum operation circuit may be composed of transistors including silicon (such as single crystal silicon) in a channel formation region (hereinafter also referred to as Si transistors), or may be composed of transistors including an oxide semiconductor in a channel formation region (hereinafter also referred to as OS transistors). Because of its extremely low off-state current, an OS transistor is particularly preferable as a transistor that holds a voltage. Note that the product-sum operation circuit may be formed using both a Si transistor and an OS transistor. In FIG. 7(A), the switch S2, the switch S3, the transistor 41, or the transistor 44 is preferably an OS transistor, for example.

One of a source and a drain of the transistor 41 is electrically connected to the signal line SL. The other of the source and the drain of the transistor 41 is electrically connected to a gate of the transistor 42 and one electrode of the capacitor 43. One of a source and a drain of the transistor 42 is electrically connected to the wiring Vss. The other of the source and the drain of the transistor 42 is electrically connected to one electrode of the switch S1, one electrode of the switch S2, and one of a source and a drain of the transistor 49. The other electrode of the switch S2 is electrically connected to a gate of the transistor 49 and one electrode of the capacitor 50. The other of the source and the drain of the transistor 49 is electrically connected to the wiring Vdd and the other electrode of the capacitor 50. The other electrode of the switch S1 is electrically connected to an input terminal of the converter circuit 15, one of a source and a drain of the transistor 51, one electrode of the switch S3, and one of a source and a drain of the transistor 48. A gate of the transistor 51 is electrically connected to the other electrode of the switch S3 and one electrode of the capacitor 52. The other of the source and the drain of the transistor 51 is electrically connected to the wiring Vss, the other electrode of the capacitor 52, and one of a source and a drain of the transistor 45. The other of the source or the drain of the transistor 48 is electrically connected to the wiring Vdd and one of a source or a drain of the transistor 47. A gate of the transistor 48 is electrically connected to a gate of the transistor 47, the other of the source and the drain of the transistor 47, and the other of the source and the drain of the transistor 45. A gate of the transistor 45 is electrically connected to one of a source and a drain of the transistor 44 and one electrode of the capacitor 46. The other electrode of the capacitor 46 is electrically connected to the wiring WD. The other of the source and the drain of the transistor 44 is electrically connected to the wiring SLR.

Anode FN10 is formed by being connected to the other of the source and the drain of the transistor 41, the gate of the transistor 42, and the one electrode of the capacitor 43. Anode FN20 is formed by being connected to the one of the source and the drain of the transistor 44, the gate of the transistor 45, and the one electrode of the capacitor 46. A node FN30 is formed by being connected to the other electrode of the switch S2, the gate of the transistor 49, and the one electrode of the capacitor 50. A node FN40 is formed by being connected to the other electrode of the switch S3, the gate of the transistor 51, and the one electrode of the capacitor 52.

Here, the converter circuit 15 is described with reference to FIGS. 7(C), 7(D), and 7(E). The converter circuit 15 includes an IV converter circuit 15a and an amplifier circuit 15b, for example. As the IV converter circuit 15a, a resistor, a capacitor, a diode, and the like can be used. A current can be converted into a voltage by the IV converter circuit 15a. As a result, an output signal can be easily extracted. Then, the output signal, which is the converted voltage, can be appropriately output by the amplifier circuit 15b. An operational amplifier, a source follower circuit, a common source circuit, a voltage follower circuit, or the like can be used, for example, as the amplifier circuit 15b. As illustrated in FIG. 7(D) or FIG. 7(E), the IV converter circuit 15a can alternatively be formed using an operational amplifier and a passive element (e.g., a resistor or a capacitor). FIG. 7(D) illustrates an IV converter circuit using an operational amplifier and a resistor, and FIG. 7(E) illustrates an integrator circuit using an operational amplifier and a capacitor. Using an operational amplifier as illustrated in FIG. 7(D) or FIG. 7(E) is preferable because the potential of the input terminal of the operational amplifier can be controlled by utilizing the effect of a virtual ground.

Next, an example of the operation of the multiplier circuit 40 is described with reference to FIG. 7(A) and FIG. 7(B).

First, FIG. 7(A) is described. Vgs3 (=Vref+ΔW) is written to the node FN10 through the wiring SL, and the current I3 flows through the transistor 42. A potential corresponding to the current I3 flowing through the transistor 49 is supplied to the node FN30 through the switch S2. At the same time, Vgs4 (=Vref) is written to the node FN20 through the wiring SLR, and the current I4 flows through the transistor 45. The current I4 is copied by the transistor 47 and the transistor 48, which constitute the current mirror. A potential corresponding to the current I4 flowing through the transistor 51 is supplied to the node FN40 through the switch S3.

Figure 7B:
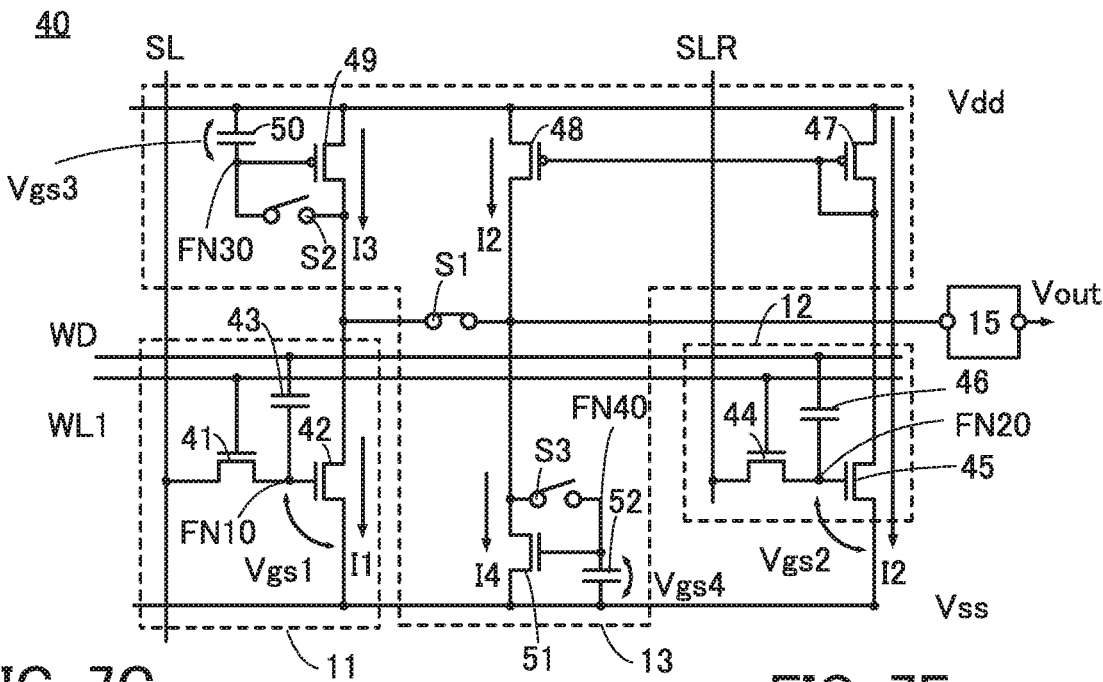
Figure 7C:
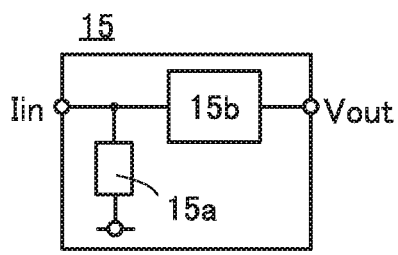
Figure 7D:
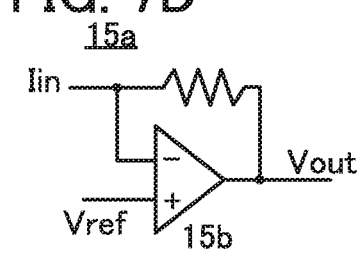
Figure 7E:
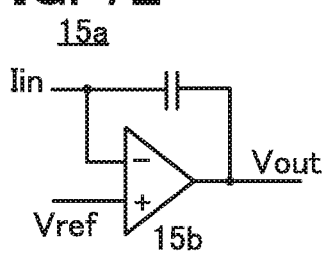

Next, FIG. 7(B) is described. The switch S2 and the switch S3 are turned off, and the potential supplied to the node FN30 or the node FN40 is stored.

Next, the potential of the signal line WD is changed by only the data ΔV, whereby the data ΔV is supplied to the node FN10 through the capacitor 43. That is, the potential of the node FN10 changes from Vgs3 to Vgs1 (=Vref+ΔW+ΔV). At the same time, the data ΔV is supplied to the node FN20 through the capacitor 46. That is, the potential of the node FN10 changes from Vgs4 to Vgs2 (=Vref+ΔV). The current I2 is copied by the transistor 47 and the transistor 48, which constitute the current mirror. Thus, the current I2 can flow through the transistor 48.

The transistor 42 can pass the current I1, the transistor 49 can pass the current I3, the transistor 48 can pass the current I2, and the transistor 51 can pass the current I4. Here, by turning on the switch S1, the current I5 can be supplied to the converter circuit 15. Thus, the multiplication result of ΔW×ΔV can be obtained as I5.

Figure 8:
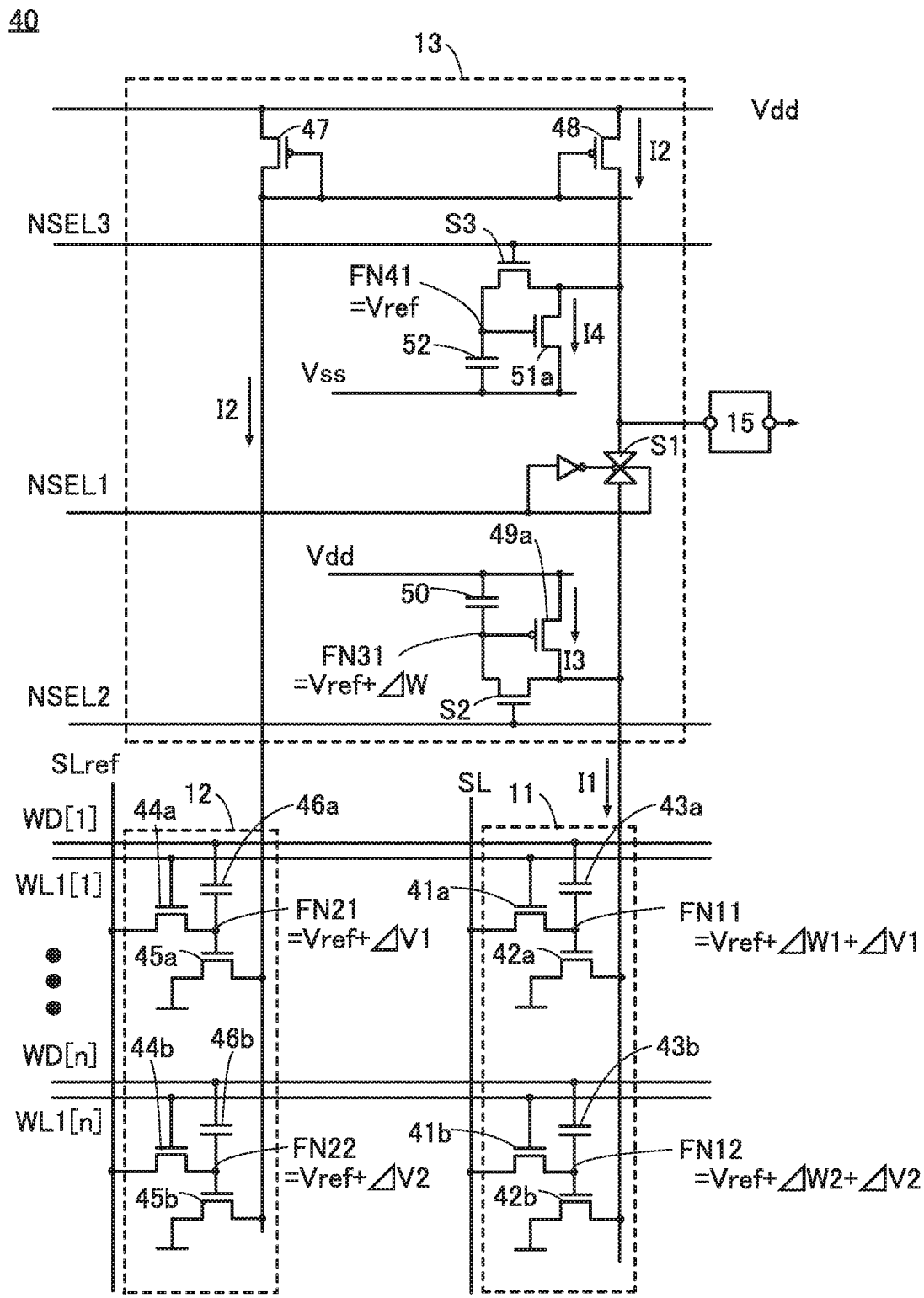
FIG. 8 A circuit diagram illustrating a semiconductor device.

FIG. 8 differs from FIG. 7(A) in including the multiplication cell 11 including a plurality of memory cells and the reference cell 12 including a plurality of memory cells. In other words, a plurality of currents output from the multiplication cell 11 including a plurality of memory cells can be added according to Kirchhoff's current law. In addition, a signal line NSEL2 is electrically connected to the switch S2, and a signal line NSEL3 is electrically connected to the switch S3. Note that the number of memory cells included in the multiplication cell 11 is preferably equal to the number of memory cells included in the reference cell 12. Although a transistor may be used as the switch S1, an analog switch is preferable. The use of the analog switch enables more accurate multiplication.

As another difference, the channel width of a transistor 49*a* in a first programming cell is preferably increased according to the number of stages in the multiplication cell 11. Therefore, in the case where memory cells of n stages are connected in the multiplication cell 11, the channel width of the transistor 49*a* is preferably n times the channel width of a transistor 42*a*, further preferably larger than n times the channel width of the transistor 42*a*.

The channel width of a transistor 51*a* in a second programming cell is preferably increased according to the number of stages in the reference cell 12. Therefore, in the case where memory cells of n stages are connected in the reference cell 12, the channel width of the transistor 51*a* is preferably n times the channel width of a transistor 45*a*, further preferably larger than n times the channel width of the transistor 45*a*.

Figure 9:
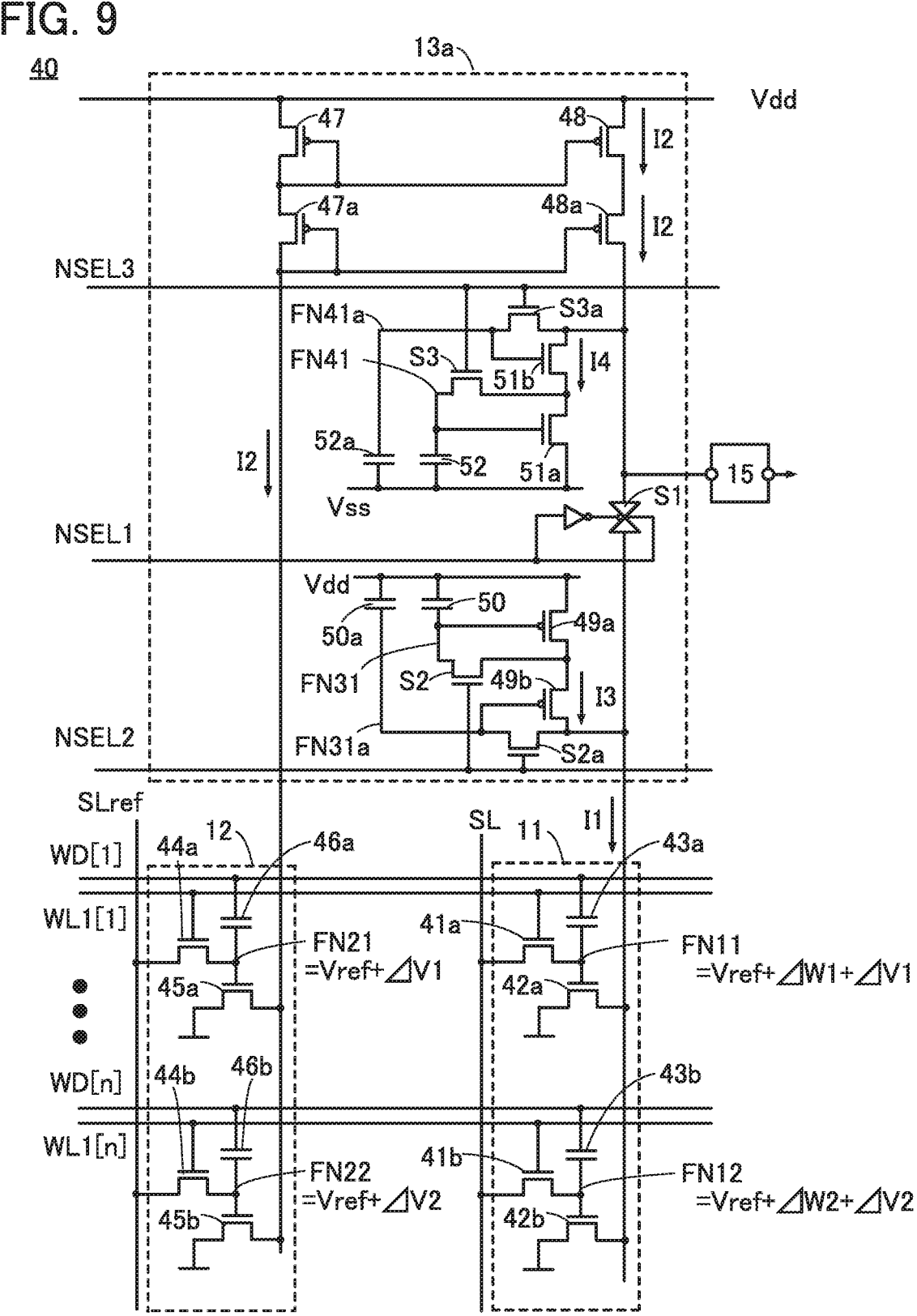
FIG. 9 A circuit diagram illustrating a semiconductor device.

FIG. 9 is a circuit diagram illustrating an arithmetic circuit 13*a* different from FIG. 8. The arithmetic circuit 13*a* illustrated in FIG. 9 further includes a transistor 47*a*, a transistor 48*a*, a transistor 49*b*, a capacitor 50*a*, a switch S2*a*, a transistor 51*b*, a capacitor 52*a*, and a switch S3*a*.

The circuit configuration illustrated in FIG. 9 allows the saturation characteristics of the transistors used in addition processing to be flat. Thus, in the case where a current is copied by the current mirror or the like, a more accurate current can be handled. Consequently, the use of the arithmetic circuit 13*a* can improve the arithmetic accuracy of addition.

Figure 10A:
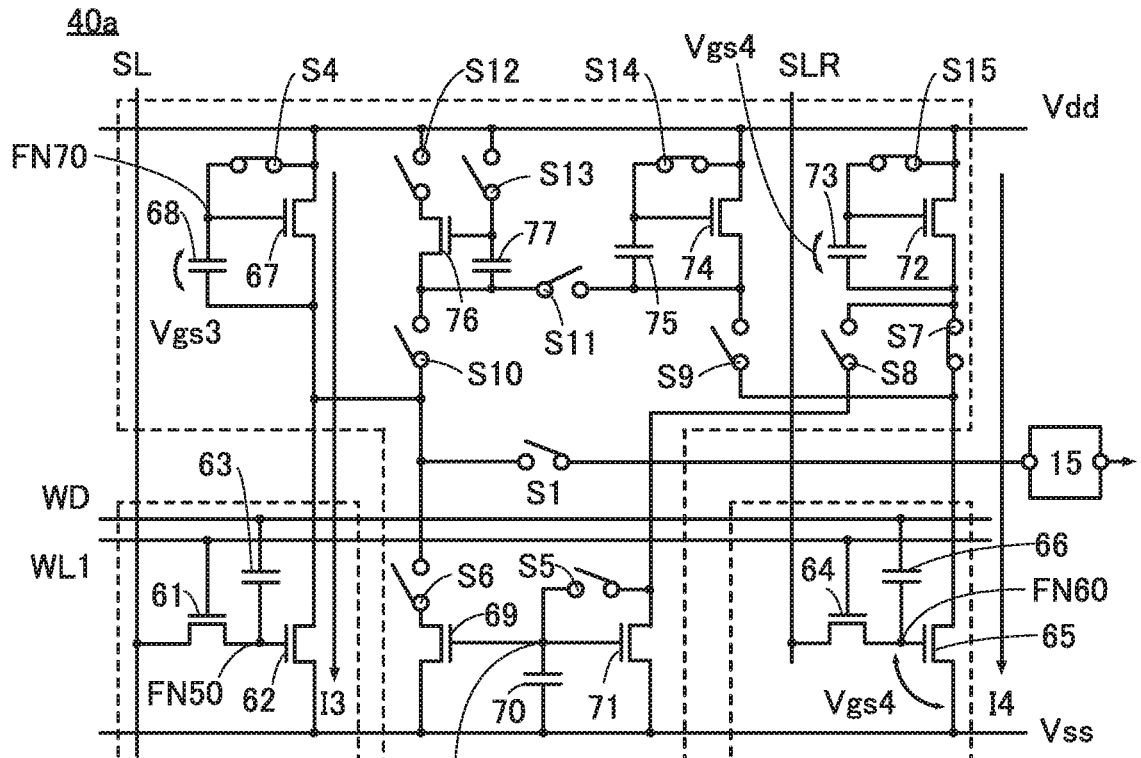
FIG. 10 Circuit diagrams illustrating a semiconductor device.

FIG. 10(A) is a circuit diagram illustrating a multiplier circuit 40*a* different from FIG. 7(A). In FIG. 10(A), most of the transistors are n-channel transistors. If the switches are also composed of n-channel transistors, all the transistors can be n-channel transistors. In that case, the process can be simplified.

The multiplier circuit 40*a* includes a multiplication cell 11*a*, a reference cell 12*a*, an arithmetic circuit 13*b*, and the converter circuit 15, for example. The arithmetic circuit 13*b* includes the switch S1, a first programming cell, and a second programming cell, for example. The multiplication cell 11*a* and the reference cell 12*a* each include a memory cell. The multiplier circuit 40*a* includes the wiring Vdd, the wiring Vss, the signal line SL, the signal line SLR, the signal line WL1, and the signal line WD, for example.

The memory cell included in the multiplication cell 11*a* includes a transistor 61, a transistor 62, and a capacitor 63, for example. The reference cell 12*a* includes a transistor 64, a transistor 65, and a capacitor 66, for example. The arithmetic circuit 13*b* includes a transistor 72, a capacitor 73, a transistor 74, a capacitor 75, a transistor 76, a capacitor 77, and a switch S7 to a switch S15, for example. The first programming cell includes a transistor 67, a capacitor 68, and a switch S4, for example. The second programming cell includes a transistor 69, a capacitor 70, a transistor 71, a switch S5, and a switch S6, for example.

In FIG. 10(A), the switch S4, the switch S5, the switch S12, the switch S14, the switch S15, the transistor 61, or the transistor 64 is preferably an OS transistor, for example. Because of its extremely low off-state current, an OS transistor is particularly preferable as a transistor that holds a voltage.

The product-sum operation circuit may be composed of Si transistors or OS transistors. An OS transistor is particularly preferably used as a transistor included in a memory of the product-sum operation circuit because of its extremely low off-state current. Note that the product-sum operation circuit may be formed using both a Si transistor and an OS transistor.

One of a source and a drain of the transistor 61 is electrically connected to the signal line SL. The other of the source and the drain of the transistor 61 is electrically connected to a gate of the transistor 62 and one electrode of the capacitor 63. One of a source and a drain of the transistor 62 is electrically connected to the wiring Vss. The other of the source and the drain of the transistor 62 is electrically connected to one electrode of the capacitor 68, one of a source and a drain of the transistor 67, one electrode of the switch S1, one electrode of the switch S6, and one electrode of the switch S10. A gate of the transistor 67 is electrically connected to the other electrode of the capacitor 68 and one electrode of the switch S4. The other of the source and the drain of the transistor 67 is electrically connected to the other electrode of the switch S4 and the wiring Vdd.

The other electrode of the switch S1 is electrically connected to the converter circuit 15. One of a source and a drain of the transistor 64 is electrically connected to the wiring SLR. The other of the source and the drain of the transistor 64 is electrically connected to a gate of the transistor 65 and one electrode of the capacitor 66. One of a source and a drain of the transistor 65 is electrically connected to the wiring Vss. The other of the source and the drain of the transistor 65 is electrically connected to one electrode of the switch S7 and one electrode of the switch S9. The other electrode of the switch S7 is electrically connected to one of a source and a drain of the transistor 72, one electrode of the capacitor 73, and one electrode of the switch S8. The other of the source and the drain of the transistor 72 is electrically connected to one electrode of the switch S15 and the wiring Vdd. A gate of the transistor 72 is electrically connected to the other electrode of the capacitor 73 and the other electrode of the switch S15.

The other electrode of the switch S9 is electrically connected to one of a source and a drain of the transistor 74, one electrode of the capacitor 75, and one electrode of the switch S11. The other of the source and the drain of the transistor 74 is electrically connected to one electrode of the switch S14 and the wiring Vdd. A gate of the transistor 74 is electrically connected to the other electrode of the capacitor 75 and the other electrode of the switch S14. The other electrode of the switch S11 is electrically connected to the other electrode of the switch S10, one electrode of the capacitor 77, and one of a source and a drain of the transistor 76. The other of the source and the drain of the transistor 76 is electrically connected to one electrode of the switch S12. A gate of the transistor 76 is electrically connected to the other electrode of the capacitor 77 and one electrode of the switch S13. The other electrode of the switch S12 is electrically connected to the other electrode of the switch S13 and the wiring Vdd. The other electrode of the switch S8 is electrically connected to one of a source and a drain of the transistor 71 and one electrode of the switch S5. A gate of the transistor 71 is electrically connected to one electrode of the capacitor 70, the other electrode of the switch S5, and a gate of the transistor 69. One of a source and a drain of the transistor 69 is electrically connected to the other electrode of the switch S6. The other of the source and the drain of the transistor 71 is electrically connected to the other electrode of the capacitor 70, the other of the source and the drain of the transistor 69, and the wiring Vss.

Anode FN50 is formed by being connected to the other of the source and the drain of the transistor 61, the gate of the transistor 62, and the one electrode of the capacitor 63. Anode FN60 is formed by being connected to the other of the source and the drain of the transistor 64, the gate of the transistor 65, and the one electrode of the capacitor 66. A node FN70 is formed by being connected to the gate of the transistor 67, the other electrode of the capacitor 68, and the one electrode of the switch S4. A node FN80 is formed by being connected to the gate of the transistor 71, the one electrode of the capacitor 70, the other electrode of the switch S5, and the gate of the transistor 69.

Next, an example of the operation of the multiplier circuit 40a is described with reference to FIG. 10(A), FIG. 10(B), and FIG. 11.

First, FIG. 10(A) is described. The switch S4, the switch S7, and the switch S15 are turned on. Vgs3 (=Vref+ΔW) is written to the node FN50 through the wiring SL, and the current I3 flows through the transistor 62. A potential corresponding to the current I3 flowing through the transistor 67 is supplied to the node FN70 through the switch S4. At the same time, Vgs4 (=Vref) is written to the node FN60 through the wiring SLR, and the current I4 flows through the transistor 65. The current I4 also flows through the transistor 72 via the switch S7. Thus, a potential corresponding to the current I4 is supplied to the capacitor 73 through the switch S15.

Next, the switch S4, the switch S7, and the switch S15 are turned off, and the potentials supplied to the node FN70 and the capacitor 73 are stored.

Figure 10B:
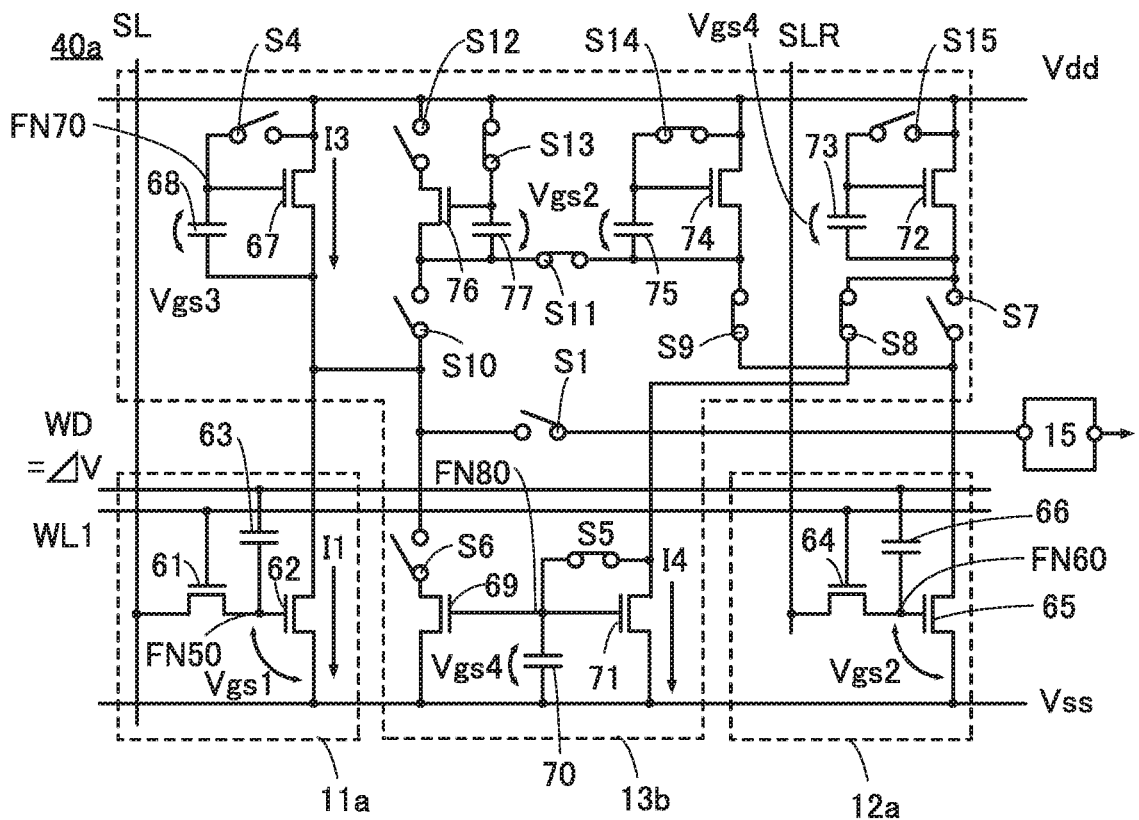

Next, FIG. 10(B) is described. The switch S5 and the switch S8 are turned on. A potential corresponding to the current I4 flowing through the transistor 71 is supplied to the node FN80.

Next, the potential of the signal line WD is changed by only the data ΔV, whereby the data ΔV is supplied to the node FN50 through the capacitor 63. That is, the potential of the node FN50 changes from Vgs3 to Vgs1 (=Vref+ΔW+ΔV). At the same time, the data ΔV is supplied to the node FN60 through the capacitor 66. That is, the potential of the node FN60 changes from Vgs4 to Vgs2 (=Vref+ΔV).

Next, the switch S9, the switch S11, the switch S13, and the switch S14 are turned on. A potential corresponding to the current I2 flowing through the transistor 74 is supplied to the capacitor 75. Since the switch S13 and the switch S14 are on, the capacitor 77 is supplied with the same potential as the capacitor 75. Thus, the switch S14 and the capacitor 75 are not necessarily provided; the same operation can be performed when the gate of the transistor 74 and the other of the source and the drain of the transistor 74 are connected to the wiring Vdd instead.

Figure 11:
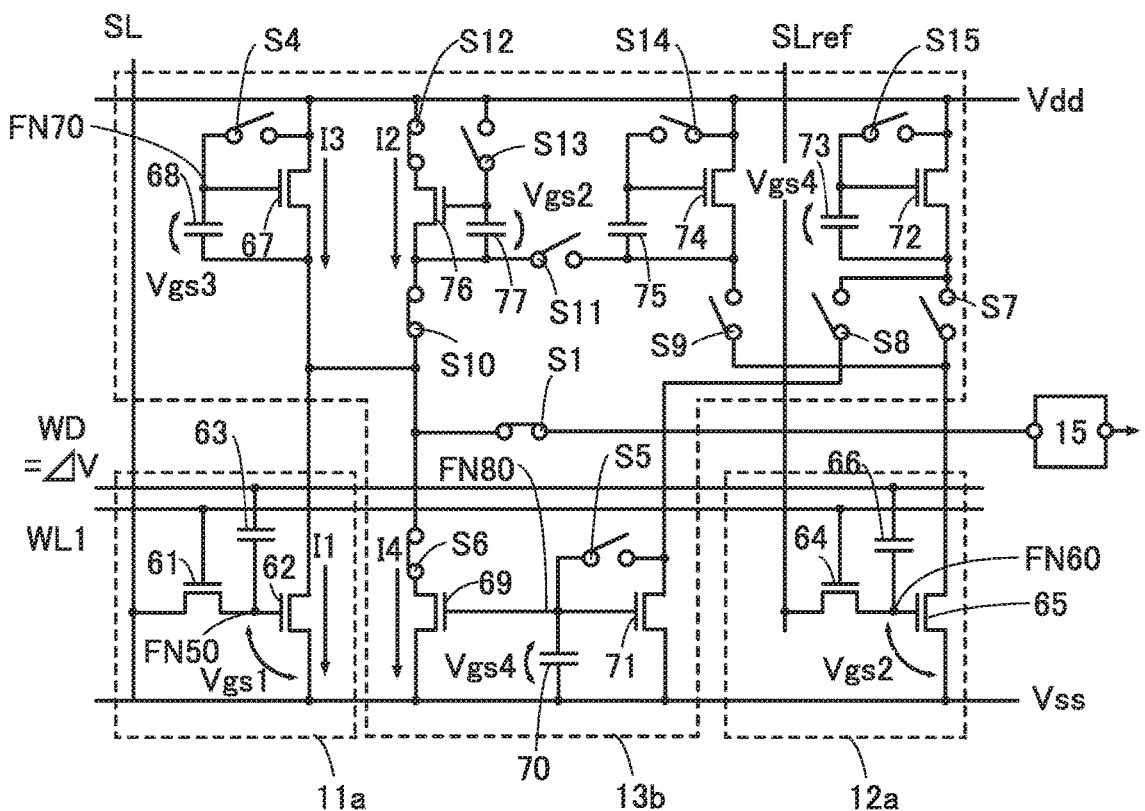
FIG. 11 A circuit diagram illustrating a semiconductor device.

Next, FIG. 11 is described. The switch S9, the switch S11, the switch S13, and the switch S14 are turned off. The node FN80 stores the supplied potential. Then, the switch S6, the switch S10, and the switch S12 are turned on.

The transistor 62 can pass the current I1, the transistor 67 can pass the current I3, the transistor 76 can pass the current I2, and the transistor 69 can pass the current I4. Here, by turning on the switch S1, the current I5 can be supplied to the converter circuit 15. Thus, the multiplication result of ΔW×ΔV can be obtained as I5.

Figure 12:
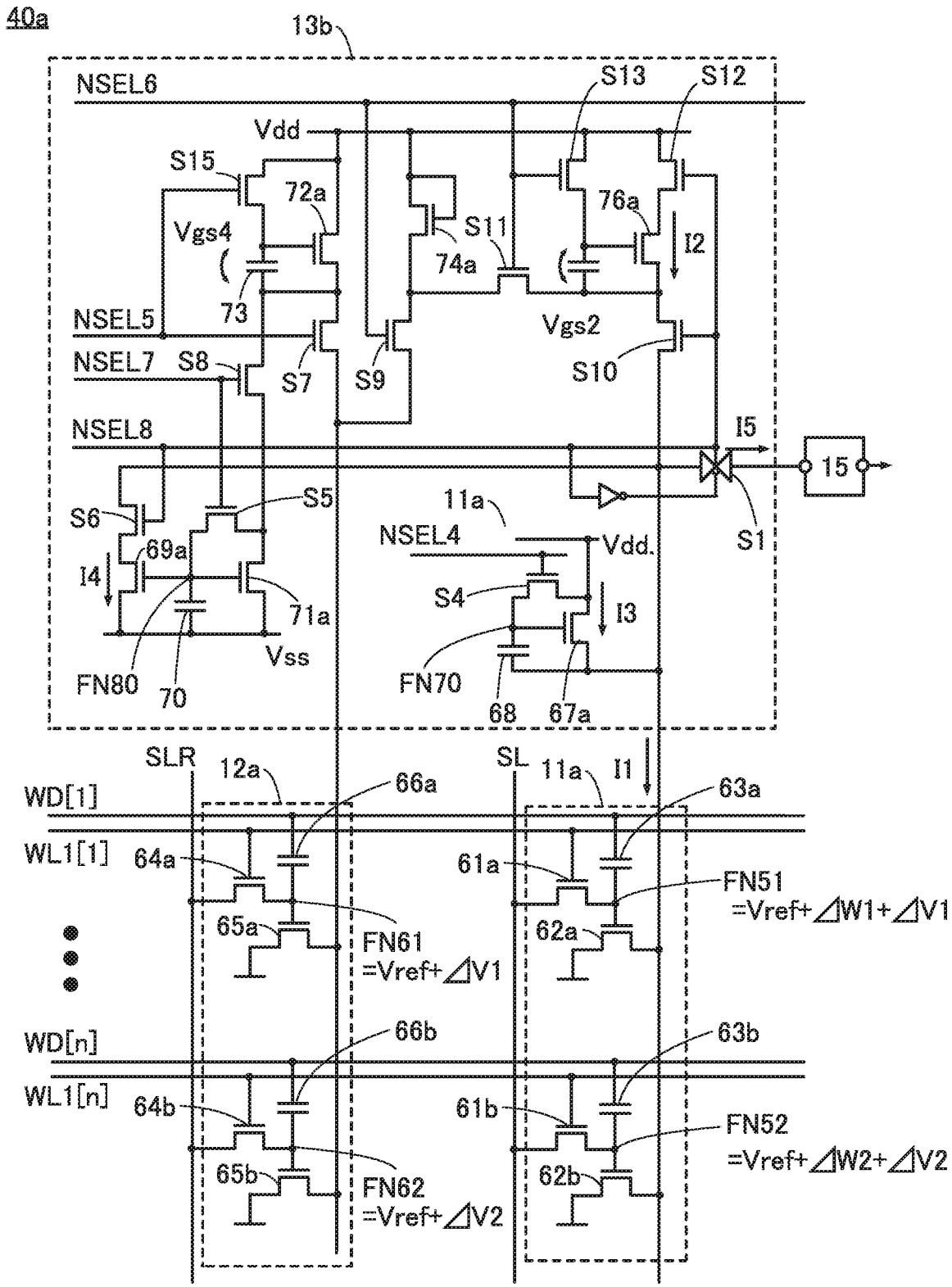
FIG. 12 A circuit diagram illustrating a semiconductor device.

FIG. 12 differs from FIG. 8 in including the multiplication cell 11a including a plurality of memory cells, the reference cell 12a including a plurality of memory cells, and the arithmetic circuit 13b. In addition, a signal line NSEL4 is electrically connected to the switch S4; a signal line NSEL5 is electrically connected to the switch S7 and the switch S15; a signal line NSEL6 is electrically connected to the switch S9, the switch S11, and the switch S13; a signal line NSEL7 is electrically connected to the switch S5 and the switch S8; and a signal line NSEL8 is electrically connected to the switch S1, the switch S6, the switch S10, and the switch S12. The signal line NSEL4 and the signal line NSEL5 may be one signal line.

Note that the number of memory cells included in the multiplication cell 11a is preferably equal to the number of memory cells included in the reference cell 12a. Although a transistor may be used as the switch S1, an analog switch is preferable. The use of the analog switch enables more accurate multiplication.

As another difference, the channel width of a transistor 67a in a first programming cell is preferably increased according to the number of stages in the multiplication cell 11a. Therefore, in the case where memory cells of n stages are connected in the multiplication cell 11a, the channel width of the transistor 67a is preferably n times the channel width of a transistor 62a, further preferably larger than n times the channel width of the transistor 62a.

The channel width of a transistor 69a in a second programming cell is preferably increased according to the number of stages in the reference cell 12a. Therefore, in the case where memory cells of n stages are connected in the reference cell 12a, the channel width of the transistor 69a is preferably n times the channel width of a transistor 65*a*, further preferably larger than n times the channel width of the transistor 65*a*.

Similarly, the channel width of each of a transistor 71*a*, a transistor 72*a*, a transistor 74*a*, and a transistor 76*a* is preferably larger than n times the channel width of the transistor 65*a*.

Figure 13:
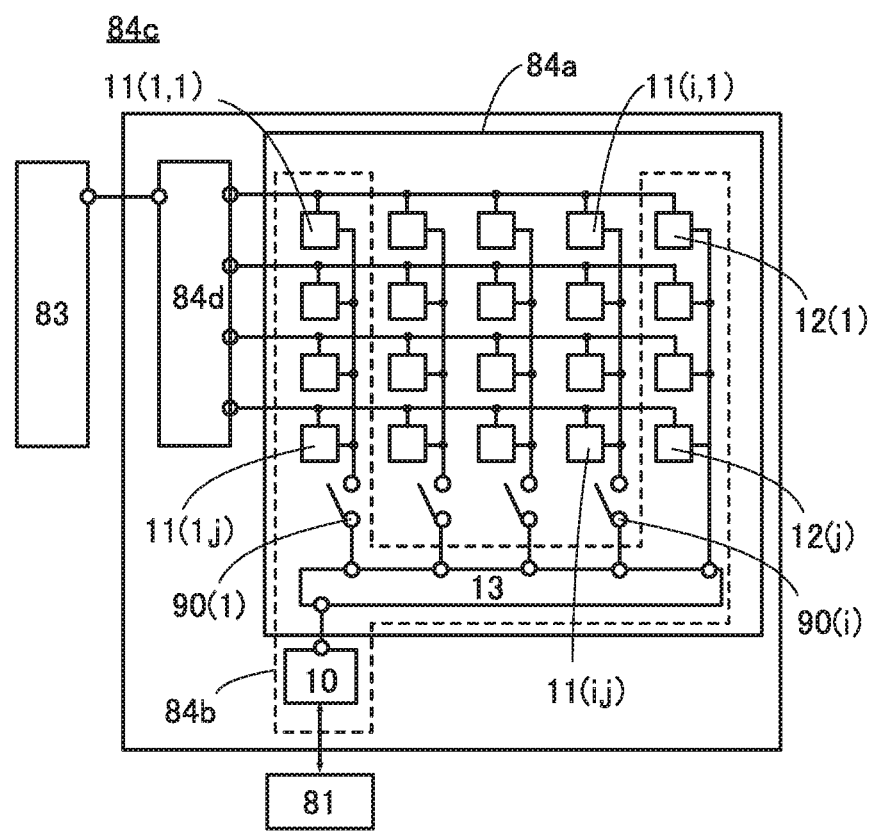
FIG. 13 A block diagram illustrating a semiconductor device.

FIG. 13 illustrates a neural network 84*c* different from the block diagram shown in FIG. 5(B). A difference from FIG. 5 is that the neurons included in FIG. 13 share the reference cells 12 and the arithmetic circuit 13. As for the memory cells in each neuron, a memory cell that is an arithmetic operation target can be connected through any of switches 90(1) to 90(*i*). Sharing the reference cells 12 and the arithmetic circuit 13 increases the neuron packing density, so that a larger amount of arithmetic operation can be performed.

This embodiment corresponds to an embodiment obtained by performing change, addition, modification, removal, application, superordinate conceptualization, or subordinate conceptualization on part or the whole of another embodiment. Thus, part or the whole of this embodiment can be freely combined or replaced with part or the whole of another embodiment.

Embodiment 3

In this embodiment, a memory device of one embodiment of the present invention that includes a transistor using an oxide as a semiconductor (an OS transistor) and a capacitor (hereinafter sometimes referred to as an OS memory device) will be described with reference to FIG. 14. The OS memory device is a memory device including at least a capacitor and an OS transistor that controls charge and discharge of the capacitor. Since the off-state current of the OS transistor is extremely low, the OS memory device has excellent retention characteristics and can function as a nonvolatile memory.

<Configuration Example of Memory Device>

FIG. 14 shows configuration examples of a memory cell MC that can be used in the memory M1 to the memory M3 described in Embodiment 1 and the multiplier circuit described in Embodiment 2.

[DOSRAM]

Figure 14A:
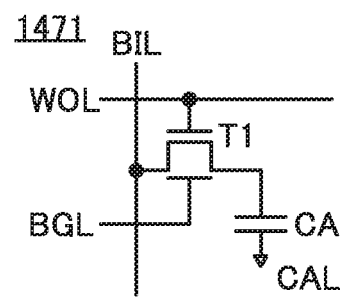
FIG. 14 Circuit diagrams illustrating configuration examples of memory devices.
Figure 14B:
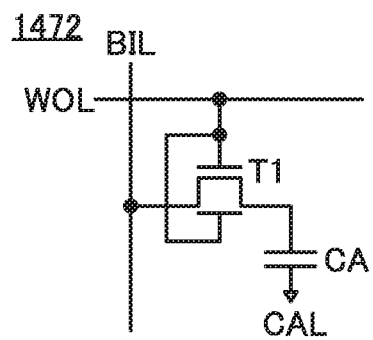
Figure 14C:
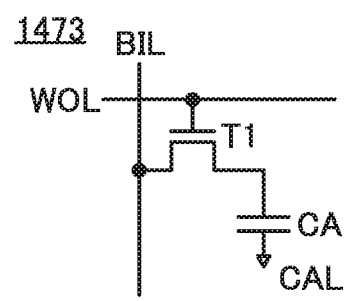
Figure 14D:
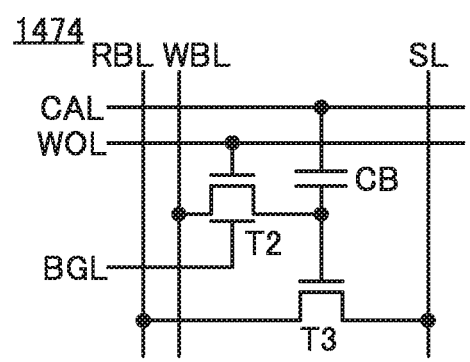
Figure 14E:
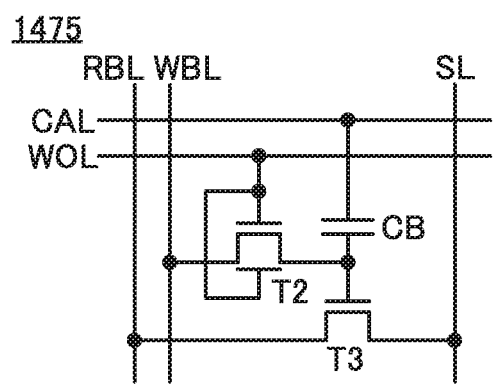
Figure 14F:
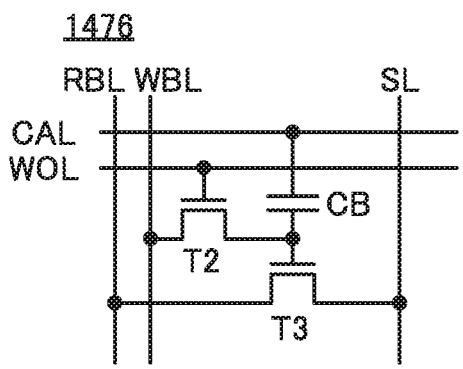
Figure 14G:
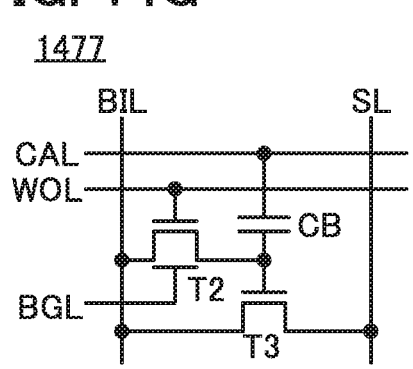

FIGS. 14(A) to 14(C) illustrate circuit configuration examples of the memory cell MC of a DRAM. In this specification and the like, a DRAM using a memory cell including one OS transistor and one capacitor is sometimes referred to as a DOSRAM (Dynamic Oxide Semiconductor Random Access Memory). A memory cell 1471 illustrated in FIG. 14(A) includes a transistor T1 and a capacitor CA. Note that the transistor T1 includes a gate (sometimes referred to as a front gate) and a back gate.

A first terminal of the transistor T1 is connected to a first terminal of the capacitor CA, a second terminal of the transistor T1 is connected to a wiring BIL, the gate of the transistor T1 is connected to a wiring WOL, and the back gate of the transistor T1 is connected to a wiring BGL. A second terminal of the capacitor CA is connected to a wiring CAL.

The wiring BIL functions as a bit line, and the wiring WOL functions as a word line. The wiring CAL functions as a wiring for applying a predetermined potential to the second terminal of the capacitor CA. In data writing and reading, a low-level potential is preferably applied to the wiring CAL. The wiring BGL functions as a wiring for applying a potential to the back gate of the transistor T1.

Applying a given potential to the wiring BGL can increase or decrease the threshold voltage of the transistor T1.

The memory cell MC is not limited to the memory cell 1471, and its circuit configuration can be changed. For example, the memory cell MC may be configured such that the back gate of the transistor T1 is connected to the wiring WOL instead of the wiring BGL, like a memory cell 1472 illustrated in FIG. 14(B). As another example, the memory cell MC may be composed of a single-gate transistor, that is, the transistor T1 without a back gate, like a memory cell 1473 illustrated in FIG. 14(C).

The use of an OS transistor as the transistor T1 enables the leakage current of the transistor T1 to be extremely low. That is, written data can be held for a long time by the transistor T1; thus, the frequency of refresh of the memory cell can be reduced. Alternatively, the refresh operation of the memory cell can be omitted. In addition, the extremely low leakage current allows multi-level data or analog data to be held in the memory cell 1471, the memory cell 1472, and the memory cell 1473.

In the DOSRAM, although not illustrated in the diagram, providing a sense amplifier below the memory cell 1471 so that they overlap each other can shorten the bit line. This reduces the bit line capacity, which reduces the storage capacity of the memory cell.

[NOSRAM]

FIGS. 14(D) to 14(H) illustrate circuit configuration examples of a gain-cell memory cell including two transistors and one capacitor. A memory cell 1474 illustrated in FIG. 14(D) includes a transistor T2, a transistor T3, and a capacitor CB. Note that the transistor T2 includes a front gate (simply referred to as a gate in some cases) and a back gate. In this specification and the like, a memory device including a gain-cell memory cell using an OS transistor as the transistor T2 is referred to as a NOSRAM (Nonvolatile Oxide Semiconductor RAM) in some cases.

A first terminal of the transistor T2 is connected to a first terminal of the capacitor CB, a second terminal of the transistor T2 is connected to a wiring WBL, the gate of the transistor T2 is connected to the wiring WOL, and the back gate of the transistor T2 is connected to the wiring BGL. A second terminal of the capacitor CB is connected to the wiring CAL. A first terminal of the transistor T3 is connected to a wiring RBL, a second terminal of the transistor T3 is connected to a wiring SL, and a gate of the transistor T3 is connected to the first terminal of the capacitor CB.

The wiring WBL functions as a write bit line, the wiring RBL functions as a read bit line, and the wiring WOL functions as a word line. The wiring CAL functions as a wiring for applying a predetermined potential to the second terminal of the capacitor CB. In data writing, data retention, and data reading, a low-level potential is preferably applied to the wiring CAL. The wiring BGL functions as a wiring for applying a potential to the back gate of the transistor T2. Applying a given potential to the wiring BGL can increase or decrease the threshold voltage of the transistor T2.

The memory cell MC is not limited to the memory cell 1474, and its circuit configuration can be changed as appropriate. For example, the memory cell MC may be configured such that the back gate of the transistor T2 is connected to the wiring WOL instead of the wiring BGL, like a memory cell 1475 illustrated in FIG. 14(E). As another example, the memory cell MC may be composed of a single-gate transistor, that is, the transistor T2 without a back gate, like a memory cell 1476 illustrated in FIG. 14(F). As another example of the memory cell MC, the wiring WBL and the wiring RBL may be combined into one wiring BIL, as in a memory cell 1477 illustrated in FIG. 14(G).

In the case where the semiconductor device described in the above embodiment is used in the memory cell 1474 and the like, the transistor 41 can be used as the transistor T2, the transistor 42 can be used as the transistor T3, and the capacitor 43 can be used as the capacitor CB. When an OS transistor is used as the transistor T2, the leakage current of the transistor T2 can be extremely low. Consequently, written data can be held for a long time by the transistor T2; thus, the frequency of refresh of the memory cell can be reduced. Alternatively, the refresh operation of the memory cell can be omitted. In addition, the extremely low leakage current allows multi-level data or analog data to be held in the memory cell 1474. The same applies to the memory cell 1475 to the memory cell 1477.

Note that the transistor T3 may be a Si transistor. The conductivity type of the Si transistor may be an n-channel type or a p-channel type. A Si transistor has higher field-effect mobility than an OS transistor in some cases. Therefore, a Si transistor may be used as the transistor T3 functioning as a reading transistor. Furthermore, the use of a Si transistor as the transistor T3 enables the transistor T2 to be stacked over the transistor T3, in which case the area occupied by the memory cell can be reduced and high integration of the memory device can be achieved.

Alternatively, the transistor T3 may be an OS transistor. When an OS transistor is used as the transistors T2 and M3, the memory cell 1474 to the memory cell 1477 can be formed using only n-channel transistors.

Figure 14H:
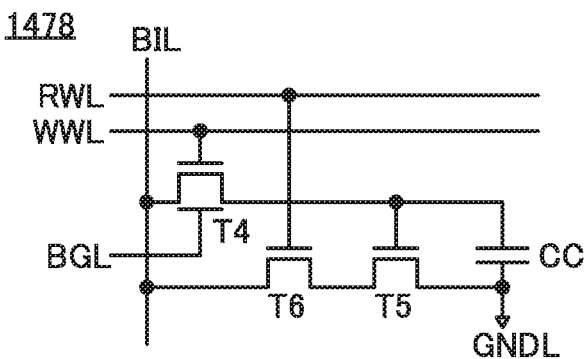

FIG. 14(H) illustrates an example of a gain-cell memory cell including three transistors and one capacitor. A memory cell 1478 illustrated in FIG. 14(H) includes transistors T4 to T6 and a capacitor CC. The capacitor CC is provided as necessary. The memory cell 1478 is electrically connected to wirings BIL, RWL, WWL, BGL, and GNDL. The wiring GNDL is a wiring for supplying a low-level potential. Note that the memory cell 1478 may be electrically connected to the wirings RBL and WBL instead of the wiring BIL.

The transistor T4 is an OS transistor including a back gate, and the back gate is electrically connected to the wiring BGL. Note that the back gate and a gate of the transistor T4 may be electrically connected to each other. Alternatively, the transistor T4 may not include the back gate.

Note that each of the transistors T5 and T6 may be an n-channel Si transistor or a p-channel Si transistor. Alternatively, the transistors T4 to T6 may be OS transistors, in which case the memory cell 1478 can be formed using only n-channel transistors.

Note that the configurations of the memory cell 1471 to the memory cell 1478 and the like shown in this embodiment are not limited to those described above. The arrangement and functions of these circuits and the wirings, circuit components, and the like connected to the circuits can be changed, removed, or added as needed.

This embodiment can be implemented in an appropriate combination with the structures described in the other embodiments and the like.

This embodiment corresponds to an embodiment obtained by performing change, addition, modification, removal, application, superordinate conceptualization, or subordinate conceptualization on part or the whole of another embodiment. Thus, part or the whole of this embodiment can be freely combined or replaced with part or the whole of another embodiment.

Embodiment 4

In this embodiment, an example of a chip 1200 on which the semiconductor device of the present invention is mounted will be described with reference to FIG. 15. A plurality of circuits (systems) are mounted on the chip 1200. The technique for integrating a plurality of circuits (systems) on one chip is referred to as system on chip (SoC) in some cases.

Figure 15A:
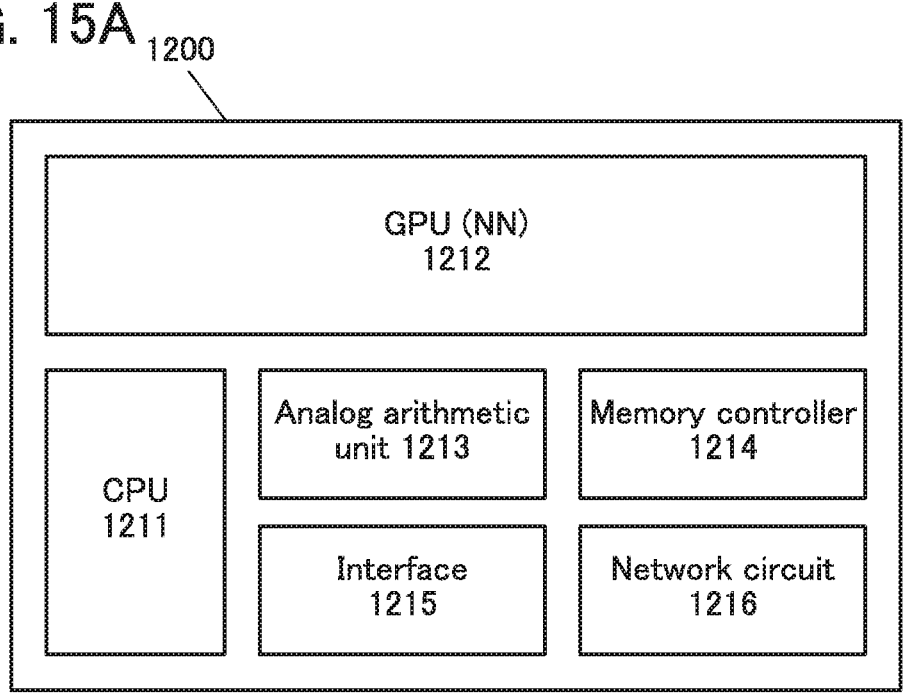
FIG. 15 Schematic diagrams of a semiconductor device.

As illustrated in FIG. 15(A), the chip 1200 includes a CPU (Central Processing Unit) 1211, a GPU (Graphics Processing Unit) 1212, or an analog arithmetic unit 1213, a memory controller 1214, an interface 1215, a network circuit 1216, or the like. The GPU preferably includes a neural network.

Figure 15B:
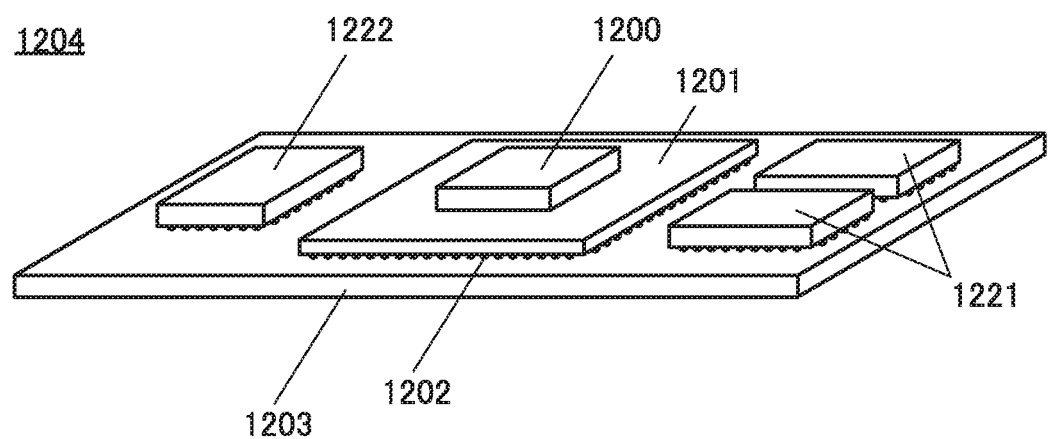

A bump (not illustrated) is provided on the chip 1200 and is connected to a first surface of a printed circuit board (PCB) 1201 as illustrated in FIG. 15(B). A plurality of bumps 1202 are provided on the rear surface of the first surface of the PCB 1201 and are connected to a motherboard 1203.

Memory devices such as a DRAM 1221 and a flash memory 1222 may be provided over the motherboard 1203. For example, the DOSRAM described in the above embodiment can be used as the DRAM 1221. For example, the NOSRAM described in the above embodiment can be used as the flash memory 1222.

The CPU 1211 preferably includes a plurality of CPU cores. The GPU 1212 preferably includes a plurality of GPU cores. The CPU 1211 and the GPU 1212 may each include a memory for storing data temporarily. Alternatively, a common memory for the CPU 1211 and the GPU 1212 may be provided in the chip 1200. As the memory, the NOSRAM or the DOSRAM described above can be used. The GPU 1212 is suitable for parallel computation of a large number of data and thus can be used for image processing and product-sum operation. When an image processing circuit or a product-sum operation circuit using an oxide semiconductor of the present invention is provided in the GPU 1212, image processing and product-sum operation can be performed with low power consumption.

Since the CPU 1211 and the GPU 1212 are provided in the same chip, a wiring between the CPU 1211 and the GPU 1212 can be shortened; accordingly, data transfer from the CPU 1211 to the GPU 1212, data transfer between the memories included in the CPU 1211 and the GPU 1212, and transfer of arithmetic operation results from the GPU 1212 to the CPU 1211 after the arithmetic operation in the GPU 1212 can be performed at high speed.

The analog arithmetic unit 1213 includes one or both of an A/D (analog/digital) converter circuit and a D/A (digital/analog) converter circuit. Furthermore, the analog arithmetic unit 1213 may include the above-described product-sum operation circuit.

The memory controller 1214 includes a circuit functioning as a controller of the DRAM 1221 and a circuit functioning as the interface of the flash memory 1222.

The interface 1215 includes an interface circuit to be connected to an external device such as a display device, a speaker, a microphone, a camera, or a controller. Examples of the controller include a mouse, a keyboard, and a game controller. As such an interface, USB (Universal Serial Bus), HDMI (registered trademark) (High-Definition Multimedia Interface), or the like can be used.

The network circuit 1216 includes a network circuit such as LAN (Local Area Network) and may also include a circuit for network security.

The circuits (systems) can be formed in the chip 1200 in the same manufacturing process. Therefore, even when the number of circuits needed for the chip 1200 increases, there is no need to increase the number of steps in the manufacturing process; thus, the chip 1200 can be manufactured at low cost.

The motherboard 1203 provided with the PCB 1201 on which the chip 1200 including the GPU 1212 is mounted, the DRAM 1221, and the flash memory 1222 can be referred to as a GPU module 1204.

The GPU module 1204 includes the chip 1200 using the SoC technology, and thus can have a small size. The GPU module 1204 is excellent in image processing, and thus is suitably used in portable electronic devices such as a smartphone, a tablet terminal, a laptop PC, and a portable (mobile) game console. The product-sum operation circuit using the GPU 1212 can implement the arithmetic operation in a deep neural network (DNN), a convolutional neural network (CNN), a recurrent neural network (RNN), an autoencoder, a deep Boltzmann machine (DBM), a deep belief network (DBN), or the like; hence, the chip 1200 can be used as an AI chip or the GPU module 1204 can be used as an AI system module.

The structure described in this embodiment can be used in an appropriate combination with the structures described in the other embodiments.

Embodiment 5

In this embodiment, application examples of the memory device using the semiconductor device described in the above embodiment will be described. The semiconductor device described in the above embodiment can be applied to, for example, memory devices of a variety of electronic devices (e.g., information terminals, computers, smartphones, e-book readers, digital cameras (including video cameras), video recording/reproducing devices, and navigation systems). Here, the computers refer not only to tablet computers, notebook computers, and desktop computers, but also to large computers such as server systems. Alternatively, the semiconductor device described in the above embodiment is applied to a variety of removable memory devices such as memory cards (e.g., SD cards), USB memories, and SSDs (solid state drives). FIG. 16 schematically illustrates some structure examples of removable memory devices. The semiconductor device described in the above embodiment is processed into a packaged memory chip and used in a variety of storage devices and removable memories, for example.

Figure 16A:
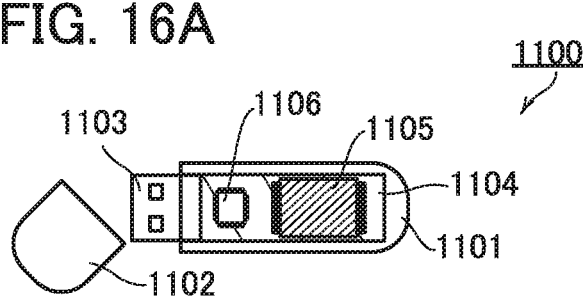
FIG. 16 Schematic diagrams of memory devices.

FIG. 16(A) is a schematic diagram of a USB memory. A USB memory 1100 includes a housing 1101, a cap 1102, a USB connector 1103, and a substrate 1104. The substrate 1104 is held in the housing 1101. The substrate 1104 is provided with a memory chip 1105 and a controller chip 1106, for example. The semiconductor device described in the above embodiment can be incorporated in the memory chip 1105 or the like on the substrate 1104.

Figures 16B, 16C:
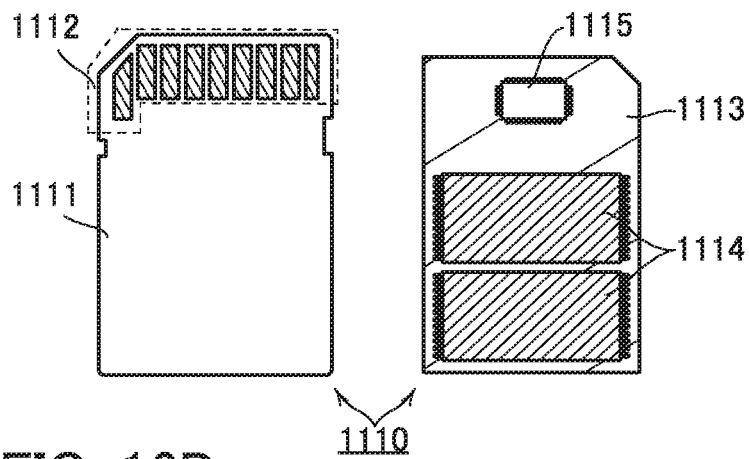

FIG. 16(B) is an external schematic diagram of an SD card, and FIG. 16(C) is a schematic diagram of the internal structure of the SD card. An SD card 1110 includes a housing 1111, a connector 1112, and a substrate 1113. The substrate 1113 is held in the housing 1111. The substrate 1113 is provided with a memory chip 1114 and a controller chip 1115, for example. When the memory chip 1114 is also provided on a back side of the substrate 1113, the capacity of the SD card 1110 can be increased. In addition, a wireless chip with a radio communication function may be provided on the substrate 1113. With such a wireless chip, data can be read from and written in the memory chip 1114 by radio communication between a host device and the SD card 1110.

The semiconductor device described in the above embodiment can be incorporated in the memory chip 1114 or the like on the substrate 1113.

Figures 16D, 16E:
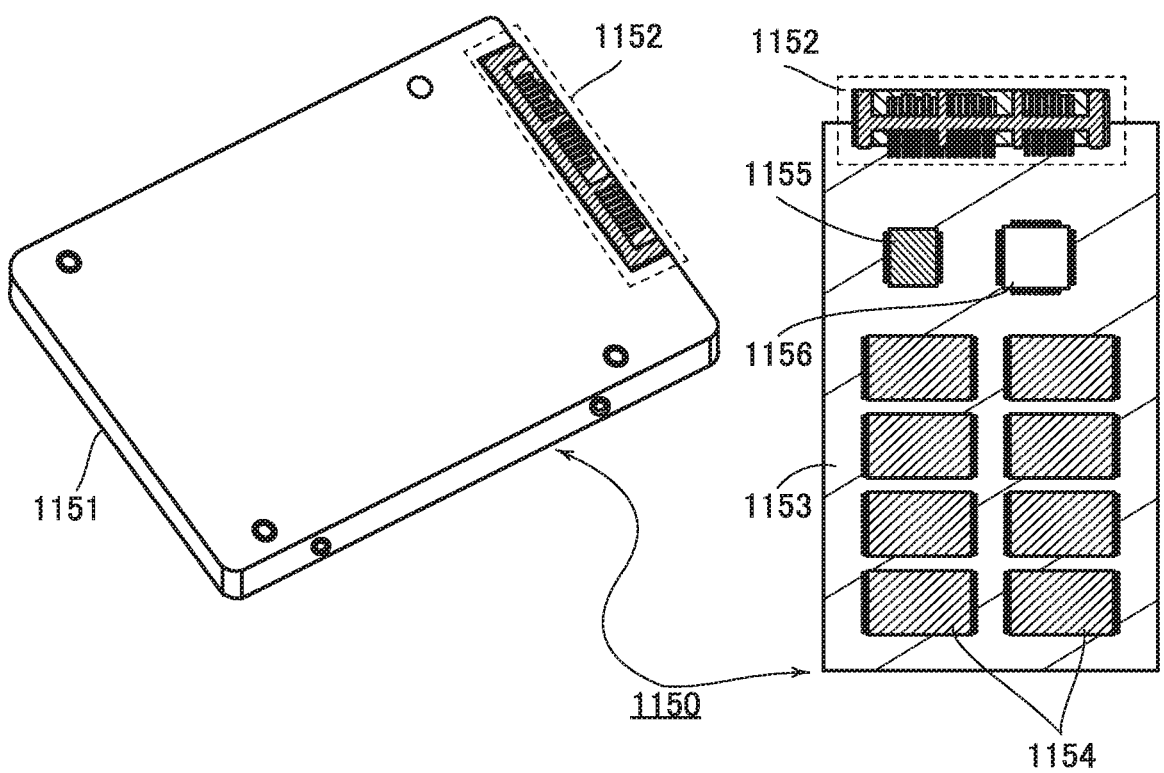

FIG. 16(D) is an external schematic diagram of an SSD, and FIG. 16(E) is a schematic diagram of the internal structure of the SSD. An SSD 1150 includes a housing 1151, a connector 1152, and a substrate 1153. The substrate 1153 is held in the housing 1151. The substrate 1153 is provided with a memory chip 1154, a memory chip 1155, and a controller chip 1156, for example. The memory chip 1155 is a work memory of the controller chip 1156, and a DOSRAM chip can be used, for example. When the memory chip 1154 is also provided on a back side of the substrate 1153, the capacity of the SSD 1150 can be increased. The semiconductor device described in the above embodiment can be incorporated in the memory chip 1154 or the like on the substrate 1153.

This embodiment can be implemented in an appropriate combination with the structures described in the other embodiments and the like.

Embodiment 6

<Electronic Device>

A semiconductor device of one embodiment of the present invention can be used for a variety of electronic devices. FIG. 17 illustrates specific examples of electronic devices using the semiconductor device of one embodiment of the present invention.

Figure 17A:
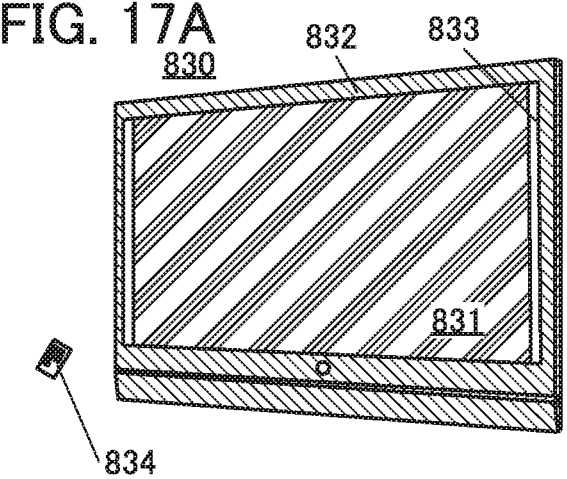
FIG. 17 Diagrams illustrating electronic devices.

FIG. 17(A) illustrates a monitor 830. The monitor 830 includes a display portion 831, a housing 832, a speaker 833, and the like. Furthermore, the monitor can include an LED lamp, operation keys (including a power switch or an operation switch), a connection terminal, a variety of sensors, a microphone, and the like. The monitor 830 can be controlled with a remote controller 834.

The monitor 830 can function as a television device by receiving airwaves.

Examples of the airwaves the monitor 830 can receive include ground waves and waves transmitted from a satellite. Furthermore, as the airwaves, airwaves for analog broadcasting, digital broadcasting, image-and-sound broadcasting, audio-only broadcasting, and the like can be given. For example, airwaves transmitted in a certain frequency band in a UHF band (higher than or equal to 300 MHz and lower than or equal to 3 GHz) or a VHF band (higher than or equal to 30 MHz and lower than or equal to 300 MHz) can be received. When a plurality of pieces of data received in a plurality of frequency bands are used, the transfer rate can be increased and more information can be obtained. Accordingly, the display portion 831 can display an image with a resolution exceeding the full high definition. An image with a resolution of, for example, 4K2K, 8K4K, 16K8K, or more can be displayed.

A structure may be employed in which an image to be displayed on the display portion 831 is generated using broadcasting data transmitted with a technology for transmitting data via a computer network such as the Internet, a LAN (Local Area Network), or Wi-Fi (registered trademark). In this case, the monitor 830 does not need to include a tuner.

The monitor 830 can be used as a computer monitor when connected to a computer. Several people can see the monitor 830 connected to a computer at the same time; thus, the monitor 830 can be used for a conference system. The monitor 830 can also be used for a videoconference system by display of data in a computer via a network or connection of the monitor 830 itself to a network.

The monitor 830 can also be used as digital signage.

The semiconductor device of one embodiment of the present invention can be used for, for example, a driver circuit or an image processing portion of the display portion. When the semiconductor device of one embodiment of the present invention is used for the driver circuit or the image processing portion of the display portion, high-speed operation or signal processing can be achieved with low power consumption.

When an AI system using the semiconductor device of one embodiment of the present invention is used for the image processing portion of the monitor 830, image processing such as noise removal processing, grayscale conversion processing, color tone correction processing, or luminance correction processing can be performed. Furthermore, pixel interpolation processing due to resolution up-conversion, frame interpolation processing due to frame frequency up-conversion, or the like can be performed. In the grayscale conversion processing, not only the number of grayscale levels of an image can be changed, but also interpolation of the gray value in the case of increasing the number of grayscale levels can be performed. In addition, high-dynamic range (HDR) processing for increasing a dynamic range is also included in the grayscale conversion processing.

Figure 17B:
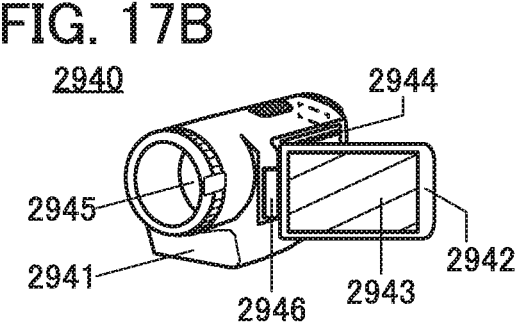

A video camera 2940 illustrated in FIG. 17(B) includes a housing 2941, a housing 2942, a display portion 2943, operation switches 2944, a lens 2945, a joint 2946, and the like. The operation switches 2944 and the lens 2945 are provided on the housing 2941, and the display portion 2943 is provided on the housing 2942. The video camera 2940 also includes an antenna, a battery, and the like inside the housing 2941. The housing 2941 and the housing 2942 are connected to each other with the joint 2946, and the angle between the housing 2941 and the housing 2942 can be changed with the joint 2946. The orientation of an image displayed on the display portion 2943 can be changed and display and non-display of an image can be switched depending on the angle between the housing 2941 and the housing 2942.

The semiconductor device of one embodiment of the present invention can be used for, for example, a driver circuit or an image processing portion of the display portion. When the semiconductor device of one embodiment of the present invention is used for the driver circuit or the image processing portion of the display portion, high-speed operation or signal processing can be achieved with low power consumption.

When an AI system using the semiconductor device of one embodiment of the present invention is used for the image processing portion of the video camera 2940, imaging appropriate for the surroundings of the video camera 2940 can be achieved. Specifically, imaging can be performed with optimal exposure for the surrounding brightness. In the case of performing imaging with backlighting or imaging under different brightness conditions such as indoors and outdoors at the same time, high-dynamic-range (HDR) imaging can be performed.

Furthermore, the AI system can learn the user's habit and assist in performing imaging. Specifically, the AI system can learn the user's camera shaking habit and correct the camera shaking during imaging, so that blurring of the obtained image associated with camera shaking can be reduced as much as possible. In the case of using a zoom function during imaging, the orientation of the lens or the like can be controlled such that a subject is positioned at the center of an image all the time.

Figure 17C:
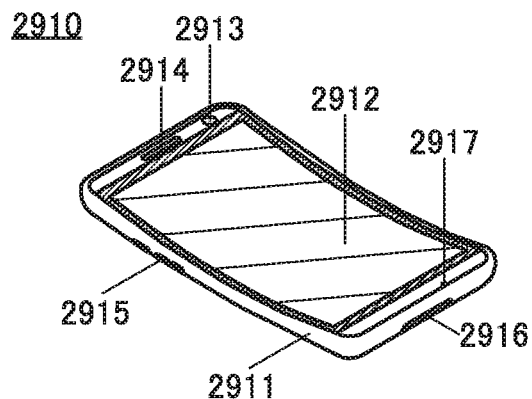

An information terminal 2910 illustrated in FIG. 17(C) includes a housing 2911, a display portion 2912, a microphone 2917, a speaker portion 2914, a camera 2913, an external connection portion 2916, operation switches 2915, and the like. A display panel and a touch screen that use a flexible substrate are provided in the display portion 2912. The information terminal 2910 also includes an antenna, a battery, and the like inside the housing 2911. The information terminal 2910 can be used as, for example, a smartphone, a mobile phone, a tablet information terminal, a tablet personal computer, or an e-book reader.

For example, a memory device using the semiconductor device of one embodiment of the present invention can retain control data, a control program, or the like of the information terminal 2910 for a long time.

When an AI system using the semiconductor device of one embodiment of the present invention is used for an image processing portion of the information terminal 2910, image processing such as noise removal processing, grayscale conversion processing, color tone correction processing, or luminance correction processing can be performed. Furthermore, pixel interpolation processing due to resolution up-conversion, frame interpolation processing due to frame frequency up-conversion, or the like can be performed. In the grayscale conversion processing, not only the number of grayscale levels of an image can be changed, but also interpolation of the gray value in the case of increasing the number of grayscale levels can be performed. In addition, high-dynamic range (HDR) processing for increasing a dynamic range is also included in the grayscale conversion processing.

Furthermore, the AI system can learn the user's habit and assist in operating the information terminal 2910. The information terminal 2910 into which the AI system is incorporated can predict touch input from the motion of the user's fingers, eyes, or the like.

Figure 17D:
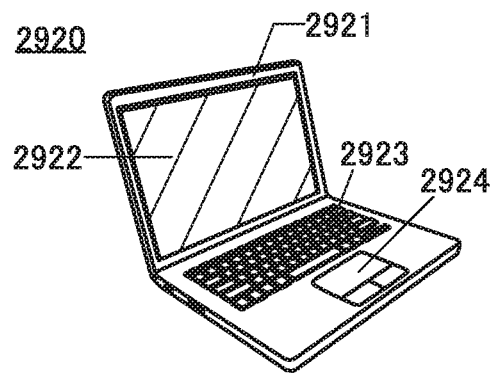

A laptop personal computer 2920 illustrated in FIG. 17(D) includes a housing 2921, a display portion 2922, a keyboard 2923, a pointing device 2924, and the like. The laptop personal computer 2920 also includes an antenna, a battery, and the like inside the housing 2921.

For example, a memory device using the semiconductor device of one embodiment of the present invention can retain control data, a control program, or the like of the laptop personal computer 2920 for a long time.

When an AI system using the semiconductor device of one embodiment of the present invention is used for an image processing portion of the laptop personal computer 2920, image processing such as noise removal processing, grayscale conversion processing, color tone correction processing, or luminance correction processing can be performed. Furthermore, pixel interpolation processing due to resolution up-conversion, frame interpolation processing due to frame frequency up-conversion, or the like can be performed. In the grayscale conversion processing, not only the number of grayscale levels of an image can be changed, but also interpolation of the gray value in the case of increasing the number of grayscale levels can be performed. In addition, high-dynamic range (HDR) processing for increasing a dynamic range is also included in the grayscale conversion processing.

Furthermore, the AI system can learn the user's habit and assist in operating the laptop personal computer 2920. The laptop personal computer 2920 into which the AI system is incorporated can predict touch input to the display portion 2922, from the motion of the user's fingers, eyes, or the like. In text inputting, the AI system predicts input from the past input text data or a text or a diagram such as a photograph around the text to be input, to assist conversion. Accordingly, input mistakes and conversion mistakes can be reduced as much as possible.

Figure 17E:
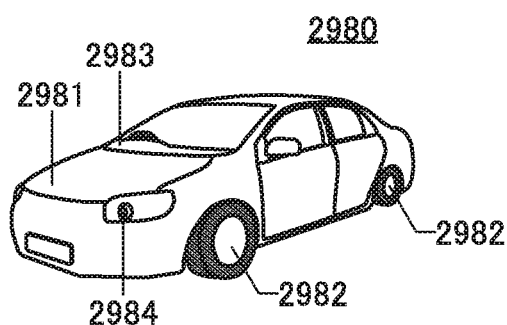
Figure 17F:
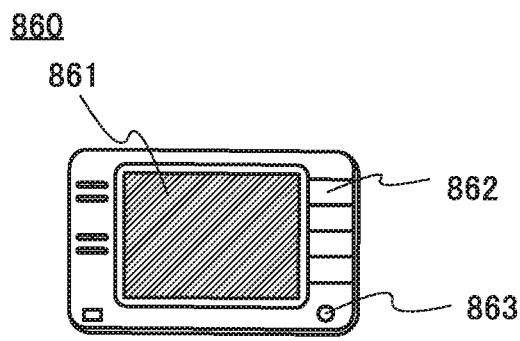

FIG. 17(E) is an external view illustrating an example of an automobile, and FIG. 17(F) illustrates a navigation device 860. An automobile 2980 includes a car body 2981, wheels 2982, a dashboard 2983, lights 2984, and the like. The automobile 2980 also includes an antenna, a battery, and the like. The navigation device 860 includes a display portion 861, operation buttons 862, and an external input terminal 863. The automobile 2980 and the navigation device 860 can be independent of each other; however, it is preferable to employ a structure in which the navigation device 860 is incorporated into and linked to the automobile 2980.

For example, a memory device using the semiconductor device of one embodiment of the present invention can retain control data, a control program, or the like of the automobile 2980 or the navigation device 860 for a long time. When an AI system using the semiconductor device of one embodiment of the present invention is used for a control device or the like of the automobile 2980, the AI system can learn the driver's driving skill and habit, and assist in safe driving or driving involving efficient use of fuel such as gasoline or a battery. To assist in safe driving, the AI system learns not only the driver's driving skill and habit, but also the behavior of the automobile such as the speed and movement of the automobile 2980, road information saved in the navigation device 860, and the like complexly; thus, driving lane departure can be prevented and collision with other automobiles, pedestrians, objects, and the like can be avoided. Specifically, when there is a sharp curve in the traveling direction, the navigation device 860 transmits the road information to the automobile 2980 so that the speed of the automobile 2980 can be controlled and steering can be assisted.

This embodiment can be implemented in an appropriate combination with the structures described in the other embodiments and the like.

Embodiment 7

In this embodiment, a structure example of a semiconductor device that can be used in the GPU or the computer described in the above embodiment and an OS transistor that can be used in the semiconductor device will be described.

<Structure Example of Semiconductor Device>

Figure 18:
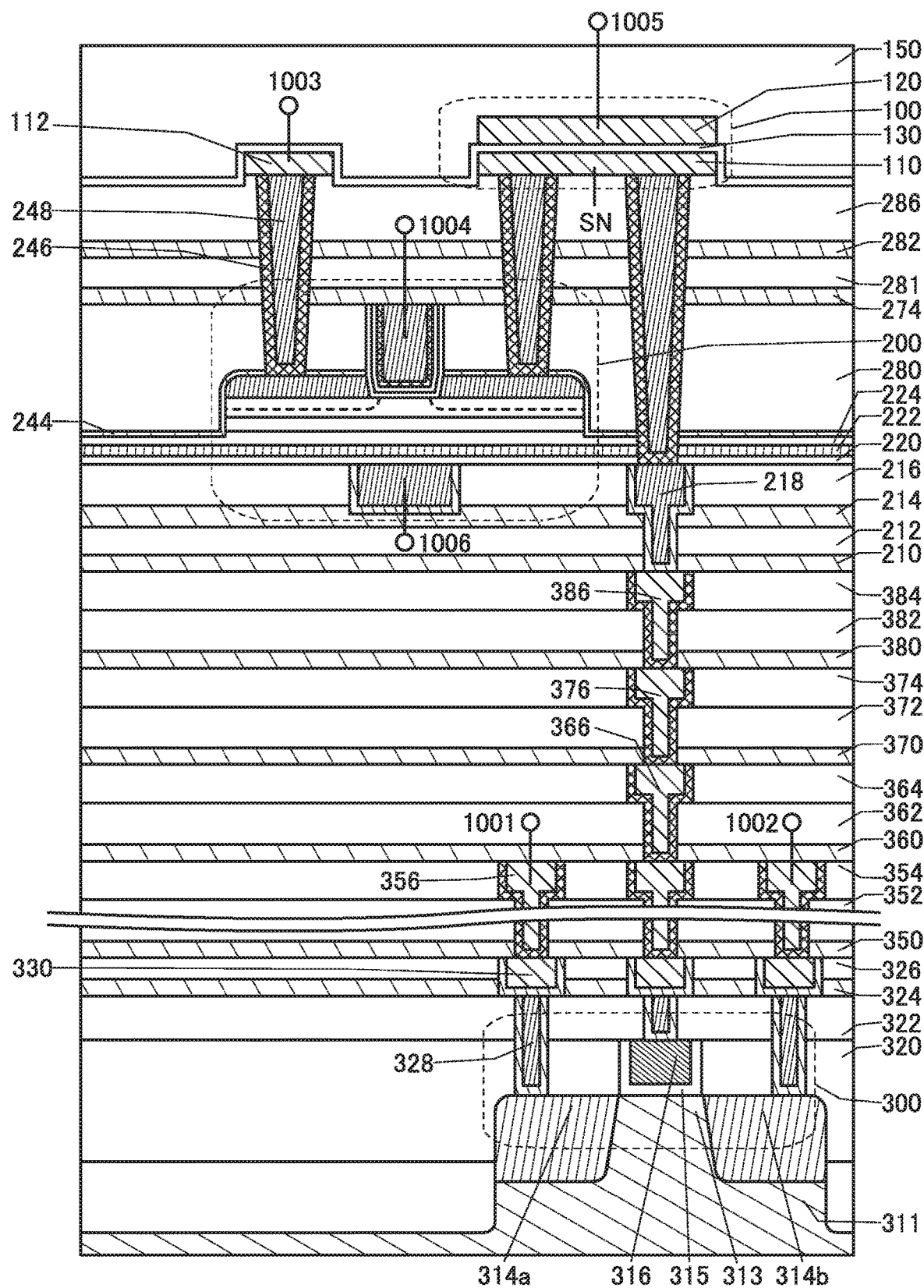
FIG. 18 A diagram illustrating a structure example of a semiconductor device.
Figure 19A:
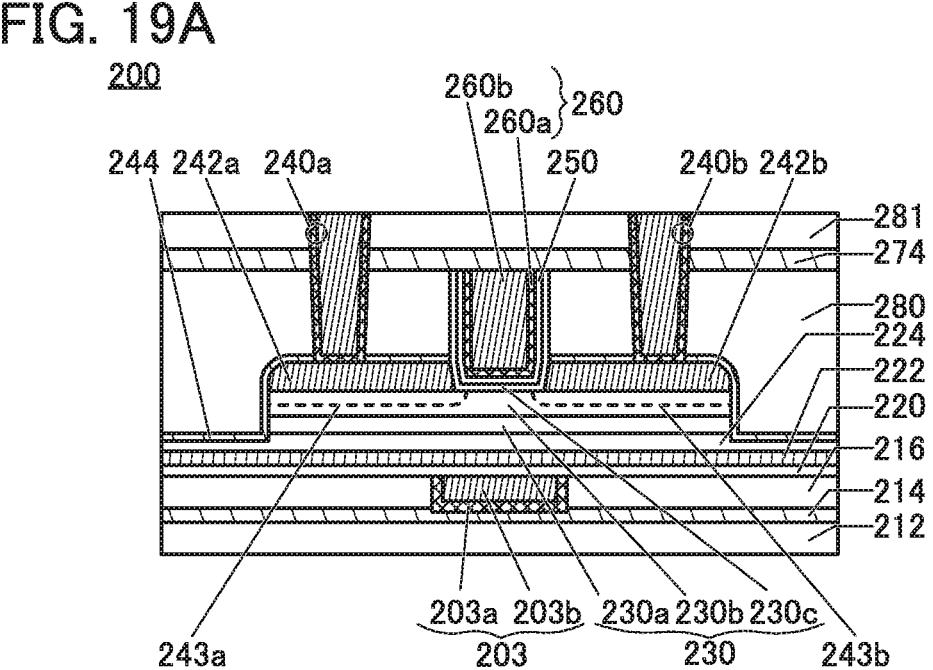
FIG. 19 Diagrams illustrating a structure example of transistors.
Figure 19B:
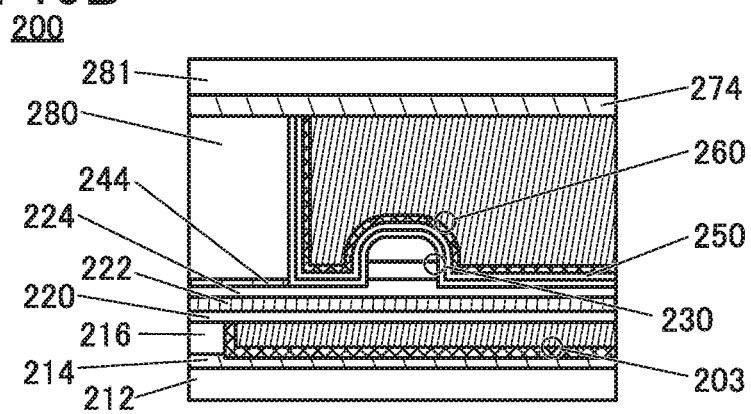
Figure 19C:
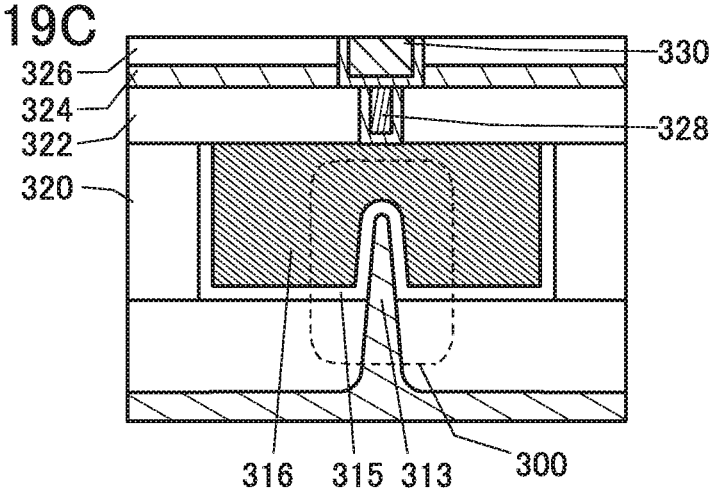

A semiconductor device illustrated in FIG. 18 includes a transistor 300, a transistor 200, and a capacitor 100. FIG. 19(A) is a cross-sectional view of the transistor 200 in the channel length direction, FIG. 19(B) is a cross-sectional view of the transistor 200 in the channel width direction, and FIG. 19(C) is a cross-sectional view of the transistor 300 in the channel width direction.

The transistor 200 is a transistor in which a channel is formed in a semiconductor layer including an oxide semiconductor. The off-state current of the transistor 200 is low, so that a semiconductor device using such a transistor can retain the stored content for a long time. In other words, refresh operation is not required or the frequency of refresh operation is extremely low; thus, power consumption of the semiconductor device can be sufficiently reduced.

In the semiconductor device illustrated in FIG. 18, a wiring 1001 is connected to one of a source and a drain of the transistor 300, and a wiring 1002 is connected to the other of the source and the drain of the transistor 300. A wiring 1003 is connected to one of a source and a drain of the transistor 200, a wiring 1004 is connected to a top gate of the transistor 200, and a wiring 1006 is connected to a bottom gate of the transistor 200. A gate of the transistor 300 and the other of the source and the drain of the transistor 200 are connected to one electrode of the capacitor 100, and a wiring 1005 is connected to the other electrode of the capacitor 100.

Here, in the case where the semiconductor device described in this embodiment is used in the memory cell described in Embodiment 3, the transistor T2, the transistor T3, and the capacitor CB correspond to the transistor 200, the transistor 300, and the capacitor 100, respectively. The wiring SL, the wiring RBL, the wiring WBL, the wiring WOL, the wiring CAL, and the wiring BGL correspond to the wiring 1001, the wiring 1002, the wiring 1003, the wiring 1004, the wiring 1005, and the wiring 1006, respectively.

In the case where the semiconductor device described in this embodiment is used in the arithmetic circuit described in Embodiment 2, the transistor 42, the transistor 41, and the capacitor 43 correspond to the transistor 300, the transistor 200, and the capacitor 100, respectively, for example.

In the case where the semiconductor device described in this embodiment is used in both the memory cell and the arithmetic circuit, the transistor T3 and the transistor 42 can be formed in the same steps, the transistor T2 and the transistor 41 can be formed in the same steps, and the capacitor CB and the capacitor 43 can be formed in the same steps. Thus, the manufacturing process can be simplified, and the cost can be reduced.

The semiconductor device of one embodiment of the present invention includes the transistor 300, the transistor 200, and the capacitor 100 as illustrated in FIG. 18. The transistor 200 is provided above the transistor 300, and the capacitor 100 is provided above the transistor 300 and the transistor 200.

The transistor 300 is provided on a substrate 311 and includes a conductor 316, an insulator 315, a semiconductor region 313 that is a part of the substrate 311, and a low-resistance region 314a and a low-resistance region 314b functioning as a source region and a drain region.

As illustrated in FIG. 19(C), in the transistor 300, a top surface and a side surface in the channel width direction of the semiconductor region 313 are covered with the conductor 316 with the insulator 315 therebetween. The effective channel width is increased in the FIN-type transistor 300, whereby the on-state characteristics of the transistor 300 can be improved. In addition, since contribution of an electric field of the gate electrode can be increased, the off-state characteristics of the transistor 300 can be improved.

Note that the transistor 300 can be a p-channel transistor or an n-channel transistor.

It is preferable that a region of the semiconductor region 313 where a channel is formed, a region in the vicinity thereof, the low-resistance region 314a and the low-resistance region 314b functioning as the source region and the drain region, and the like contain a semiconductor such as a silicon-based semiconductor, further preferably single crystal silicon. Alternatively, these regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and thereby changing the lattice spacing is used. Alternatively, the transistor 300 may be an HEMT (High Electron Mobility Transistor) with GaAs and GaAlAs, or the like.

The low-resistance region 314a and the low-resistance region 314b contain an element that imparts n-type conductivity, such as arsenic or phosphorus, or an element that imparts p-type conductivity, such as boron, in addition to the semiconductor material used for the semiconductor region 313.

The conductor 316 functioning as a gate electrode can be formed using a semiconductor material such as silicon containing an element that imparts n-type conductivity, such as arsenic or phosphorus, or an element that imparts p-type conductivity, such as boron, or using a conductive material such as a metal material, an alloy material, or a metal oxide material.

Note that since the work function of a conductor depends on a material of the conductor, Vth of the transistor can be adjusted by changing the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Note that the transistor 300 illustrated in FIG. 18 is just an example and the structure is not limited thereto; an appropriate transistor can be used in accordance with a circuit configuration or a driving method. For example, like the transistor 200, the transistor 300 may be formed using an oxide semiconductor.

An insulator 320, an insulator 322, an insulator 324, and an insulator 326 are stacked in this order to cover the transistor 300.

The insulator 320, the insulator 322, the insulator 324, and the insulator 326 can be formed using, for example, silicon oxide, silicon oxynitride, silicon nitride oxide, silicon nitride, aluminum oxide, aluminum oxynitride, aluminum nitride oxide, or aluminum nitride.

The insulator 322 has a function of a planarization film for planarizing a level difference caused by the transistor 300 or the like provided below the insulator 322. For example, a top surface of the insulator 322 may be planarized by planarization treatment using a chemical mechanical polishing (CMP) method or the like to improve planarity.

The insulator 324 is preferably formed using a film having a barrier property that prevents diffusion of hydrogen or impurities from the substrate 311, the transistor 300, or the like into a region where the transistor 200 is provided.

For the film having a barrier property against hydrogen, silicon nitride formed by a CVD method can be used, for example. Here, the diffusion of hydrogen to a semiconductor element including an oxide semiconductor, such as the transistor 200, degrades the characteristics of the semiconductor element in some cases. Therefore, a film that inhibits hydrogen diffusion is preferably provided between the transistor 200 and the transistor 300. The film that inhibits hydrogen diffusion is specifically a film from which a small amount of hydrogen is released.

The amount of released hydrogen can be measured by thermal desorption spectroscopy (TDS), for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for an interlayer film, the parasitic capacitance generated between wirings can be reduced.

A conductor 328, a conductor 330, and the like that are connected to the capacitor 100 or the transistor 200 are embedded in the insulator 320, the insulator 322, the insulator 324, and the insulator 326. Note that the conductor 328 and the conductor 330 function as a plug or a wiring. A plurality of conductors functioning as plugs or wirings are collectively denoted by the same reference numeral in some cases. Furthermore, in this specification and the like, a wiring and a plug connected to the wiring may be a single component. That is, there are cases where part of a conductor functions as a wiring and another part of the conductor functions as a plug.

As a material for each of plugs and wirings (the conductor 328, the conductor 330, and the like), a single layer or stacked layers of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to use a low-resistance conductive material such as aluminum or copper. The use of a low-resistance conductive material can reduce wiring resistance.

A wiring layer may be provided over the insulator 326 and the conductor 330. For example, in FIG. 18, an insulator 350, an insulator 352, and an insulator 354 are provided to be stacked in this order. Furthermore, a conductor 356 is formed in the insulator 350, the insulator 352, and the insulator 354. The conductor 356 functions as a plug or a wiring that is connected to the transistor 300. Note that the conductor 356 can be provided using a material similar to those for the conductor 328 and the conductor 330.

For example, like the insulator 324, the insulator 350 is preferably formed using an insulator having a barrier property against hydrogen. Furthermore, the conductor 356 preferably contains a conductor having a barrier property against hydrogen. In particular, the conductor having a barrier property against hydrogen is formed in an opening of the insulator 350 having a barrier property against hydrogen. With this structure, the transistor 300 and the transistor 200 can be separated by a barrier layer, so that the diffusion of hydrogen from the transistor 300 into the transistor 200 can be inhibited.

Note that for the conductor having a barrier property against hydrogen, tantalum nitride is preferably used, for example. The use of a stack including tantalum nitride and tungsten having high conductivity can inhibit the diffusion of hydrogen from the transistor 300 while the conductivity of a wiring is kept. In that case, the tantalum nitride layer having a barrier property against hydrogen is preferably in contact with the insulator 350 having a barrier property against hydrogen.

A wiring layer may be provided over the insulator 354 and the conductor 356. For example, in FIG. 18, an insulator 360, an insulator 362, and an insulator 364 are provided to be stacked in this order. Furthermore, a conductor 366 is formed in the insulator 360, the insulator 362, and the insulator 364. The conductor 366 functions as a plug or a wiring. Note that the conductor 366 can be provided using a material similar to those for the conductor 328 and the conductor 330.

For example, like the insulator 324, the insulator 360 is preferably formed using an insulator having a barrier property against hydrogen. Furthermore, the conductor 366 preferably contains a conductor having a barrier property against hydrogen. In particular, the conductor having a barrier property against hydrogen is formed in an opening of the insulator 360 having a barrier property against hydrogen. With this structure, the transistor 300 and the transistor 200 can be separated by a barrier layer, so that the diffusion of hydrogen from the transistor 300 into the transistor 200 can be inhibited.

A wiring layer may be provided over the insulator 364 and the conductor 366. For example, in FIG. 18, an insulator 370, an insulator 372, and an insulator 374 are provided to be stacked in this order. Furthermore, a conductor 376 is formed in the insulator 370, the insulator 372, and the insulator 374. The conductor 376 functions as a plug or a wiring. Note that the conductor 376 can be provided using a material similar to those for the conductor 328 and the conductor 330.

For example, like the insulator 324, the insulator 370 is preferably formed using an insulator having a barrier property against hydrogen. Furthermore, the conductor 376 preferably contains a conductor having a barrier property against hydrogen. In particular, the conductor having a barrier property against hydrogen is formed in an opening of the insulator 370 having a barrier property against hydrogen. With this structure, the transistor 300 and the transistor 200 can be separated by a barrier layer, so that the diffusion of hydrogen from the transistor 300 into the transistor 200 can be inhibited.

A wiring layer may be provided over the insulator 374 and the conductor 376. For example, in FIG. 18, an insulator 380, an insulator 382, and an insulator 384 are provided to be stacked in this order. Furthermore, a conductor 386 is formed in the insulator 380, the insulator 382, and the insulator 384. The conductor 386 functions as a plug or a wiring. Note that the conductor 386 can be provided using a material similar to those for the conductor 328 and the conductor 330.

For example, like the insulator 324, the insulator 380 is preferably formed using an insulator having a barrier property against hydrogen. Furthermore, the conductor 386 preferably contains a conductor having a barrier property against hydrogen. In particular, the conductor having a barrier property against hydrogen is formed in an opening of the insulator 380 having a barrier property against hydrogen. With this structure, the transistor 300 and the transistor 200 can be separated by a barrier layer, so that the diffusion of hydrogen from the transistor 300 into the transistor 200 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 210, an insulator 212, an insulator 214, and an insulator 216 are provided to be stacked in this order over the insulator 384. A substance having a barrier property against oxygen or hydrogen is preferably used for one of the insulator 210, the insulator 212, the insulator 214, and the insulator 216.

For example, the insulator 210 and the insulator 214 are preferably formed using a film having a barrier property that prevents diffusion of hydrogen or impurities from the substrate 311, the region where the transistor 300 is provided, or the like into the region where the transistor 200 is provided. Therefore, a material similar to that for the insulator 324 can be used.

For the film having a barrier property against hydrogen, silicon nitride formed by a CVD method can be used, for example. Here, the diffusion of hydrogen to a semiconductor element including an oxide semiconductor, such as the transistor 200, degrades the characteristics of the semiconductor element in some cases. Therefore, a film that inhibits hydrogen diffusion is preferably provided between the transistor 200 and the transistor 300. The film that inhibits hydrogen diffusion is specifically a film from which a small amount of hydrogen is released.

For the film having a barrier property against hydrogen used as the insulator 210 and the insulator 214, for example, a metal oxide such as aluminum oxide, hafnium oxide, or tantalum oxide is preferably used.

In particular, aluminum oxide has a high blocking effect that inhibits the passage of both oxygen and impurities such as hydrogen and moisture which are factors of a change in electrical characteristics of the transistor. Accordingly, aluminum oxide can prevent the entry of impurities such as hydrogen and moisture into the transistor 200 in the fabrication process and after the fabrication of the transistor. In addition, release of oxygen from the oxide included in the transistor 200 can be inhibited. Therefore, aluminum oxide is suitably used for a protective film of the transistor 200.

The insulator 212 and the insulator 216 can be formed using a material similar to that for the insulator 320, for example. When a material with a relatively low permittivity is used for an interlayer film, the parasitic capacitance between wirings can be reduced. A silicon oxide film, a silicon oxynitride film, or the like can be used as the insulator 212 and the insulator 216, for example.

A conductor 218, a conductor included in the transistor 200 (a conductor 203), and the like are embedded in the insulator 210, the insulator 212, the insulator 214, and the insulator 216. Note that the conductor 218 functions as a plug or a wiring that is connected to the capacitor 100 or the transistor 300. The conductor 218 can be provided using a material similar to those for the conductor 328 and the conductor 330.

In particular, the conductor 218 in a region in contact with the insulator 210 and the insulator 214 is preferably a conductor having a barrier property against oxygen, hydrogen, and water. With this structure, the transistor 300 and the transistor 200 can be separated by the layer having a barrier property against oxygen, hydrogen, and water; thus, the diffusion of hydrogen from the transistor 300 into the transistor 200 can be inhibited.

The transistor 200 is provided above the insulator 216.

As illustrated in FIGS. 19(A) and 19(B), the transistor 200 includes the conductor 203 positioned to be embedded in the insulator 214 and the insulator 216; an insulator 220 positioned over the insulator 216 and the conductor 203; an insulator 222 positioned over the insulator 220; an insulator 224 positioned over the insulator 222; an oxide 230a positioned over the insulator 224; an oxide 230b positioned over the oxide 230a; a conductor 242a and a conductor 242b positioned apart from each other over the oxide 230b; an insulator 280 that is positioned over the conductor 242a and the conductor 242b and includes an opening overlapping a region between the conductor 242a and the conductor 242b; a conductor 260 positioned in the opening; an insulator 250 positioned between the conductor 260 and the oxide 230b, the conductor 242a, the conductor 242b, and the insulator 280; and an oxide 230c positioned between the insulator 250 and the oxide 230b, the conductor 242a, the conductor 242b, and the insulator 280. As illustrated in FIGS. 19(A) and 19(B), an insulator 244 is preferably positioned between the insulator 280 and the oxide 230a, the oxide 230b, the conductor 242a, and the conductor 242b. In addition, as illustrated in FIGS. 19(A) and 19(B), the conductor 260 preferably includes a conductor 260a provided inside the insulator 250 and a conductor 260b embedded inside the conductor 260a. Moreover, as illustrated in FIGS. 19(A) and 19(B), an insulator 274 is preferably positioned over the insulator 280, the conductor 260, and the insulator 250.

Hereinafter, the oxide 230a, the oxide 230b, and the oxide 230c may be collectively referred to as an oxide 230. The conductor 242a and the conductor 242b may be collectively referred to as a conductor 242.

The transistor 200 has a structure in which three layers of the oxide 230a, the oxide 230b, and the oxide 230c are stacked in the region where the channel is formed and its vicinity; however, the present invention is not limited thereto. For example, a single layer of the oxide 230b, a two-layer structure of the oxide 230b and the oxide 230a, a two-layer structure of the oxide 230b and the oxide 230c, or a stacked-layer structure of four or more layers may be provided. Although the conductor 260 is shown to have a stacked-layer structure of two layers in the transistor 200, the present invention is not limited thereto. For example, the conductor 260 may have a single-layer structure or a stacked-layer structure of three or more layers. Note that the transistor 200 illustrated in FIG. 18 and FIGS. 19(A) and 19(B) is an example, and the structure is not limited thereto; an appropriate transistor can be used in accordance with a circuit configuration or a driving method.

Here, the conductor 260 functions as a gate electrode of the transistor, and the conductor 242a and the conductor 242b function as a source electrode and a drain electrode. As described above, the conductor 260 is formed to be embedded in the opening of the insulator 280 and the region between the conductor 242a and the conductor 242b. The positions of the conductor 260, the conductor 242a, and the conductor 242b are selected in a self-aligned manner with respect to the opening of the insulator 280. That is, in the transistor 200, the gate electrode can be positioned between the source electrode and the drain electrode in a self-aligned manner. Therefore, the conductor 260 can be formed without an alignment margin, resulting in a reduction in the area occupied by the transistor 200. Accordingly, miniaturization and high integration of the semiconductor device can be achieved.

In addition, since the conductor 260 is formed in the region between the conductor 242a and the conductor 242b in a self-aligned manner, the conductor 260 does not have a region overlapping the conductor 242a or the conductor 242b. Thus, parasitic capacitance formed between the conductor 260 and each of the conductor 242a and the conductor 242b can be reduced. As a result, the switching speed of the transistor 200 can be increased, and the transistor 200 can have high frequency characteristics.

The conductor 260 sometimes functions as a first gate (also referred to as top gate) electrode. The conductor 203 sometimes functions as a second gate (also referred to as bottom gate) electrode. In that case, Vth of the transistor 200 can be controlled by changing a potential applied to the conductor 203 independently of a potential applied to the conductor 260. In particular, Vth of the transistor 200 can be higher than 0 V and the off-state current can be reduced by applying a negative potential to the conductor 203. Thus, a drain current at the time when a potential applied to the conductor 260 is 0 V can be lower in the case where a negative potential is applied to the conductor 203 than in the case where a negative potential is not applied to the conductor 203.

The conductor 203 is positioned to be overlapped by the oxide 230 and the conductor 260. Thus, when potentials are applied to the conductor 260 and the conductor 203, an electric field generated from the conductor 260 and an electric field generated from the conductor 203 are connected, so that the channel formation region formed in the oxide 230 can be covered. In this specification, a transistor structure in which a channel formation region is electrically surrounded by electric fields of a first gate electrode and a second gate electrode is referred to as a surrounded channel (S-channel) structure.

The conductor 203 has a structure similar to that of the conductor 218; a conductor 203a is formed in contact with an inner wall of an opening in the insulator 214 and the insulator 216, and a conductor 203b is formed on the inner side.

The insulator 220, the insulator 222, the insulator 224, and the insulator 250 have a function of a gate insulator.

Here, as the insulator 224 in contact with the oxide 230, an insulator that contains oxygen more than oxygen in the stoichiometric composition is preferably used. That is, an excess-oxygen region is preferably formed in the insulator 224. When such an insulator containing excess oxygen is provided in contact with the oxide 230, oxygen vacancies in the oxide 230 can be reduced and the reliability of the transistor 200 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS analysis. Note that the temperature of the film surface in the TDS analysis is preferably higher than or equal to 100° C. and lower than or equal to 700° C., or higher than or equal to 100° C. and lower than or equal to 400° C.

In the case where the insulator 224 includes an excess-oxygen region, it is preferred that the insulator 222 have a function of inhibiting diffusion of oxygen (e.g., at least one of an oxygen atom, an oxygen molecule, and the like) (or that the insulator 222 do not easily transmit the above oxygen).

When the insulator 222 has a function of inhibiting diffusion of oxygen or impurities, oxygen contained in the oxide 230 is not diffused to the insulator 220 side, which is preferable. Furthermore, the conductor 203 can be prevented from reacting with oxygen contained in the insulator 224 or the oxide 230.

For example, the insulator 222 is preferably formed using a single layer or stacked layers of an insulator containing aluminum oxide, hafnium oxide, tantalum oxide, zirconium oxide, lead zirconate titanate (PZT), strontium titanate (SrTiO$_3$), (Ba, Sr)TiO$_3$ (BST), or the like. With miniaturization and high integration of transistors, a problem such as leakage current may arise because of a thinner gate insulator. When a high-k material is used for an insulator functioning as the gate insulator, a gate potential during operation of the transistor can be reduced while the physical thickness of the gate insulator is kept.

It is particularly preferable to use an insulator containing an oxide of one or both of aluminum and hafnium, which is an insulating material having a function of inhibiting diffusion of impurities, oxygen, and the like (or an insulating material through which the oxygen is less likely to pass). As the insulator containing an oxide of one or both of aluminum and hafnium, aluminum oxide, hafnium oxide, an oxide containing aluminum and hafnium (hafnium aluminate), or the like is preferably used. In the case where the insulator 222 is formed using such a material, the insulator 222 functions as a layer that inhibits release of oxygen from the oxide 230 and entry of impurities such as hydrogen from the periphery of the transistor 200 into the oxide 230.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. Silicon oxide, silicon oxynitride, or silicon nitride may be stacked over the insulator.

It is preferable that the insulator 220 be thermally stable. For example, silicon oxide and silicon oxynitride, which have thermal stability, are preferable. Furthermore, when an insulator which is a high-k material is combined with silicon oxide or silicon oxynitride, the insulator 220 having a stacked-layer structure that has thermal stability and a high dielectric constant can be obtained.

Note that the insulator 220, the insulator 222, and the insulator 224 may each have a stacked-layer structure of two or more layers. In that case, without limitation to a stacked-layer structure formed of the same material, a stacked-layer structure formed of different materials may be employed.

In the transistor 200, a metal oxide functioning as an oxide semiconductor is preferably used as the oxide 230 including a channel formation region. For example, as the oxide 230, a metal oxide such as an In-M-Zn oxide (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. Furthermore, as the oxide 230, an In—Ga oxide or an In—Zn oxide may be used.

The metal oxide functioning as the channel formation region in the oxide 230 has a band gap of preferably 2 eV or higher, further preferably 2.5 eV or higher. With the use of a metal oxide having such a wide band gap, the off-state current of the transistor can be reduced.

When the oxide 230 includes the oxide 230a under the oxide 230b, it is possible to inhibit diffusion of impurities into the oxide 230b from the components formed below the oxide 230a. Moreover, including the oxide 230c over the oxide 230b makes it possible to inhibit diffusion of impurities into the oxide 230b from the components formed above the oxide 230c.

Note that the oxide 230 preferably has a stacked-layer structure of oxides that differ in the atomic ratio of metal atoms. Specifically, the atomic ratio of the element M to the constituent elements in the metal oxide used for the oxide 230a is preferably greater than the atomic ratio of the element M to the constituent elements in the metal oxide used for the oxide 230b. Moreover, the atomic ratio of the element M to In in the metal oxide used for the oxide 230a is preferably greater than the atomic ratio of the element M to In in the metal oxide used for the oxide 230b. Furthermore, the atomic ratio of In to the element M in the metal oxide used for the oxide 230b is preferably greater than the atomic ratio of In to the element M in the metal oxide used for the oxide 230a. A metal oxide that can be used for the oxide 230a or the oxide 230b can be used for the oxide 230c.

The energy of the conduction band minimum of each of the oxide 230a and the oxide 230c is preferably higher than the energy of the conduction band minimum of the oxide 230b. In other words, the electron affinity of each of the oxide 230a and the oxide 230c is preferably smaller than the electron affinity of the oxide 230b.

The energy level of the conduction band minimum gradually changes at junction portions of the oxide 230a, the oxide 230b, and the oxide 230c. In other words, the energy level of the conduction band minimum at the junction portions of the oxide 230a, the oxide 230b, and the oxide 230c continuously changes or is continuously connected. To obtain this, the density of defect states in a mixed layer formed at an interface between the oxide 230a and the oxide 230b and an interface between the oxide 230b and the oxide 230c is preferably made low.

Specifically, when the oxide 230a and the oxide 230b or the oxide 230b and the oxide 230c contain the same element (as a main component) in addition to oxygen, a mixed layer with a low density of defect states can be formed. For example, in the case where the oxide 230b is an In—Ga—Zn oxide, an In—Ga—Zn oxide, a Ga—Zn oxide, gallium oxide, or the like is preferably used for the oxide 230a and the oxide 230c.

At this time, the oxide 230b serves as a main carrier path. When the oxide 230a and the oxide 230c have the above structure, the density of defect states at the interface between the oxide 230a and the oxide 230b and the interface between the oxide 230b and the oxide 230c can be made low. Thus, the influence of interface scattering on carrier conduction is small, and the transistor 200 can have a high on-state current.

The conductor 242 (the conductor 242a and the conductor 242b) functioning as the source electrode and the drain electrode is provided over the oxide 230b. For the conductor 242, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen.

As illustrated in FIG. 19(A), a region 243 (a region 243a and a region 243b) is sometimes formed as a low-resistance region at and near the interface between the oxide 230 and the conductor 242. In that case, the region 243a functions as one of a source region and a drain region, and the region 243b functions as the other of the source region and the drain region. The channel formation region is formed in a region between the region 243a and the region 243b.

When the conductor 242 is provided in contact with the oxide 230, the oxygen concentration in the region 243 sometimes decreases. In addition, a metal compound layer that contains the metal contained in the conductor 242 and the component of the oxide 230 is sometimes formed in the region 243. In such a case, the carrier density of the region 243 increases, and the region 243 becomes a low-resistance region.

The insulator 244 is provided to cover the conductor 242 and inhibits oxidation of the conductor 242. At this time, the insulator 244 may be provided to cover a side surface of the oxide 230 and to be in contact with the insulator 224.

A metal oxide containing one or more kinds selected from hafnium, aluminum, gallium, yttrium, zirconium, tungsten, titanium, tantalum, nickel, germanium, magnesium, and the like can be used as the insulator 244.

For the insulator 244, it is particularly preferable to use an insulator containing an oxide of one or both of aluminum and hafnium, for example, aluminum oxide, hafnium oxide, or an oxide containing aluminum and hafnium (hafnium aluminate). In particular, hafnium aluminate has higher heat resistance than a hafnium oxide film. Therefore, hafnium aluminate is preferable because it is less likely to be crystallized by heat treatment in a later step. Note that the insulator 244 is not an essential component when the conductor 242 is an oxidation-resistant material or does not significantly lose its conductivity even after absorbing oxygen. Design is appropriately set in consideration of required transistor characteristics.

The insulator 250 functions as a gate insulator. The insulator 250 is preferably positioned in contact with the inner side (the top surface and the side surface) of the oxide 230c. The insulator 250 is preferably formed using an insulator from which oxygen is released by heating. For example, the insulator 250 is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS analysis. Note that the temperature of the film surface in the TDS analysis is preferably higher than or equal to 100° C. and lower than or equal to 700° C.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which have thermal stability, are preferable.

When an insulator from which oxygen is released by heating is provided as the insulator 250 in contact with the top surface of the oxide 230c, oxygen can be efficiently supplied from the insulator 250 to the channel formation region of the oxide 230b through the oxide 230c. Furthermore, as in the insulator 224, the concentration of impurities such as water or hydrogen in the insulator 250 is preferably reduced. The thickness of the insulator 250 is preferably greater than or equal to 1 nm and less than or equal to 20 nm.

In order to efficiently supply excess oxygen in the insulator 250 to the oxide 230, a metal oxide may be provided between the insulator 250 and the conductor 260. The metal oxide preferably inhibits diffusion of oxygen from the insulator 250 to the conductor 260. Providing the metal oxide that inhibits diffusion of oxygen inhibits diffusion of excess oxygen from the insulator 250 to the conductor 260. That is, a reduction in the amount of excess oxygen supplied to the oxide 230 can be inhibited. Moreover, oxidization of the conductor 260 due to excess oxygen can be inhibited. For the metal oxide, a material that can be used for the insulator 244 is used.

Although the conductor 260 functioning as the first gate electrode has a two-layer structure in FIGS. 19(A) and 19(B), a single-layer structure or a stacked-layer structure of three or more layers may be employed.

For the conductor 260a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 260a has a function of inhibiting oxygen diffusion, it is possible to prevent a reduction in conductivity of the conductor 260b due to oxidation caused by oxygen contained in the insulator 250. As a conductive material having a function of inhibiting oxygen diffusion, for example, tantalum, tantalum nitride, ruthenium, ruthenium oxide, or the like is preferably used.

The conductor 260b is preferably formed using a conductive material containing tungsten, copper, or aluminum as its main component. The conductor 260b also functions as a wiring and thus is preferably formed using a conductor having high conductivity. For example, a conductive material containing tungsten, copper, or aluminum as its main component can be used. The conductor 260b may have a stacked-layer structure, for example, a stacked-layer structure of any of the above conductive materials and titanium or titanium nitride.

The insulator 280 is provided over the conductor 242 with the insulator 244 therebetween. The insulator 280 preferably includes an excess-oxygen region. For example, the insulator 280 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, a resin, or the like. In particular, silicon oxide and silicon oxynitride, which have thermal stability, are preferable. In particular, silicon oxide and porous silicon oxide, in which an excess-oxygen region can be easily formed in a later step, are preferable.

The insulator 280 preferably includes an excess-oxygen region. When the insulator 280 from which oxygen is released by heating is provided in contact with the oxide 230c, oxygen in the insulator 280 can be efficiently supplied to the region 243 of the oxide 230 through the oxide 230c. Note that the concentration of impurities such as water or hydrogen in the insulator 280 is preferably lowered.

The opening of the insulator 280 is formed to overlap a region between the conductor 242a and the conductor 242b. Accordingly, the conductor 260 is formed to be embedded in the opening of the insulator 280 and the region between the conductor 242a and the conductor 242b.

The gate length needs to be short for miniaturization of the semiconductor device, but it is necessary to prevent a reduction in conductivity of the conductor 260. When the conductor 260 is made thick to achieve this, the conductor 260 might have a shape with a high aspect ratio. In this embodiment, the conductor 260 is provided to be embedded in the opening of the insulator 280; hence, even when the conductor 260 has a shape with a high aspect ratio, the conductor 260 can be formed without collapsing during the process.

The insulator 274 is preferably provided in contact with the top surface of the insulator 280, the top surface of the conductor 260, and the top surface of the insulator 250. When the insulator 274 is deposited by a sputtering method, excess-oxygen regions can be provided in the insulator 250 and the insulator 280. Accordingly, oxygen can be supplied from the excess-oxygen regions to the oxide 230.

For example, a metal oxide containing one or more kinds selected from hafnium, aluminum, gallium, yttrium, zirconium, tungsten, titanium, tantalum, nickel, germanium, magnesium, and the like can be used as the insulator 274.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

An insulator 281 functioning as an interlayer film is preferably provided over the insulator 274. As in the insulator 224 or the like, the concentration of impurities such as water or hydrogen in the insulator 281 is preferably lowered.

A conductor 240a and a conductor 240b are positioned in openings formed in the insulator 281, the insulator 274, the insulator 280, and the insulator 244. The conductor 240a and the conductor 240b are provided to face each other with the conductor 260 therebetween. The structures of the conductor 240a and the conductor 240b are similar to a structure of a conductor 246 and a conductor 248 that will be described later.

An insulator 282 is provided over the insulator 281. A substance having a barrier property against oxygen or hydrogen is preferably used for the insulator 282. Therefore, a material similar to that for the insulator 214 can be used for the insulator 282. For the insulator 282, a metal oxide such as aluminum oxide, hafnium oxide, or tantalum oxide is preferably used, for example.

In particular, aluminum oxide has a high blocking effect that inhibits the passage of both oxygen and impurities such as hydrogen and moisture which are factors of a change in electrical characteristics of the transistor. Accordingly, aluminum oxide can prevent the entry of impurities such as hydrogen and moisture into the transistor 200 in the fabrication process and after the fabrication of the transistor. In addition, release of oxygen from the oxide included in the transistor 200 can be inhibited. Therefore, aluminum oxide is suitably used for a protective film of the transistor 200.

An insulator 286 is provided over the insulator 282. For the insulator 286, a material similar to that for the insulator 320 can be used. When a material with a relatively low permittivity is used for an interlayer film, the parasitic capacitance between wirings can be reduced. For example, a silicon oxide film, a silicon oxynitride film, or the like can be used for the insulator 286.

The conductor 246, the conductor 248, and the like are embedded in the insulator 220, the insulator 222, the insulator 224, the insulator 244, the insulator 280, the insulator 274, the insulator 281, the insulator 282, and the insulator 286.

The conductor 246 and the conductor 248 function as plugs or wirings that are connected to the capacitor 100, the transistor 200, or the transistor 300. The conductor 246 and the conductor 248 can be provided using a material similar to those for the conductor 328 and the conductor 330.

In addition, the capacitor 100 is provided above the transistor 200. The capacitor 100 includes a conductor 110, a conductor 120, and an insulator 130.

A conductor 112 may be provided over the conductor 246 and the conductor 248. The conductor 112 has a function of a plug or a wiring that is connected to the transistor 200. The conductor 110 has a function of an electrode of the capacitor 100. The conductor 112 and the conductor 110 can be formed at the same time.

The conductor 112 and the conductor 110 can be formed using a metal film containing an element selected from molybdenum, titanium, tantalum, tungsten, aluminum, copper, chromium, neodymium, and scandium; a metal nitride film containing any of the above elements as its component (a tantalum nitride film, a titanium nitride film, a molybdenum nitride film, or a tungsten nitride film); or the like. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 112 and the conductor 110 each of which has a single-layer structure are illustrated in FIG. 18, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 120 is provided to overlap the conductor 110 with the insulator 130 therebetween. The conductor 120 can be formed using a conductive material such as a metal material, an alloy material, or a metal oxide material. It is preferable to use a high-melting-point material that has both heat resistance and conductivity, such as tungsten or molybdenum, and it is particularly preferable to use tungsten. In the case where the conductor 120 is formed concurrently with another component such as a conductor, Cu (copper), Al (aluminum), or the like, which is a low-resistance metal material, can be used.

An insulator 150 is provided over the conductor 120 and the insulator 130. The insulator 150 can be provided using a material similar to that for the insulator 320. The insulator 150 may function as a planarization film that covers an uneven shape thereunder.

With the use of this structure, a change in electrical characteristics can be inhibited and reliability can be improved in a semiconductor device using a transistor including an oxide semiconductor. Alternatively, a transistor including an oxide semiconductor and having a high on-state current can be provided. Alternatively, a transistor including an oxide semiconductor and having a low off-state current can be provided. Alternatively, a semiconductor device with low power consumption can be provided. Alternatively, a semiconductor device using a transistor including an oxide semiconductor can be miniaturized or highly integrated.

Structure Example 1 of Transistor

FIG. 18 and FIG. 19 show a structure example in which the conductor 242 functioning as a source electrode or a drain electrode is formed in contact with the oxide 230; however, the structure of the OS transistor is not limited thereto. For example, a structure can be employed in which the conductor 242 is not provided and the resistance of the oxide 230 is selectively lowered so that a source region or a drain region is provided in the oxide 230b. A structure example of such a transistor is illustrated in FIG. 20.

Figure 20A:
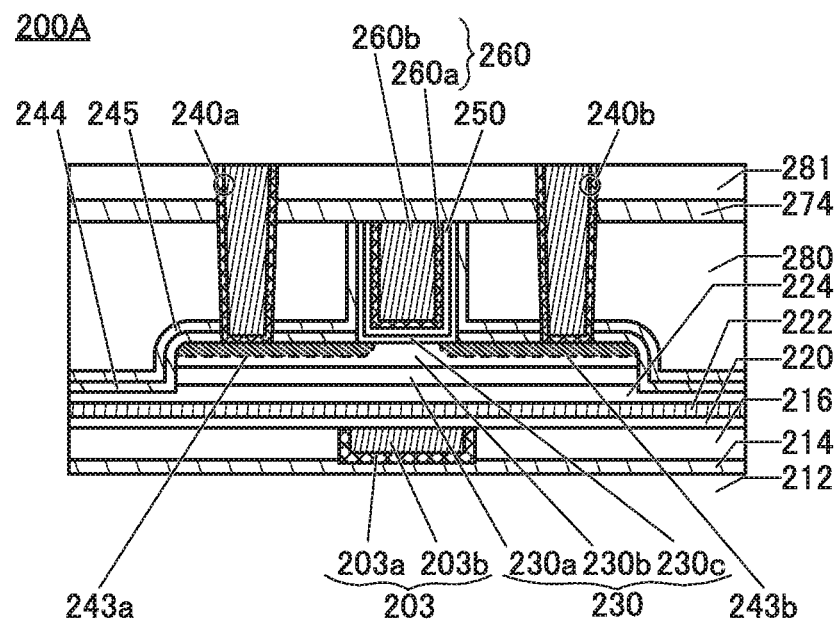
FIG. 20 Diagrams illustrating a structure example of a transistor.
Figure 20B:
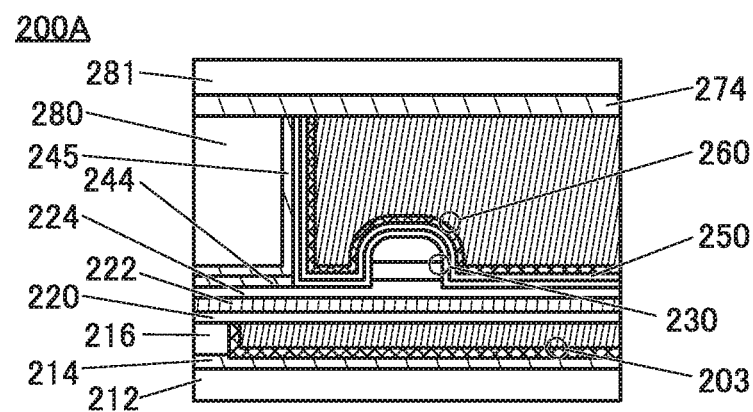

FIG. 20(A) is a cross-sectional view of a transistor 200A in the channel length direction, and FIG. 20(B) is a cross-sectional view of the transistor 200A in the channel width direction. Note that the transistor 200A illustrated in FIG. 20 is a variation example of the transistor 200 illustrated in FIG. 19. Therefore, differences from the transistor 200 will be mainly described to avoid repeated description.

In the transistor 200A, as in the transistor 200, a metal oxide functioning as an oxide semiconductor can be used as the oxide 230 including a channel formation region.

When an element that forms an oxygen vacancy or an element that is bonded to an oxygen vacancy is added to the oxide 230, the carrier density is increased and the resistance is lowered in some cases. Typical examples of an element that lowers the resistance of the oxide 230 include boron and phosphorus. Moreover, hydrogen, carbon, nitrogen, fluorine, sulfur, chlorine, titanium, a rare gas, or the like may be used. Typical examples of the rare gas are helium, neon, argon, krypton, and xenon.

Note that the concentration of the above element is measured by secondary ion mass spectrometry (SIMS) or the like.

Boron and phosphorus are particularly preferable because an apparatus in a manufacturing line for amorphous silicon or low-temperature polysilicon can be used. Using the apparatus in the manufacturing line can reduce capital investment.

The region 243 (the region 243a and the region 243b) illustrated in FIG. 20 is a region where the above element is added to the oxide 230b. The region 243 can be formed with the use of a dummy gate, for example.

For example, a dummy gate is provided over the oxide 230b, and an element that lowers the resistance of the oxide 230b is added using the dummy gate as a mask. That is, the element is added to regions of the oxide 230 that are not overlapped by the dummy gate, whereby the region 243 is formed. Note that as a method for adding the element, an ion implantation method by which an ionized source gas is subjected to mass separation and then added, an ion doping method by which an ionized source gas is added without mass separation, a plasma immersion ion implantation method, or the like can be used.

Next, an insulating film to be the insulator 244 and an insulating film to be an insulator 245 may be formed over the oxide 230b and the dummy gate. As will be described later, the insulating film to be the insulator 244 and the insulating film to be the insulator 245 are provided to be stacked over the dummy gate before the dummy gate is removed, whereby a stack of the insulator 244 and the insulator 245 is formed on a side wall of an opening after the dummy gate is removed. An element that lowers the resistance of the oxide 230b is added from above the stack of the insulator 244 and the insulator 245, which is formed over the dummy gate. The region 243 extends to a portion under the dummy gate, thereby providing a region where the region 243 is overlapped by the oxide 230c and the insulator 250.

Specifically, after an insulating film to be the insulator 280 is provided over the insulating film to be the insulator 245, the insulating film to be the insulator 280 is subjected to CMP (Chemical Mechanical Polishing) treatment, whereby part of the insulating film to be the insulator 280 is removed and the dummy gate is exposed. Then, when the dummy gate is removed, part of the insulator 244 in contact with the dummy gate is preferably also removed. Thus, the insulator 245 and the insulator 244 are exposed at the side surface of the opening provided in the insulator 280, and the region 243 provided in the oxide 230b is partly exposed at the bottom surface of the opening. Next, an oxide film to be the oxide 230c, an insulating film to be the insulator 250, and a conductive film to be the conductor 260 are formed in this order in the opening, and then, the oxide film to be the oxide 230c, the insulating film to be the insulator 250, and the conductive film to be the conductor 260 are partly removed by CMP treatment or the like until the insulator 280 is exposed; thus, the transistor illustrated in FIG. 20 can be formed.

Note that the insulator 244 and the insulator 245 are not essential components. Design is appropriately set in consideration of required transistor characteristics.

The cost of the transistor 200A illustrated in FIG. 20 can be reduced because an existing apparatus can be used and because, unlike in the transistor 200, the conductor 242 is not provided.

REFERENCE NUMERALS

DA1: signal line, DA2: signal line, DAM1: signal line, DAM2: signal line, DAP1: signal line, DAP2: signal line, FN10: node, FN20: node, FN30: node, FN40: node, FN50: node, FN60: node, FN70: node, FN80: node, FO1: signal line, F02: signal line, F03: signal line, F04: signal line, FOUT1: signal line, FOUT2: signal line, I11: current, I2: current, I3: current, I4: current, I5: current, M1: memory, M2: memory, M3: memory, M4: memory, M5: memory, M6: memory, 21: memory, 24a: memory, 24b: memory, 31a: memory, 31b: memory, 31c: memory, 31d: memory, MB1: signal line, MB2: signal line, REM1: signal line, REM2: signal line, REP1: signal line, REP2: signal line, S1: switch, S2: switch, S3: switch, S4: switch, S5: switch, S6: switch, S7: switch, S8: switch, S9: switch, S10: switch, S11: switch, S12: switch, S13: switch, S14: switch, S15: switch, SW0: switch, SW1: switch, UFM1: signal line, UFM2: signal line, UFP1: signal line, UFP2: signal line, WEM1: signal line, WEM2: signal line, WEP1: signal line, WEP2: signal line, WL1: signal line, 10: adder circuit, 10a: adder circuit, 11: multiplication cell, 11a: multiplication cell, 12: reference cell, 12a: reference cell, 13: arithmetic circuit, 13a: arithmetic circuit, 15: converter circuit, 15a: IV converter circuit, 15b: amplifier circuit, 20: selector, 22: counter, 22a: CNP, 22b: CNM, 23: control circuit, 24: selector, 25: control circuit, 26: zero insertion circuit, 26a: zero insertion circuit, 26b: zero insertion circuit, 26c: gate circuit, 27: adder circuit, 28: adder circuit, 29: gate circuit, 30: control circuit, 31: selector, 32: control circuit, 33a: zero insertion circuit, 33b: zero insertion circuit, 40: multiplier circuit, 40a: multiplier circuit, 41: transistor, 42: transistor, 42a: transistor, 43: capacitor, 44: transistor, 45: transistor, 45a: transistor, 46: capacitor, 47: transistor, 48: transistor, 49: transistor, 49a: transistor, 50: capacitor, 51: transistor, 51a: transistor, 52: capacitor, 61: transistor, 62: transistor, 62a: transistor, 63: capacitor, 64: transistor, 65: transistor, 65a: transistor, 66: capacitor, 67: transistor, 67a: transistor, 68: capacitor, 69: transistor, 69a: transistor, 70: capacitor, 71: transistor, 71a: transistor, 72: transistor, 72a: transistor, 73: capacitor, 74: transistor, 74a: transistor, 75: capacitor, 76: transistor, 76a: transistor, 77: capacitor, 80: semiconductor device, 81: CPU, 82: memory, 83: imaging device, 84: neural network, 84a: multiplication cell block, 84b: neuron, 84c: neural network, 85a: display controller, 85b: display device, 86: input/output bus, 90: switch

The invention claimed is:

1. A semiconductor device comprising a neural network,
wherein the neural network comprises a product-sum operation circuit,
wherein the product-sum operation circuit comprises a plurality of multiplier circuits and a first circuit,
wherein the first circuit comprises a first memory, a second memory, a third memory, and a first adder circuit,
wherein output data of the multiplier circuits are supplied to the first memory as first data with a positive sign and second data with a negative sign,
wherein the first data with the positive sign is supplied to the second memory,
wherein the second data with the negative sign is supplied to the third memory, and
wherein the first adder circuit is configured to add the first data with the positive sign and the second data with the negative sign.

2. The semiconductor device according to claim 1, wherein the second memory and the third memory have a first-in-first-out function.

3. An electronic device comprising:
the semiconductor device according to claim 1; and
a housing in which the semiconductor device is placed.

* * * * *